US008435454B2

(12) United States Patent
Elizarov et al.

(10) Patent No.: US 8,435,454 B2
(45) Date of Patent: May 7, 2013

(54) MODULAR SYSTEM FOR RADIOSYNTHESIS WITH MULTI-RUN CAPABILITIES AND REDUCED RISK OF RADIATION EXPOSURE

(75) Inventors: Arkadij M. Elizarov, Woodland Hills, CA (US); Carroll Edward Ball, Los Angeles, CA (US); Jianzhong Zhang, Brea, CA (US); Hartmuth C. Kolb, Playa Del Rey, CA (US); Reza Miraghaie, Culver City, CA (US); Todd L. Graves, Knoxville, TN (US); Artem Lebedev, Culver City, CA (US); Keith E. Schleiffer, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 175 days.

(21) Appl. No.: 12/986,323

(22) Filed: Jan. 7, 2011

(65) Prior Publication Data
US 2011/0150714 A1 Jun. 23, 2011

Related U.S. Application Data

(63) Continuation-in-part of application No. 12/803,862, filed on Jul. 8, 2010.

(60) Provisional application No. 61/224,311, filed on Jul. 9, 2009.

(51) Int. Cl.
*G21C 1/00* (2006.01)
*B01J 19/00* (2006.01)

(52) U.S. Cl.
USPC .............................. 422/159; 422/903; 422/130

(58) Field of Classification Search ................... 422/159, 422/903, 130
See application file for complete search history.

(56) References Cited

U.S. PATENT DOCUMENTS

| 5,082,980 | A | 1/1992 | Berridge |
| 5,312,592 | A | 5/1994 | Andersson |
| 5,415,843 | A | 5/1995 | Andersson |
| 5,436,325 | A | 7/1995 | Johnson et al. |
| 5,759,513 | A | 6/1998 | Nakazawa |

(Continued)

FOREIGN PATENT DOCUMENTS

| WO | 2005085855 | 9/2005 |
| WO | 2006041487 | 4/2006 |

(Continued)

OTHER PUBLICATIONS

Phelps, Michael E., "Positron Emission Tomography Provides Molecular Imaging of Biological Processes", PNAS, vol. 97, No. 16, Aug. 1, 2000, pp. 9226-9233.

(Continued)

*Primary Examiner* — Jill Warden
*Assistant Examiner* — Lessanework Seifu
(74) *Attorney, Agent, or Firm* — Joshua B. Ryan

(57) ABSTRACT

Macro- and microfluidic devices and related technologies, and chemical processes using such devices. More specifically, the devices may be used for a fully automated synthesis of radioactive compounds for imaging, such as by positron emission tomography (PET), in an efficient, compact and safe to the operator manner. In particular, embodiments of the present invention relate to an automated, multi-run, microfluidic instrument for the multi-step synthesis of radiopharmaceuticals, such as PET probes, comprising a remote shielded mini-cell containing radiation-handing components.

19 Claims, 62 Drawing Sheets

U.S. PATENT DOCUMENTS

| | | | |
|---|---|---|---|
| 5,932,178 A | | 8/1999 | Yamazuki et al. |
| 6,157,036 A | * | 12/2000 | Whiting et al. ......... 250/432 PD |
| 6,172,207 B1 | | 1/2001 | Damhaut et al. |
| 6,451,258 B1 | | 9/2002 | Malmqvist |
| 6,540,109 B1 | | 4/2003 | Klima et al. |
| 6,567,492 B2 | | 5/2003 | Kiselev et al. |
| 6,787,042 B2 | * | 9/2004 | Bond et al. .................... 210/681 |
| 7,018,614 B2 | | 3/2006 | Kiselev et al. |
| 7,041,068 B2 | | 5/2006 | Freeman et al. |
| 7,195,871 B2 | | 3/2007 | Lyamichev et al. |
| 7,235,216 B2 | | 6/2007 | Kiselev et al. |
| 7,368,474 B2 | | 5/2008 | Cuthbertson et al. |
| 7,540,855 B2 | | 6/2009 | Lumpkin et al. |
| 7,577,228 B2 | | 8/2009 | Jackson |
| 7,586,102 B2 | | 9/2009 | Mourtada et al. |
| 7,744,554 B2 | | 6/2010 | Howard |
| 7,829,032 B2 | | 11/2010 | Van Dam et al. |
| 7,833,206 B1 | | 11/2010 | Lumpkin et al. |
| 2003/0007588 A1 | | 1/2003 | Kiselev et al. |
| 2003/0194039 A1 | | 10/2003 | Kiselev et al. |
| 2004/0028573 A1 | | 2/2004 | Schmitz et al. |
| 2004/0086437 A1 | | 5/2004 | Jackson |
| 2004/0223910 A1 | | 11/2004 | Kiselev et al. |
| 2005/0142040 A1 | * | 6/2005 | Hanawa et al. ................ 422/102 |
| 2005/0191620 A1 | | 9/2005 | McDevitt et al. |
| 2005/0233440 A1 | | 10/2005 | Scurati et al. |
| 2005/0279130 A1 | | 12/2005 | Bjork |
| 2006/0017411 A1 | | 1/2006 | Hamm |
| 2006/0245980 A1 | | 11/2006 | Kiselev et al. |
| 2007/0051412 A1 | | 3/2007 | Heath |
| 2007/0200081 A1 | | 8/2007 | Elizarov |
| 2007/0217963 A1 | | 9/2007 | Elizarov |
| 2007/0292941 A1 | | 12/2007 | Handique et al. |
| 2008/0064110 A1 | | 3/2008 | Elizarov et al. |
| 2008/0181829 A1 | | 7/2008 | Matteo |
| 2008/0197078 A1 | * | 8/2008 | Benevides et al. ............ 210/656 |
| 2008/0224072 A1 | * | 9/2008 | Sonnenhol et al. ........ 250/496.1 |
| 2008/0233018 A1 | | 9/2008 | van Dam et al. |
| 2008/0233653 A1 | | 9/2008 | Hess et al. |
| 2008/0274052 A1 | | 11/2008 | Cuthbertson et al. |
| 2008/0293969 A1 | | 11/2008 | Karimi et al. |
| 2009/0036668 A1 | | 2/2009 | Elizarov et al. |
| 2009/0136922 A1 | | 5/2009 | Barlag et al. |
| 2009/0291507 A1 | | 11/2009 | Clemmens et al. |
| 2010/0121184 A1 | | 5/2010 | Dhawale et al. |
| 2010/0286512 A1 | | 11/2010 | Dhawale et al. |

FOREIGN PATENT DOCUMENTS

| | | |
|---|---|---|
| WO | 2006105936 | 10/2006 |
| WO | 2006132666 | 12/2006 |
| WO | 2007041486 | 4/2007 |
| WO | 2008091694 | 7/2008 |
| WO | 2008128201 | 10/2008 |
| WO | 2011006032 | 1/2011 |

OTHER PUBLICATIONS

PCT Search Report, PCT/US2011/025590, dated Sep. 15, 2011.

* cited by examiner

"COLD BOX" ON A CART CONNECTED TO A SHIELDED MINI-CELL WITH THREE "HOT" BOXES.

INTERLOCKING PIG DEVICE

THE INSIDE VIEW OF THE HOT BOX (WITH DOOR OPEN)

ADDITIONAL INSIDE VIEW OF THE HOT BOX SHOWING THE HPLC COLUMN (ON THE RIGHT SIDE OF THE UNIT)

AN EXEMPLARY MICRO REACTOR ASSEMBLY.

AN EXEMPLARY INVERTED LID WITH FEATURES ON THE CEILING THAT PREVENT ESCAPE OF
LIQUIDS INTO THE VENT PORTS BY SURFACE TENSION.

NEW INTERFACE BASE ALLOWING OFF-CHIP PRIMING OF REAGENTS CLOSE TO CHIP.

AN EXEMPLARY GLASS CHIP IN A FRAME (ASSEMBLED).

AN EXEMPLARY GLASS CHIP WITH A DISASSEMBLED FRAME.

AN EXEMPLARY GLASS CHIP WITH A SINGLE-PIECE FRAME WITH A VERTICAL SEAL

AN EXEMPLARY MACRO REACTOR ASSEMBLY

A CROSS-SECTION VIEW OF THE EXEMPLARY HOT BOX

ALTERNATIVE CROSS-SECTION OF THE HOT BOX (FROM THE BACK)

COLD BOX ASSEMBLY

NEW CONCEPTS SEPARATED BETWEEN INSTRUMENT CONFIGURATIONS A (LEFT) AND B (RIGHT)

A FLOW CHART OF AN EXEMPLARY INSTRUMENT A (MACRO REACTOR)

A FLOW CHART OF AN EXEMPLARY INSTRUMENT: A (MACRO REACTOR)

A FLOW CHART OF AN EXEMPLARY INSTRUMENT A (MACRO REACTOR)

A FLOW CHART OF AN EXEMPLARY INSTRUMENT A (MACRO REACTOR)

A FLOW CHART OF AN EXEMPLARY INSTRUMENT A (MACRO REACTOR)

A FLOW CHART OF AN EXEMPLARY INSTRUMENT A (MACRO REACTOR)

A FLOW CHART OF AN EXEMPLARY INSTRUMENT A (MACRO REACTOR)

A FLOW CHART OF AN EXEMPLARY INSTRUMENT A (MACRO REACTOR)

A FLOW CHART OF AN EXEMPLARY INSTRUMENT A - COLD BOX

A FLOW CHART OF AN EXEMPLARY INSTRUMENT A - COLD BOX

A FLOW CHART OF AN EXEMPLARY INSTRUMENT A - COLD BOX

A FLOW CHART OF AN EXEMPLARY INSTRUMENT A - COLD BOX

A FLOW CHART OF AN EXEMPLARY INSTRUMENT A - HOT BOX

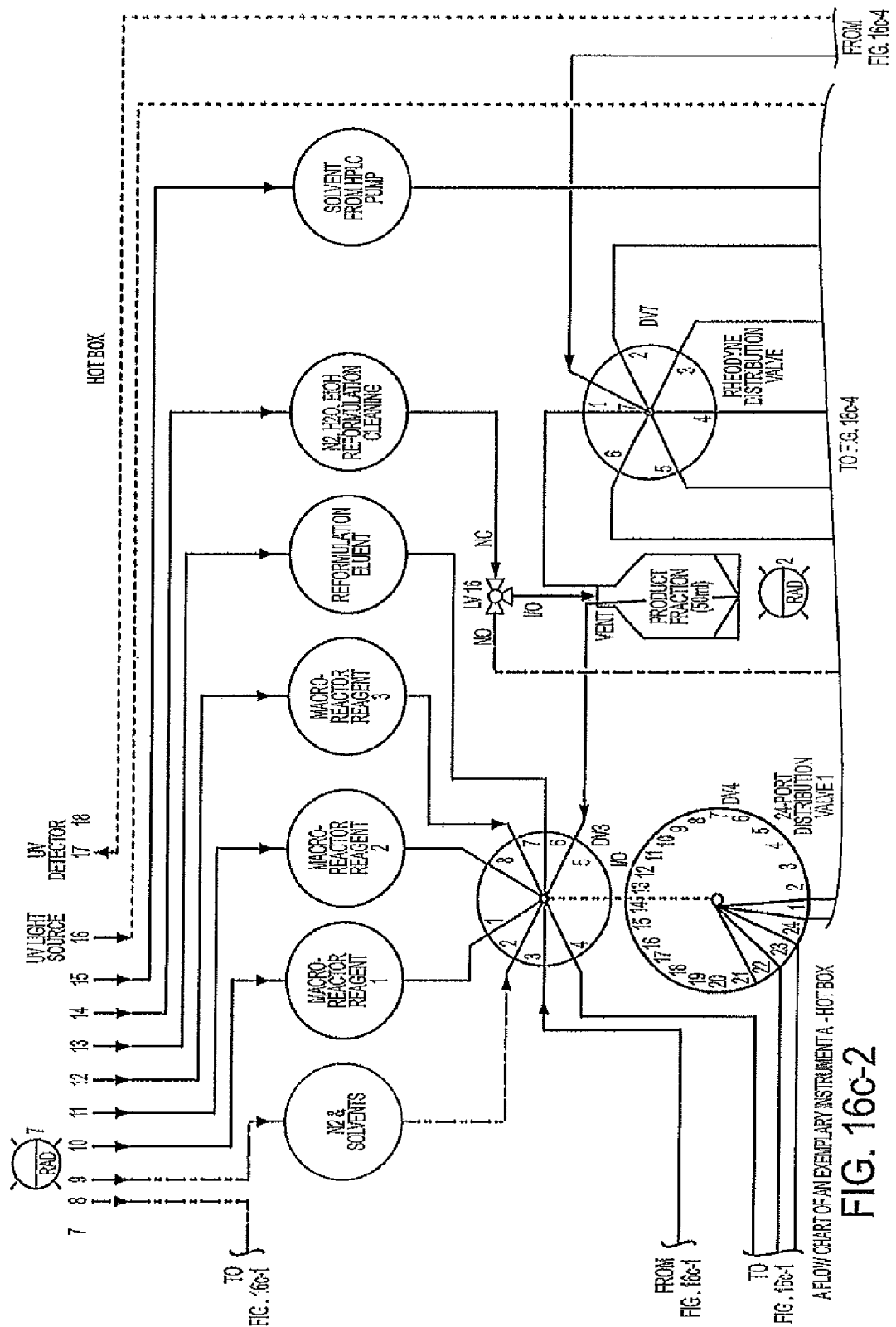

A FLOW CHART OF AN EXEMPLARY INSTRUMENT A - HOT BOX

A FLOW CHART OF AN EXEMPLARY INSTRUMENT A - HOT BOX

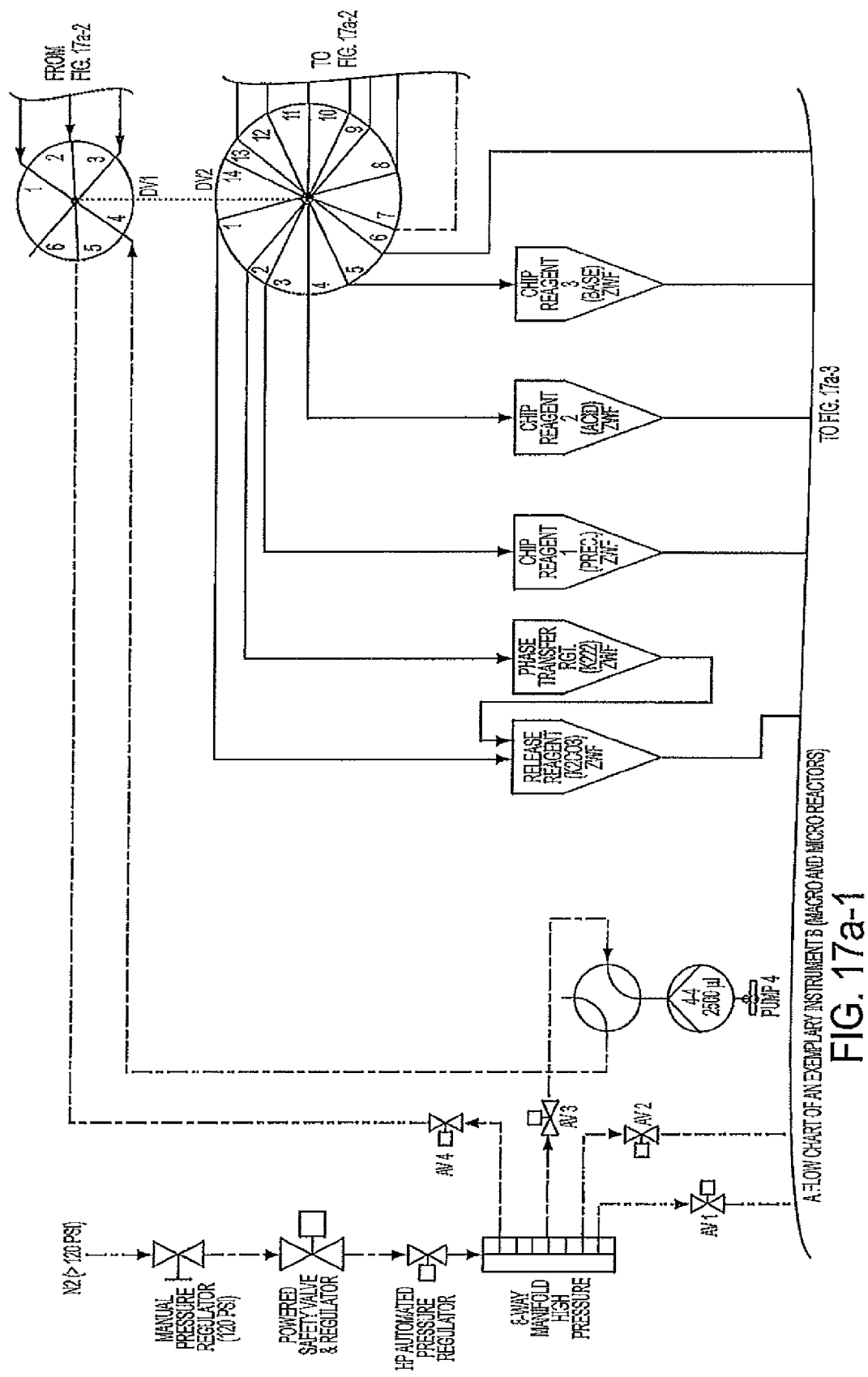

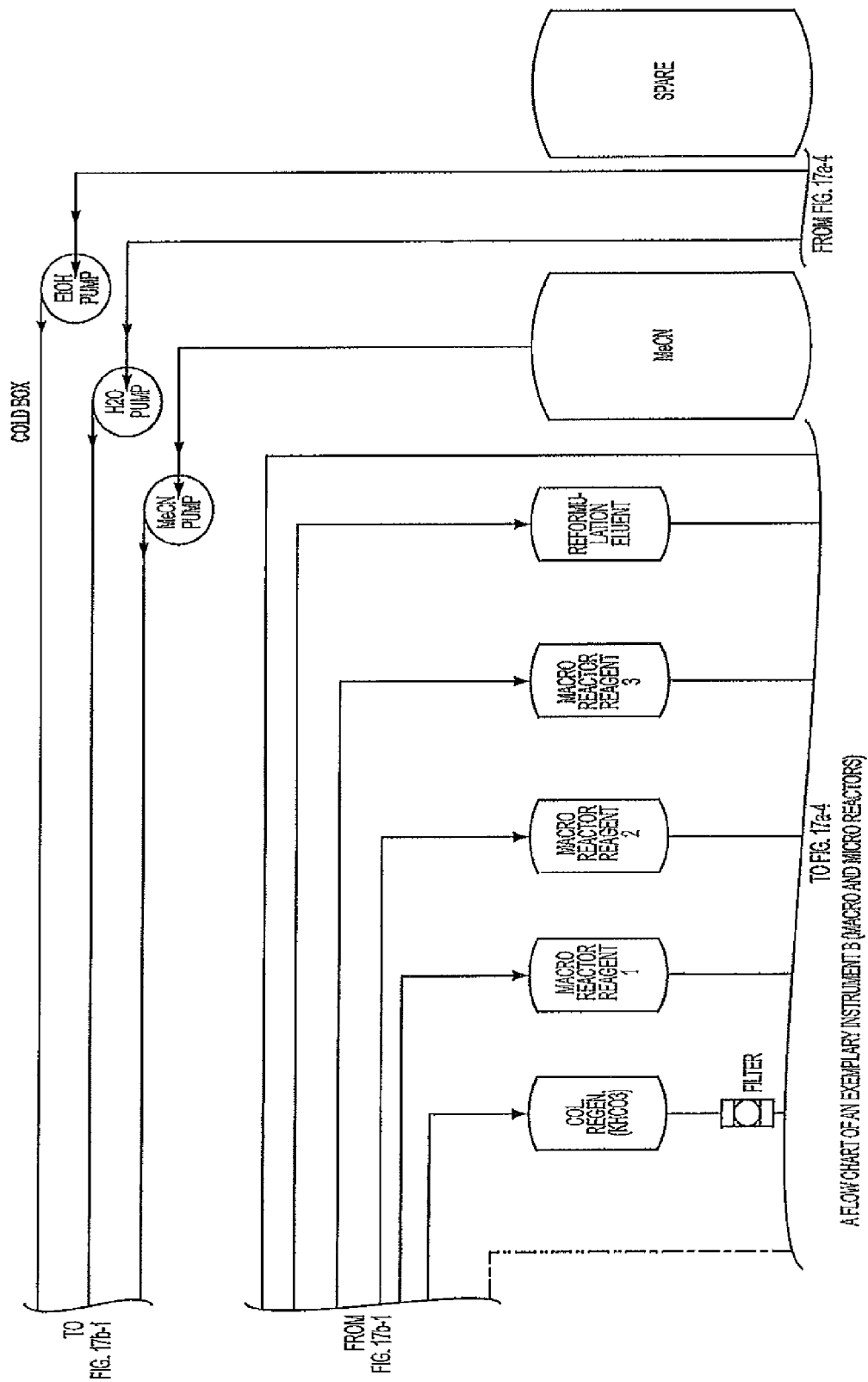

A FLOW CHART OF AN EXEMPLARY INSTRUMENT B (MACRO AND MICRO REACTORS)

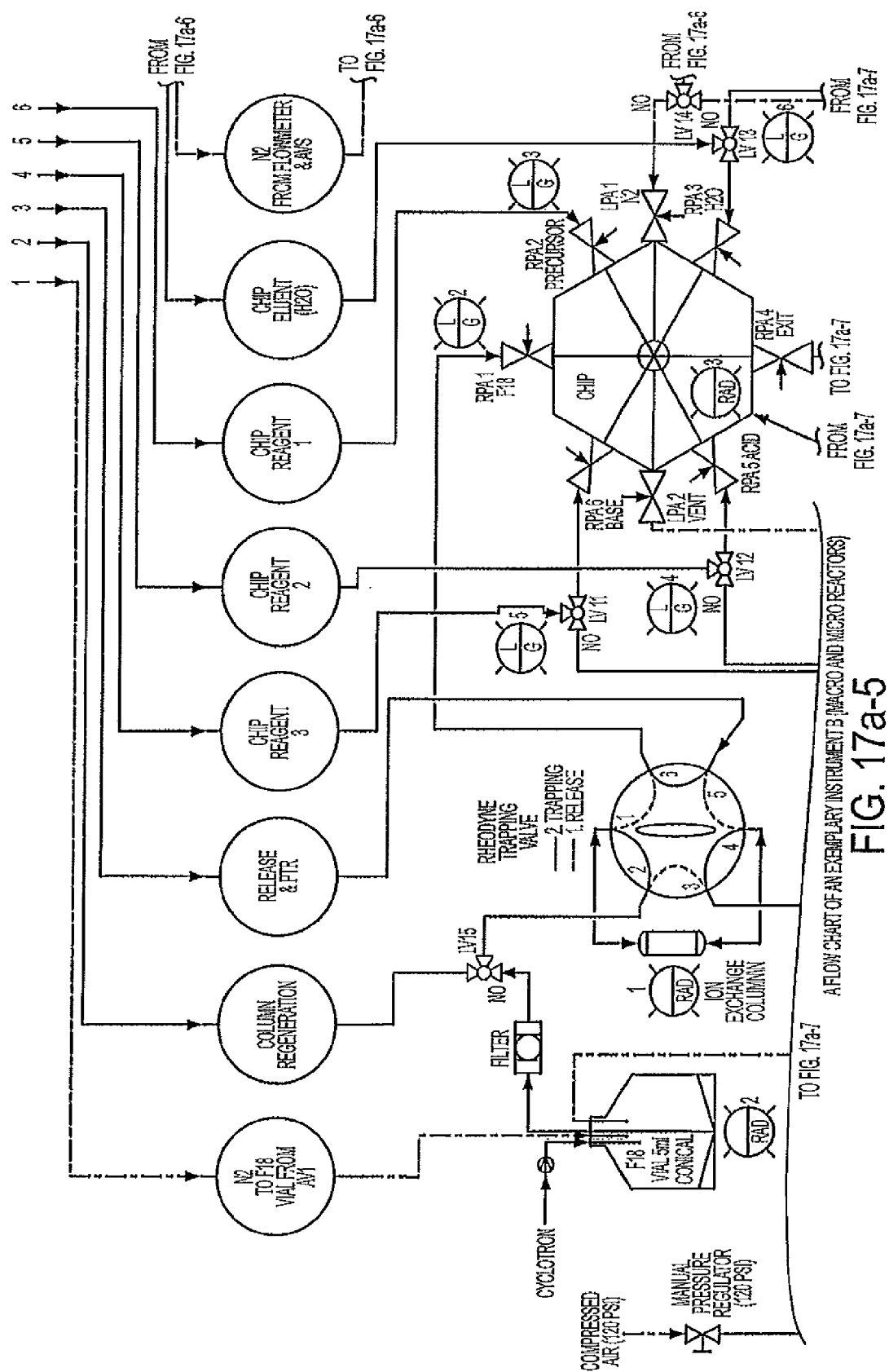
FIG. 17a-5 A FLOW CHART OF AN EXEMPLARY INSTRUMENT B (MACRO AND MICRO REACTORS)

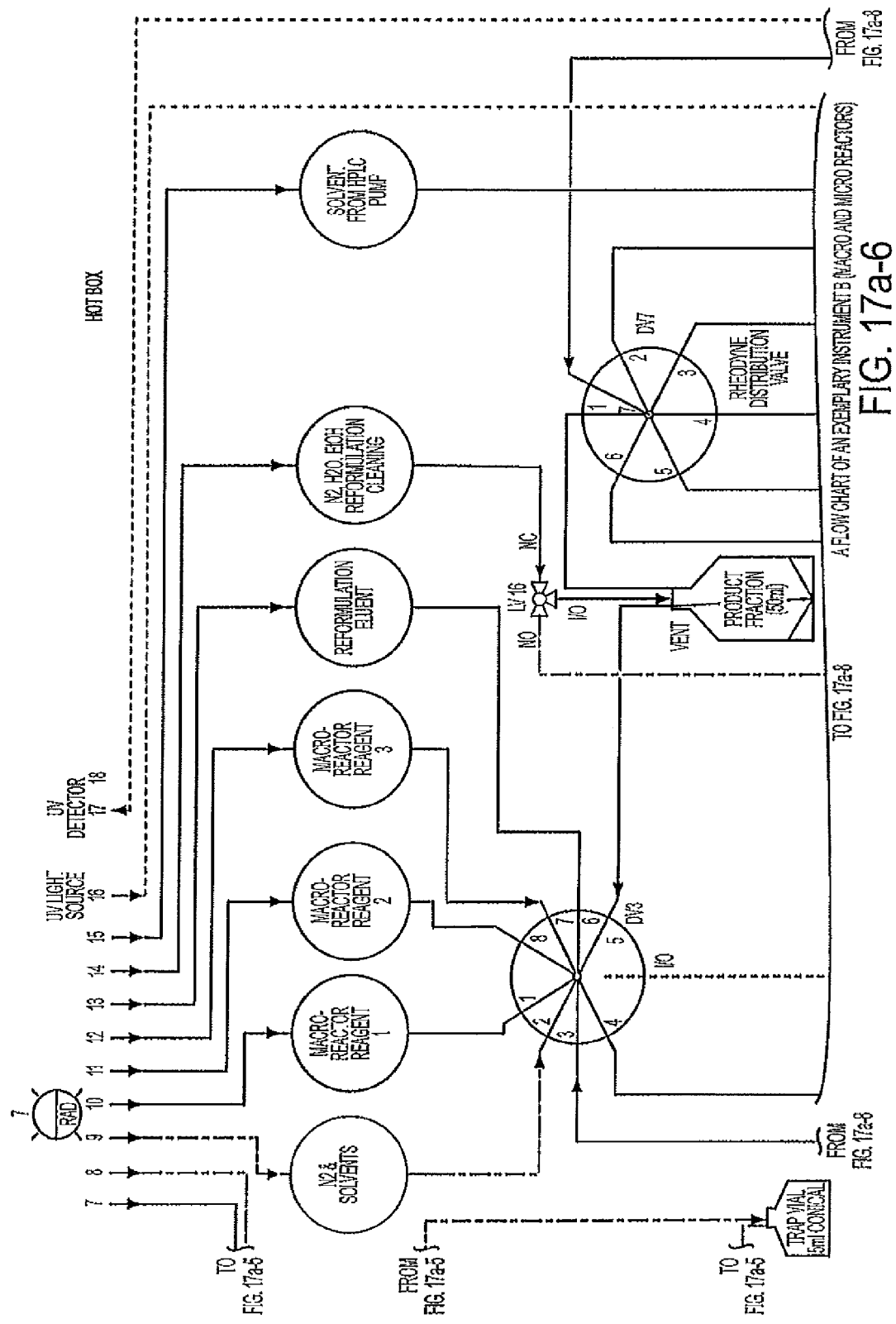
FIG. 17a-6 A FLOW CHART OF AN EXEMPLARY INSTRUMENT B (MACRO AND MICRO REACTORS)

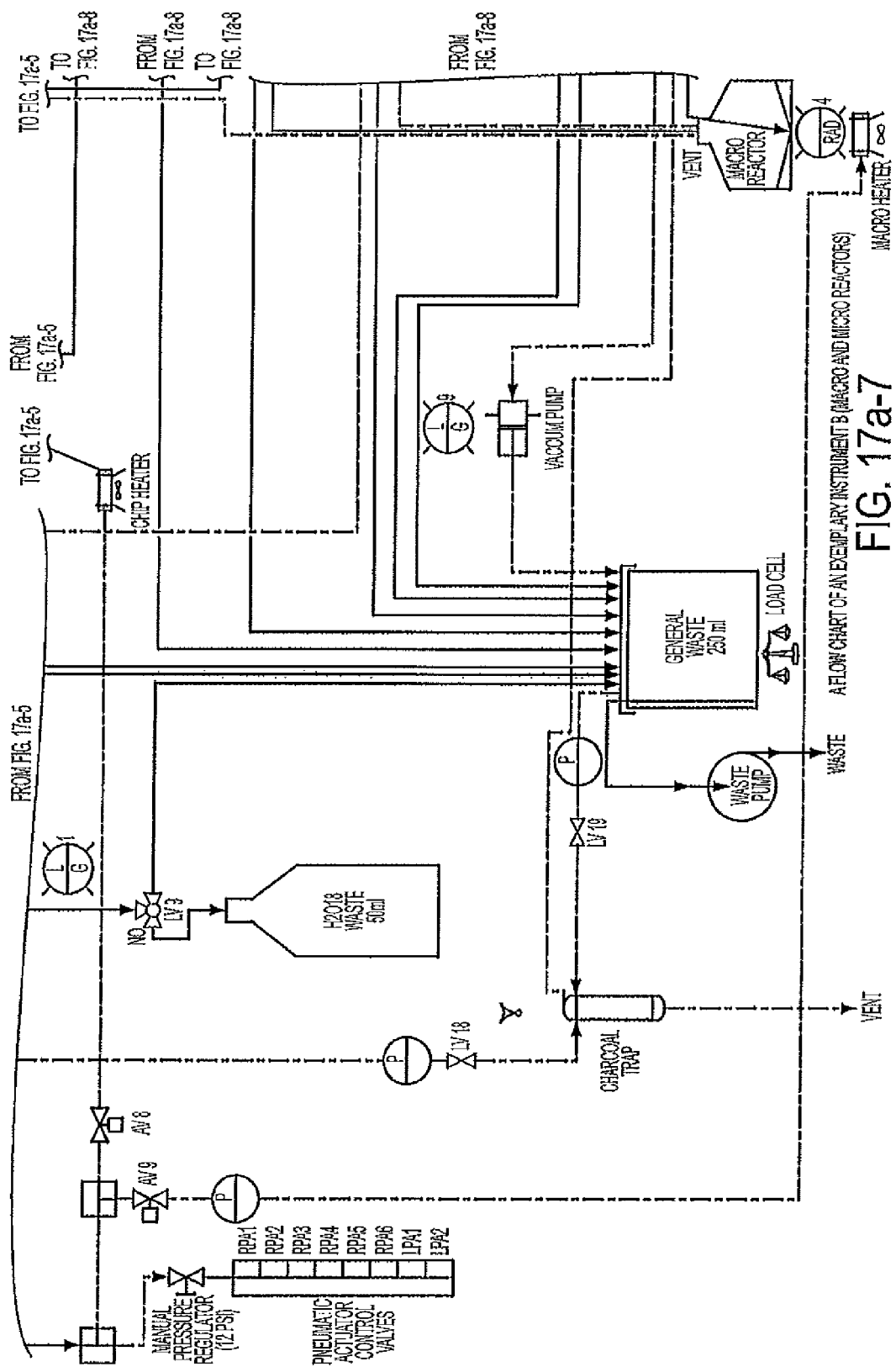
FIG. 17a-7 A FLOW CHART OF AN EXEMPLARY INSTRUMENT B (MACRO AND MICRO REACTORS)

A FLOW CHART OF AN EXEMPLARY INSTRUMENT B (MACRO AND MICRO REACTORS)

A FLOW CHART OF AN EXEMPLARY INSTRUMENT B - COLD BOX

A FLOW CHART OF AN EXEMPLARY INSTRUMENT B - COLD BOX

A FLOW CHART OF AN EXEMPLARY INSTRUMENT B - COLD BOX

A FLOW CHART OF AN EXEMPLARY INSTRUMENT B - HOT BOX

A FLOW CHART OF AN EXEMPLARY INSTRUMENT B - HOT BOX

A FLOW CHART OF AN EXEMPLARY INSTRUMENT B - HOT BOX

AN EXEMPLARY $^{18}$F-FLT PROCESS BLOCK DIAGRAM

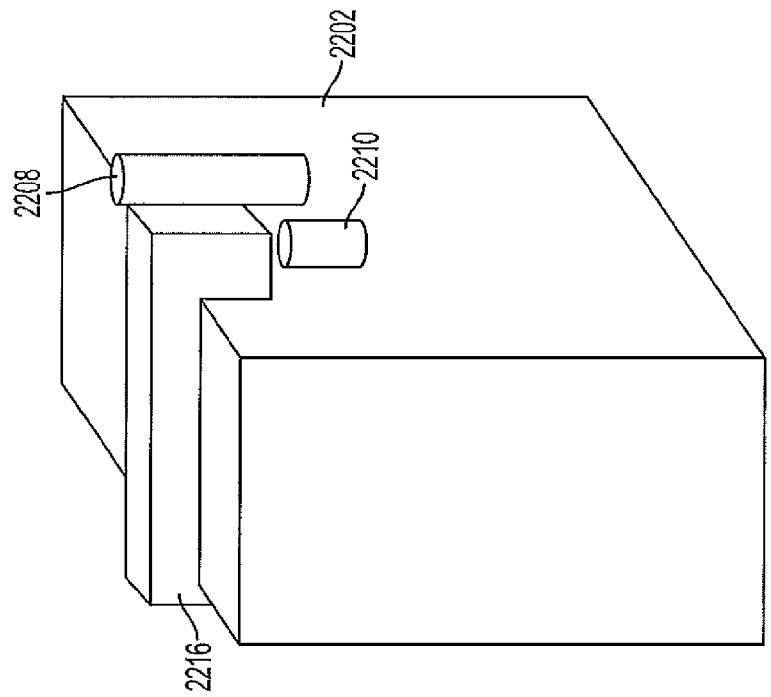
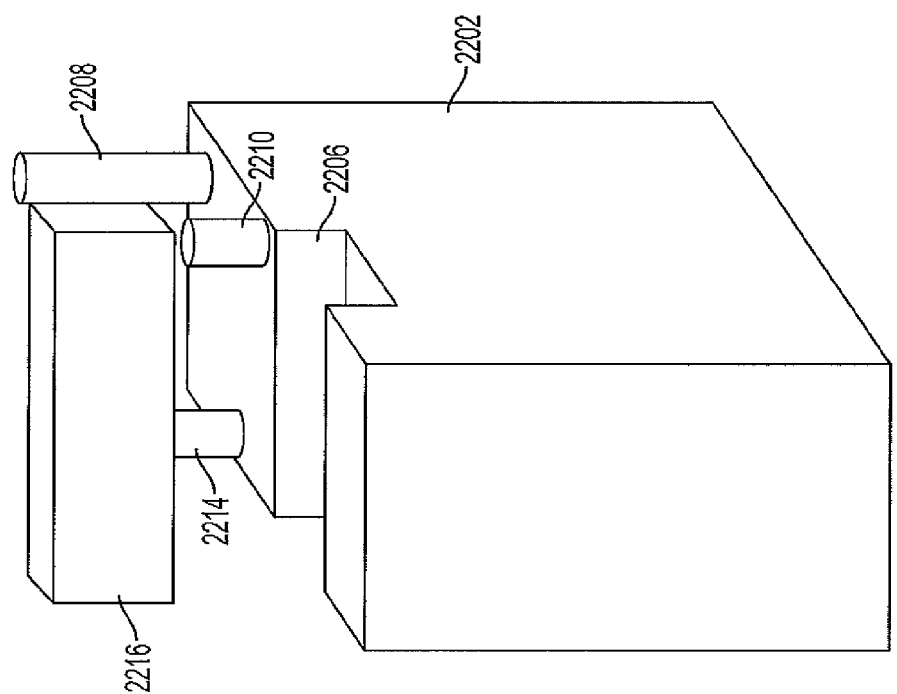
FIG. 24(b)
FIG. 24(a)

MODULAR SYSTEM FOR RADIOSYNTHESIS WITH MULTI-RUN CAPABILITIES AND REDUCED RISK OF RADIATION EXPOSURE

CLAIM TO PRIORITY

The present application is a Continuation-In-Part Application of co-pending U.S. application Ser. No. 12/803,862 filed on Jul. 8, 2010, which is based on and claims priority to U.S. provisional application No. 61/224,311, filed Jul. 9, 2009, all of which are hereby incorporated by reference in their entirety herein.

The foregoing application, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

FIELD OF THE INVENTION

The present invention relates generally to macro- and microfluidic devices and related technologies, and to chemical processes using such devices. More specifically, the invention relates to a fully automated synthesis of radioactive compounds for imaging, such as by positron emission tomography (PET), in an efficient, compact and safe to the operator manner. In particular, embodiments of the present invention relate to an automated, multi-run, microfluidic instrument for the multi-step synthesis of radiopharmaceuticals, such as PET probes, comprising a remote shielded mini-cell containing radiation-handing components. Also, the present invention is directed to a disposable cassette carrying components which may be re-used in another cassette.

BACKGROUND OF THE INVENTION

Positron Emission Tomography (PET) is a molecular imaging technology that is increasingly used for detection of various diseases, such as Alzheimer's disease, cardiovascular and metabolic diseases, cancer, AIDS, Parkinson's disease and other disorders. Disease is a biological process, and molecular imaging provides a sensitive and informative means to identify, study, and diagnose the biological nature of disease early in and throughout its evolution, as well as to provide biological information for development and assessment of therapies. For example, PET whole body imaging in cancer provides the means to (i) identify early disease, (ii) differentiate benign from malignant lesions, (iii) examine all organs for metastases and (iv) determine therapeutic effectiveness.

PET imaging systems create images based on the distribution of positron-emitting isotopes in the tissue of a patient. The isotopes are typically administered to a patient by injection of probe molecules that comprise a positron-emitting isotope (e.g., carbon-11, nitrogen-13, oxygen-15, or fluorine-18) covalently attached to a molecule that is readily metabolized or localized in the body or that chemically binds to receptor sites within the body. Positron emitters of Cu, Zn, K, Br, Rb, I, P, Fe, Ga and others can also be used.

PET probes and drugs are being developed together—in low mass amounts, as molecular imaging probes to image the function of targets without disturbing them, and in mass amounts to modify the target's function as a drug. Common tissue concentrations of PET probes are in the range of pico- to femtomoles per gram. Over 500 molecular imaging probes have been developed and consist of various labeled enzyme and transporter substrates, ligands for receptor systems, hormones, antibodies, peptides, drugs (medical and illicit), and oligonucleotides. For PET probes the short half-lives of the positron emitters require that synthesis, analysis and purification of the probes are completed rapidly.

Common pharmaceuticals radiolabeled with F-18 include, but are not limited to 2-deoxy-2-[F-18]-fluoro-D-glucose ($^{18}$F—FDG), 3'-deoxy-3'[F-18]-fluorothymidine ($^{18}$F—FLT), 9-[4-[F-18]fluoro-3-(hydroxymethyl)butyl]guanine ($^{18}$F—FHBG), 9-[(3-[F-18]fluoro-1-hydroxy-2-propoxy)methyl]guanine ($^{18}$F—FHPG), 3-(2'-[F-18]fluoroethyl)spiperone ($^{18}$F—FESP), 4-[F-18]fluoro-N-[2-[1-(2-methoxyphenyl)-1-piperazinyl]ethyl]-N-2-pyridinyl-benzamide ($^{18}$F-p-MPPF), 2-(1-{6-[(2-[F-18]fluoroethyl)-10 (methyl)amino]-2-naphthyl}ethylidene)malononitrile ($^{18}$F—FDDNP), 2-[F-18]fluoro-amethyltyrosine, [F-18]fluoromisonidazole ($^{18}$F—FMISO), 5-[F-18]fluoro-2'-deoxyuridine ($^{18}$F—FdUrd), and 2'-deoxy-2'-[$^{18}$F]fluoro-5-methyl-1-beta-D-arabinofuranosyluracil ($^{18}$F—FMAU). Other common radiolabeled compounds include $^{11}$C-methionine and $^{11}$C-acetic acid.

The synthesis of the [F-18]-labeled molecular probe, 2-deoxy-2-[F-18]-fluoro-D-glucose ($^{18}$F—FDG), is based on three major sequential synthetic processes: (i) Concentration of the dilute [F-18]fluoride solution (1-10 ppm) that is obtained from the bombardment of target water, [O-18]$H_2O$, in a cyclotron; (ii) [F-18]fluoride substitution of the mannose triflate precursor; and (iii) acidic hydrolysis of the fluorinated intermediate. Presently, [F-18]FDG is produced on a routine basis in a processing time (or cycle time) of 25 about 50 minutes using macroscopic commercial synthesizers. These synthesizers consist, in part, mechanical valves, glass-based reaction chambers and ion-exchange columns.

Other target probes such as, for example, $^{18}$F—FLT or $^{18}$F—FMAU, are more complex and require additional steps such as HPLC and intermediate purifications.

Instrument for carrying out synthesis of more complex radiolabeled targets require more complex and flexible equipment.

Most of known radiosynthesis modules have electronic equipment, reagent and radiation-handling components all in one mini-cell. This presents risk of radiation exposure to the operator handling the instrument and to the sensitive equipment inside such modules, which have to be serviced or replaced frequently. Furthermore, in most of the radiosynthesis systems reagents have to be replenished after each run, which subjects the user to radiation exposure and allows limited flexibility in production of wide range of PET probes in an efficient manner.

As such, there is a need for safer and more efficient systems that are capable of providing the flexibility to produce a wide range of probes, biomarkers and labeled drugs or drug analogs efficiently and in a safe to the user manner and at the same time capable of expediting chemical processing to reduce the overall processing or cycle times and production costs.

SUMMARY OF THE INVENTION

The present invention relates generally to an instrument or a system (modular system) capable of conducting chemical processes using macro- and microfluidic devices and related technologies. More specifically, embodiments of the present invention relate to a fully automated system for the synthesis of radioactive compounds for imaging, such as by positron emission tomography (PET), in a fast, efficient, compact and safe to an operator manner.

One of the embodiments of the present invention is directed to an instrument or a system for synthesis of radio-labeled compounds comprising "hot" and "cold" components, which are separated into two units connected by a bundle of cables and tubing, and which are removed from one another to minimize exposure of a user and sensitive equipment to radiation.

Another embodiment of the present invention is directed to the instrument where the "hot" box contains all radiation-handling components.

Another embodiment of the present invention is directed to the instrument where a "hot" box containing radiation-handling components is placed inside a mini-cell.

Another embodiment of the present invention is directed to the instrument where the "hot" box containing radiation-handling components is placed inside a self-shielded micro-cell.

Another embodiment of the present invention is directed to the instrument, where the at least one "hot box" is placed in the mini-cell.

Another embodiment of the present invention is directed to the instrument, where there are a plurality of "hot boxes" (typically three) are placed in one mini-cell.

In another embodiment of the present invention is directed to the instrument where a "cold" box is hosting electronics, pumps and reagents.

In another embodiment of the present invention is directed to the instrument where a "cold" box hosting electronics, pumps and reagents is placed outside the shielding to optimize "hot" space, allow access to reagents between runs and protect electronics and the operator from radiation.

One of the embodiments of the present invention is directed to the instrument where "hot" and "cold" components are separated into two "boxes" or units, which are about 20 feet away from one another to minimize the effects of radiation on a user and other sensitive equipment.

Another embodiment of the present invention relates to the instrument which can be manually-operated and/or fully-automated.

In another embodiment, the two units are connected via a bundle of cables and tubing necessary for electronic communication and delivery of reagents.

In another embodiment, the bundle of cables and tubing connecting the "hot" and "cold" boxes is equipped with a Safety Radiation Detector.

Another embodiment of the present invention relates to the modular system equipped with multiple reactors.

Another embodiment of the present invention is directed to the system where the "hot" unit is equipped with a macro reactor.

Another embodiment of the present invention is directed to the system where the "hot" unit is equipped with a micro or microfluidic reactor.

Another embodiment of the present invention relates to the system where a macro reactor-based instrument can be upgraded with a micro-reactor and vice versa.

Another embodiment of the present invention is directed to a system where "hot" component is equipped with the microfluidic chip and the macro reactor for conducting processes on micro and macro scale within the same instrument.

Another embodiment of the present invention relates to the instrument where the "hot box" can be accessed through a top opening in a shielded enclosure and/or vertical ejection of the unit out of the shield.

Another embodiment of the present invention relates to the instrument, where the top or vertical opening allows the hot box to be lifted vertically out of the stationary shield. In this embodiment, typically the shields are not movable and stay in place.

Another embodiment of the present invention is directed to a system where the self-shielded micro-cell comprises at least one unit equipped to carry out a radiosynthetic protocol including synthesis, purification and formulation procedures.

Another embodiment of the present invention is directed to the system where a typical mini-cell comprises more than one unit, each equipped to carry out a radiosynthetic protocol including synthesis, purification and formulation procedures.

Another embodiment of the present invention is directed to the system where three copies, or identical devices of the "hot" unit, each including synthesis, purification and formulation components are fitted inside one mini-cell.

Another embodiment of the present invention is directed to the system where the width of mini-cell interior is about 27 inches, depth is about 20 inches and height is about 24 inches.

Another embodiment of the present invention relates to the system where "cold" box comprises an embedded personal computer (PC), which is designed to perform various operations supporting discovery and production processes.

Another embodiment of the present invention relates to the system where the single "cold" box is adapted to control multiple "hot" boxes.

Another embodiment of the present invention relates to the placement of reagent reservoirs outside the radiation shield of the "hot box".

Another embodiment of the present invention relates to the placement of electronics outside the radiation shield of the "hot box".

Another embodiment of the present invention relates to the instrument capable of conducting multiple runs comprising radiosyntheses of different products without opening shielded enclosures during or between such runs.

Another embodiment of the present invention is directed to the instrument where product collection and F-18 delivery takes place in an interlocking pig device on a self-shielded module without radiation exposure.

Another embodiment of the present invention relates to the instrument which can be used with any cyclotron.

Another embodiment of the present invention is directed to an interlocking pig device, which is used to deliver an isotope to a self-shielded unit or remove product from self-shielded unit without user exposure.

Another embodiment, the present invention relates to the system where, both the self-shielded and mini-cell-based instruments can be connected directly to the cyclotron to receive an isotope.

Another embodiment of the present invention relates to the chip comprising a system of parapets on the ceiling of the chip preventing liquid vent loss while allowing efficient evaporation.

Another embodiment of the present invention relates to the instrument, where hot box comprises a system of three-way valves on interface base, which is operatively coupled to the chip, for example in an interference fit, mating relationship or alignment, for reagent priming.

Another embodiment of the present invention relates to the chip made of molded PEEK or glass.

Another embodiment of the present invention relates to the chip within a PEEK frame that seals with the PEEK microreactor and having a glass lid.

Another embodiment of the present invention relates to the system, where the reactors and interface bases are configured in such a way that potential leak paths are diverted away from heaters.

Another embodiment of the present invention relates to the chip comprising a plunger alignment for one-operation chip insertion.

Another embodiment of the present invention relates to a pre-aligned chip.

Another embodiment of the present invention relates to a mechanism of chip-plunger alignment that is built into the instrument and allows the chip to be aligned during its one-operation insertion. Alignment means, for example, that the plungers typically should be in certain positions within the chip in order to insert it without breaking and in order to make them operational. There positions are typically not preset by hand because they are mid way between fully inserted and completely removed. Multiple approaches have been explored to assure such alignment.

Another embodiment of the present invention relates to the instrument comprising a chip-plunger aligning device.

Another embodiment of the present invention relates to the chip with a pocket for pre-dispensed heat-transfer compound. (The chip has a pocket which mates with the heater protrusion. Rather than placing the heat transfer material on the protrusion, where it can easily get smeared and become a source of contamination, it is placed within the hard to reach pocket, and therefore less accessible and thus, less likely to cause a contamination to other parts of the chip/instrument.

Another embodiment of the present invention relates to the instrument where a pressure source- and detector-based system (see pressure monitors 52 in FIGS. 5a and 5b) are self-testing for leaks.

Another embodiment of the present invention relates to the instrument where a pressure-relief tube is incorporated between ion exchange column and micro reactor. This tube is useful since the release solution exits the column very rapidly and then slows down (i.e., the release of the solution begins at a fast rate and then the release rate decreases). The pressure relief tube is incorporated as a deceleration device, so that the release solution does not enter the reactor at a rapid pace.

Another embodiment of the present invention relates to the instrument where stirring in reformulation system is enabled by bubbling gas from the bottom of the vessel (enabled by a tube that reaches all the way to the bottom, which is used as both entrance and exit port).

Another embodiment of the present invention relates to the instrument where the "cold box" is equipped with a UV light source and detector coupled with the flow cell by optical fibers.

Another embodiment of the present invention relates to the instrument where the hot box is equipped with a UV LED used as a light source. The UV-LED is placed inside the hot box and requires no on-board electronics unlike the UV lamp and no optical fibers, as it mounts right in the flow cell. The LED mounts on the flow cell at one end and the detection optical fiber (connected to a detector) on another. Light shines through solution and is detected by the detector.

Another embodiment of the present invention relates to the instrument where a flow meter for monitoring reactor dryness can be placed both upstream and downstream of the reactor.

Another embodiment of the present invention relates to the instrument where efficient evaporation is achieved by change of pressure during evaporation process.

In one of the embodiments of the present invention, evaporation can start under low pressure and end under high pressure.

In one of the embodiments of the present invention evaporation can start under positive pressure and end under vacuum.

Another embodiment of the present invention relates to the system where a single syringe drives all reagents and optionally all solvents into the reactor without any of these reagents entering the syringe.

Another embodiment of the present invention relates to the system where the metering pumps drive solvents into the reactor or reformulation system.

Another embodiment of the present invention relates to the platform system where a multi-purpose solid phase extraction (SPE) system is plumbed to be available for (a) purified product reformulation, (b) crude product purification, (c) intermediate purification, (d) intermediate reformulation, (e) ion-exchange (F-18 trapping and release).

Another embodiment of the present invention relates to the instrument comprising a self-monitoring and self-emptying waste system.

Another embodiment of the present invention relates to the instrument comprising an automated cleaning with readiness indication.

Another embodiment of the present invention relates to the instrument comprising a system of two or more valves that can send any reagent to any location. Another embodiment of the present invention relates to the instrument comprising an air-cooled micro-reactor.

Another embodiment of the present invention relates to the instrument comprising air-cooled and air-heated reactor.

Another embodiment of the present invention relates to synthesis, purification and formulation systems sharing functional components.

Another embodiment of the present invention relates to the instrument comprising the cold box configured for cleanroom applications (all surfaces are wipeable with EtOH and detergent and have no protruding features).

Another embodiment of the present invention relates to the radiosynthesis instrument comprising a touch-screen computer.

Another embodiment of the present invention relates to the instrument comprising an automated safety interlock on exhaust monitoring.

Another embodiment of the present invention relates to the cold box equipped with a reagent kit.

Another embodiment of the present invention relates to a reagent cartridge that can be plugged into the cold box (other previously shown cartridges were plugged in inside the shielded enclosure).

Another embodiment of the present invention relates to the instrument where one batch of F-18 can be used for making multiple different products.

Another embodiment of the present invention relates to the instrument where one batch of F-18 can be used (split at least in two) in parallel mode for making multiple different products.

Another embodiment of the present invention relates to the instrument capable of producing various radiolabeled compounds incorporating different isotopes on the same module, which include, for example, F-18, C-11, and Cu-64.

Another embodiment of the present invention relates to the instrument configured for liquid and gas reagent handling within the same module.

Another embodiment of the present invention relates to the instrument where different processes can take place in individual hot boxes within the mini-cell at the same time.

Another embodiment of the present invention is directed to an instrument comprising a self-shielded waste management system.

Another embodiment of the present invention relates to the instrument capable of automatically generating a batch record with yield, activity concentration, specific activity and other parameters.

Another embodiment of the present invention relates to the instrument capable of adjusting preset protocols and procedures.

Another embodiment of the present invention relates to a method of releasing [F-18]fluoride from the ion exchange column with a certain volume of aqueous $K_2CO_3$ followed by a mixture of $K_2CO_3$ and Kryptofix 222 (K222) in $H_2O$/MeCN mixture of solvents. (This process is more efficient than the release of [F-18]fluoride with $K_2CO_3$ alone followed by K222.)

Another embodiment of the present invention is directed to a method where all reagents are driven from cold box to hot box before [F-18]fluoride delivery and are ready to be dispensed into the reactor right next to the reactor. This is not the case even in modules with onboard reagents without the "cold box". The reagents have to travel through the fluid network of channels to get from their reservoirs to the reactor.

Another embodiment of the present invention is directed to a method of passing K222 solution behind $K_2CO_3$ solution (through an ion exchange column and the entire path from column to reactor) to maximize F-18 transfer from ion exchange column into reactor.

Another embodiment of the present invention is directed to a method for F-18 release using multiple fractions of eluent. This method is more efficient than using a single fraction with the same total volume.

Another embodiment of the present invention is directed to a method of F-18 elution involving release direction and trapping direction being opposite, which maximizes the efficiency of release.

Another embodiment of the present invention relates to a method of loading HPLC injection loop by moving liquids with pressure (typically without using a syringe), which is enabled by specific positioning of liquid-gas interface detectors.

In another embodiment of the present invention relates to a method of increasing the efficiency of the release solution comprising passing the solution bolus through a tube packed with glass beads (splitting one bolus into multiple without moving hardware parts) to provide a train of multiple boluses.

Another embodiment of the present invention relates to a method of conducting multiple runs comprising radiosyntheses of different products without opening shielded enclosures.

Another embodiment of present invention is directed to the instrument, where the cold box has no protruding features (for clean-room applications).

Another embodiment of the present invention relates to the instrument, where the hot box comprises no single-use consumables.

Another embodiment of the present invention relates to the instrument, where the hot box comprises a glass-bead-packed tube to break the release solution into multiple boluses.

Another embodiment of the present invention relates to the instrument, where the hot box comprises a pressure-relief tube between I/E column and reactor.

Another embodiment of the present invention relates to the instrument, where the hot box comprises UV LED in HPLC.

Another embodiment of the present invention relates to the instrument, where the hot box comprises reusable I/E column.

Another embodiment of the present invention relates to the instrument, where the hot reusable Solid Phase Extractor (SPE) cartridges, or cassettes.

Another embodiment of the present invention relates to a method of conducting radiosynthesis of a radiolabeled compound in the instrument according to various embodiments of the present invention. For example, the embodiments of the present invention may be used to perform radiosynthesis of a radiolabeled compound.

Another embodiment of the present invention relates the method of conducting radiosynthesis of a radiolabeled compound in the instrument where loading an HPLC loop is conducted by pressure via tubing with liquid-gas detectors.

Another embodiment of the present invention relates the method of conducting radiosynthesis of a radiolabeled compound in the instrument according to various embodiments of the present invention comprising conducting multiple runs of radiosyntheses of different products without opening shielded enclosures.

Another embodiment of the present invention relates the method of conducting radiosynthesis of a radiolabeled compound in the instrument according to various embodiments of the present invention comprising increasing the efficiency of the release solution comprising passing the solution bolus through a tube packed with glass beads to provide a train of multiple boluses.

Another embodiment of the present invention relates the method of conducting radiosynthesis of a radiolabeled compound in the instrument according to various embodiments of the present invention comprising passing K222 through the release line behind $K_2CO_3$.

Another embodiment of the present invention relates the method of conducting radiosynthesis of a radiolabeled compound in the instrument according to various embodiments of the present invention where release by a $K_2CO_3$ bolus is followed by a mixture of $K_2CO_3$ and K222.

Another embodiment of the present invention relates to the method of conducting radiosynthesis of a radiolabeled compound in the instrument according to various embodiments of the present invention comprising achieving efficient release by splitting the release solution into multiple boluses.

Another embodiment of the present invention is directed to an instrument for synthesis of radiolabeled compounds that includes one or more "hot" component units and at least one "cold" component unit. The one or more "hot" component units and the at least one "cold" component unit are separate units that are operatively connected to each other, and the one or more "hot" component units and the at least one "cold" component unit being positioned from each other to reduce radiation exposure to a user and sensitive equipment. There are also one or more cartridge apparatus, or cassette apparatus, operatively coupled to a portion of the instrument. The one or more cassette apparatus provide at least a portion of contents of the one or more cassette apparatus to either one or more of the one or more hot component units or one or more of the at least one cold component units.

Another embodiment of the present invention is directed to the instrument described above (hot component unit, cold component unit, cassette apparatus) and wherein the one or more cassette apparatus include one or more disposable cassette or cartridge apparatus.

Another embodiment of the present invention is directed to the instrument described above (hot component unit, cold component unit, cassette apparatus), wherein the one or more cassette apparatus include one or more re-usable cassette apparatus.

Another embodiment of the present invention is directed to the instrument described above (hot component unit, cold component unit, cassette apparatus), wherein the one or more cassette apparatus include one or more single-use cassette apparatus.

Another embodiment of the present invention is directed to the instrument described above (hot component unit, cold component unit, cassette apparatus), wherein the one or more cassette apparatus include one or more multi-use cassette apparatus.

Another embodiment of the present invention is directed to the instrument described above (hot component unit, cold component unit, cassette apparatus), wherein one or more of the one or more cassette apparatus are operatively coupled to one or more of the one or more hot component units.

Another embodiment of the present invention is directed to the instrument described above (hot component unit, cold component unit, cassette apparatus), wherein one or more of the one or more cassette apparatus are operatively coupled to one or more of the at least one cold component units.

Another embodiment of the present invention is directed to the instrument described above (hot component unit, cold component unit, cassette apparatus), wherein one or more of the one or more cassette apparatus are operatively coupled to one or more of the one or more hot component units, and include one or more disposable cassette apparatus.

Another embodiment of the present invention is directed to the instrument described above (hot component unit, cold component unit, cassette apparatus), wherein one or more of the one or more cassette apparatus are operatively coupled to one or more of the cold component units, and include one or more disposable cassette apparatus.

Another embodiment of the present invention is directed to the instrument described above (hot component unit, cold component unit, cassette apparatus), wherein one or more of the one or more cassette apparatus are operatively coupled to one or more of the one or more hot component units and one or more of the at least one cold component unit.

Another embodiment of the present invention is directed to the instrument described above (hot component unit, cold component unit, cassette apparatus), and also includes radiation shielding disposed in proximity to one or more of the one or more hot component units to reduce radiation exposure.

Another embodiment of the present invention is directed to the instrument described above (hot component unit, cold component unit, cassette apparatus) and one or more of the one or more cassette apparatus are operatively coupled to the instrument outside the radiation shielding.

Another embodiment of the present invention is directed to the instrument described above (hot component unit, cold component unit, cassette apparatus), wherein the one or more cassette apparatus enable refilling of contents of the cassette apparatus without exposure to radiation.

Another embodiment of the present invention is directed to the instrument described above (hot component unit, cold component unit, cassette apparatus), wherein at least one of the one or more cassette apparatus are pre-packaged.

Another embodiment of the present invention is directed to a cassette device that has a body portion and at least one inlet port for receiving a fluid. The cassette also has at least one outlet port for providing at least a portion of the fluid. There are also one or more functional elements disposed on the body portion to perform an associated function. These functional elements may include, for example, HPLC, ion exchange column, vials, reservoirs and electronic components such as memory units, processors and other units.

The embodiments of the present invention also include a cassette in which at least some of the functional elements do not come into contact with radiation since they are radiation intolerant.

Furthermore, some of the functional elements are re-usable. They may be re-cycled or re-furbished such that they can be utilized again, either with the same cassette or a different cassette. Additionally, some of the functional elements are disposable.

According to the embodiments of the present invention, some of the functional elements are re-usable parts on the cassette body.

Additionally, the cassette device, as described herein, can have a body portion that is designed such that its shape, dimensions or pre-etched channels are based on a desired use or particular execution or recipe, or batch or re-usable elements. Thus, the cassette may be wider or longer or have additional vials based on a desired use of the cassette.

Another embodiment of the present invention is directed to a cassette device, as described herein in which the body portion includes one or more reservoirs that are arranged so as to provide contents of the reservoirs in a predetermined sequence. Thus, when the cassette is re-cycled or refurbished, the reservoirs can be re-filled so that the cassette may be used for a similar recipe in the future. Indeed, the cassettes can be re-used many times over by a laboratory using the cassettes to execute the recipe.

Another embodiment of the present invention is directed to a cassette in which the functional elements include elements for the wetted path. Thus, the wetted path can be utilized by the cassette elements, or components.

Yet another embodiment of the present invention is directed to a cassette device, as described herein in which the functional elements include HPLC, ion exchange column, a reagent reservoir, a mixing unit, a reaction chamber, a microreactor, a finishing unit, vials containing solvents and/or reagents, a chamber having pre-loaded reagents, a chamber having operator-loaded reagents, a waste collection chamber, pumps, valves, connections, tubing, processors, memories, chips, circuit traces, electrical connectors, fluid connectors, and other elements used in conjunction with the cassette that may be disposed on the cassette.

Another embodiment of the present invention is directed to the cassette device, as described herein in which an exchange time for the cassette in an instrument does not exceed a predetermined time interval. This predetermined time interval may be for example approximately one minute; approximately three minutes; approximately five minutes; or approximately fifteen minutes; or another desired time between runs.

The cassette device according to an embodiment of the present invention may be configured for a single run or multiple runs. Also, the cassette may perform a cleaning function for at least a portion of an instrument and/or the cassette. Additionally, the cassette device may be adapted for performing one or more tests of an instrument.

Another embodiment of the present invention is a cassette device that includes a tracking module, disposed on the body portion, that tracks use of the cassette. The tracking device may be used to accumulate use data of the cassette, types of experiments run using the cassette, types of constituent parts on the cassette, maintenance records, types of instruments the cassette has been used with, time of use of the cassette and other data related to the operational life and uses of the cassette.

The cassette device, as described herein may be used to produce an aliquot, or other reaction product that may be output from the cassette and/or instrument.

A further embodiment of the present invention is a cassette device, as described herein, that further includes at least one connector adapted to electrically couple the cassette device to an instrument. Additionally, the connector is adapted to transmit electrical signals or power signals or both electrical and power signals between the cassette device and the instrument.

Yet another embodiment of the present invention is directed to the cassette device, as described herein that includes a connector adapted to provide a pathway for liquid transmission between the cassette device and an instrument. This could be tubing, or a fitting that permits liquids to transfer to and from the cassette.

Yet another embodiment of the cassette as described herein is that the cassette may have a body portion that is shaped to interface with an instrument such that the shape signals to the instrument what predetermined procedures, experiments, recipes or other uses the cassette is capable of performing.

Another embodiment of the present invention is directed to the cassette device, as described herein that also includes identifying information disposed on the cassette device. The identifying information includes, for example, a bar code, an RFID tag, encoded data, encrypted data or any combination thereof.

Another embodiment of the present invention is directed to the cassette as described herein and also includes an integrity module, or unit or facility that is mounted on the body portion, and is adapted to determine whether an instrument is compatible with the cassette device. If the cassette and instrument are not compatible, an alert or other indication is generated and provided to an operator or other location, such as a monitoring device.

Yet another embodiment of the present invention is directed to a cassette, as described herein in which the body portion includes one or more containers, or vials, or reservoirs, that contain predetermined materials. These containers may include fluids (liquid or gas or slurry or any combination thereof) or dry chemicals.

Another embodiment of the present invention is directed to the cassette device, as described herein, wherein the cassette includes a cleaning unit or facility disposed thereon. The cleaning unit may be used to clean components on the cassette and/or components of the instrument. The tubing or plumbing connected to the cleaning unit can be configured to deliver the quantity and type of cleaning agent desired for the particular cleaning operation.

The cassette as described herein may also have channels that are pre-configured on the body portion of the cassette. These channels may be drilled, etched, molded, or otherwise formed such that the channel paths are fixed. An operator may connect various functional elements or components such that the channels provide a conduit or pathway between the components.

Also, the cassette, as described herein, may also have flexible tubing connected to at least one of the at least one outlet ports and/or components. The cassette may also include one or more valves disposed on the body portion of the cassette.

Another embodiment of the present invention is directed to the cassette as described herein in which one or more components are utilized based on an instrument operating in conjunction with the cassette. Thus, an instrument may utilize only some of the functional elements mounted on the cassette.

Another embodiment of the present invention is directed to a cassette device that includes an indicia that indicates a status of the cassette. This may include, for example, the number of recipes executed, radiation level and other conditions. This indicia could be the bar code, RFID and/or tracking unit as described herein.

Another embodiment of the present invention is an instrument that is used to identify the condition of a cassette. This instrument typically includes a cassette reception module, adapted to interface with a cassette apparatus and the instrument identifies each cassette used with the cassette reception module. The instrument can obtain status data from the cassette and use the status data to control re-furbishing, recycling and or replacement operations.

Another embodiment of the present invention is directed to an apparatus for reprocessing the cassette components which are to be re-used, which permits component reprocessing to take place without limiting the synthesis instrument from proceeding directly with its next synthesis task.

Furthermore, the invention is directed to an embodiment that includes a radiosynthetic device suitable for operating two or more cassettes, such that the instrument can perform multiple synthesis runs in sequence without the need to change cassettes.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

These and other embodiments of the present invention are disclosed or are apparent from and encompassed by the following Detailed Description when taken in conjunction with the accompanying drawings.

BRIEF DESCRIPTION OF THE DRAWINGS

The following detailed description, given by way of example, but not intended to limit the invention solely to the specific embodiments described, may best be understood in conjunction with the accompanying drawings, in which:

FIGS. 24(a) and 24(b) show a cassette with non-disposable elements.

DETAILED DESCRIPTION

Figure 1:
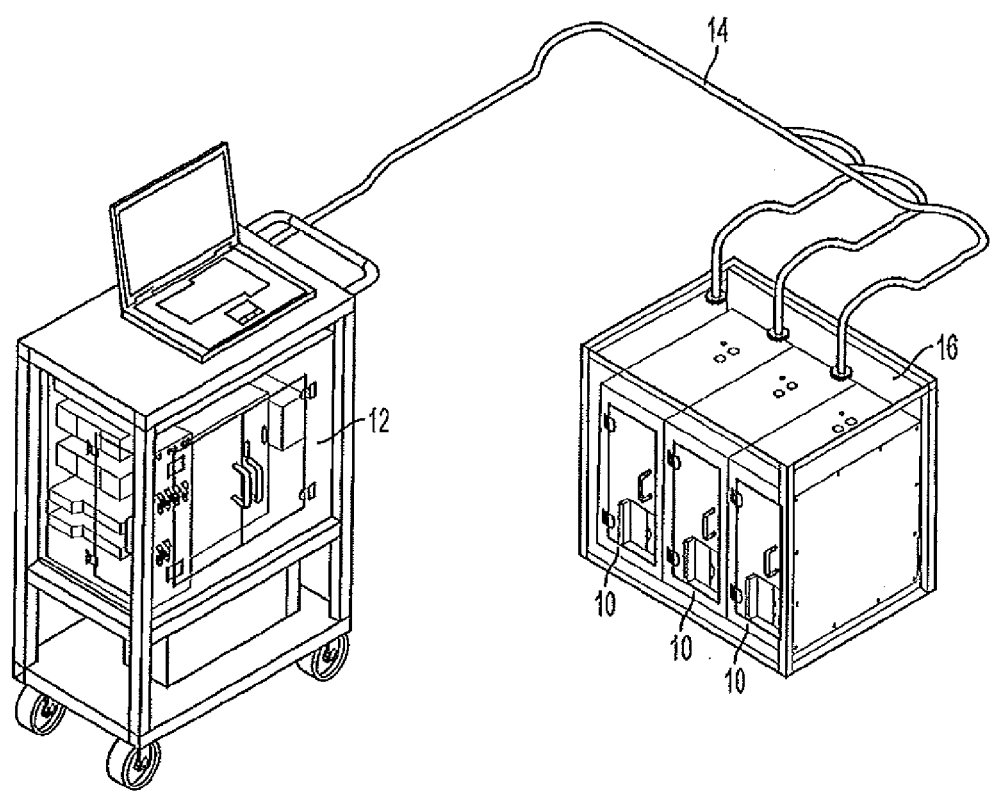
FIG. 1 illustrates an exemplary instrument where "Cold Box" on a cart is connected to a shielded mini-cell with three "Hot Boxes".

To facilitate the understanding of the disclosed methods, systems and devices, the following provides a listing of terms and definitions that are used in the art of organic synthesis, engineering and pharmaceutical sciences.

The term "hot" means radioactive. In various embodiments of the present invention, the term "hot" or "Hot" relates to the radioactive compounds, materials, processes and equipment affected by radiation and/or handling radiation.

The term "cold" or "Cold" means non-radioactive. In various embodiments of the present invention, the term "cold" or "Cold" relates to the non-radioactive compounds, materials, processes and equipment not affected by radiation and/or handling radiation.

The terms "device", "apparatus", "system" and "instrument" are used interchangeably herein and are not intended to limit the scope of the claimed invention.

The term "mini-cell" means a standard shielded enclosure for radiochemistry modules. Typically, there are no windows or manipulators and such enclosure was previously designed to host one synthesis module. Typical dimensions are 27×20× 16. Another example of the mini-cell disclosed herein relates to the width of about 27 inches, depth of about 20 inches and height of about 24 inches.

"Macro reactor" is a conventional glass reactor, the volume of which is typically from about 5 to about 20 mL.

A "chip" or "microfluidic device" or "microfluidic chip" or "synthesis chip" is a unit or device that permits the manipulation and transfer of small amounts of liquid (e.g., microliters or nanoliters) into a substrate comprising micro-channels. The device may be configured to allow the manipulation of liquids, including reagents and solvents, to be transferred or conveyed within the micro channels and reaction chamber using mechanical or non-mechanical pumps. The device may be constructed using micro-electromechanical fabrication methods. Alternatively, the devices can be machined using computer numerical control (CNC) techniques. Examples of substrates for forming the device include glass, quartz or polymer. Such polymers may include PMMA (polymethylmethacrylate), PC (polycarbonate), PDMS (polydimethylsiloxane), DCPD (polydicyclopentadiene), PEEK(polyether ether ketone) and the like. Such devices may comprise columns, pumps, mixers, valves and the like. Generally, the microfluidic channels or tubes (sometimes referred to as micro-channels or capillaries) have at least one cross-sectional dimension (e.g., height, width, depth, diameter), which by the way of example, may range from approximately 1,000 μm to 10 μm. The micro-channels make it possible to manipulate extremely small volumes of liquid, for example on the order of nL to μL. The micro reactors may also comprise one or more reservoirs in fluid communication with one or more of the micro-channels, each reservoir having, for example, a volume of about 5 to about 1,000 μL.

"Reaction chamber" (sometimes referred to as "reactor" or "micro-reactor") refers to feature on the microfluidic chip (such as described here or for example in U.S. Ser. No. 11/514,396, U.S. Ser. No. 11/540,344, or U.S. Ser. No. 11/701,917, each of which is incorporated herein in its entirety by reference) where the reactions may take place. The reaction chamber may, for example, be cylindrical in shape. The reaction chamber has one or more micro-channels connected to it that delivers reagents and/or solvents or are designed for product removal (e.g., controlled by on-chip valves, or equivalent devices). For example, the reaction chamber may have a diameter to height ratio of greater than about 0.5 to 10, or more. For example, the reactor height may be about 25 micrometer to about 20,000 micrometers.

"Column" means a device that may be used to separate, purify and/or concentrate reactants and/or products. Such columns include, for example, ion exchange and affinity chromatography columns.

A "flow channel" or "channel" means a macro or a microfluidic or channel through which a fluid, solution, or gas may flow. For example, such channels may have a cross section of about 0.1 mm to about 1 mm. For example, the flow channels of embodiments of the present invention may also have a cross section dimension in the range of about 0.05 microns to about 1,000 microns. The particular shape and size of the flow channels depend on the particular application required for the reaction process, including the desired throughput, and may be configured and sized according to the desired application.

"Target water" [$^{18}$O] is H2O after bombardment with high-energy protons in a particle accelerator, such as a cyclotron. It contains [18F]fluoride.

"Kryptofix" or "K222" is a tradename for commercially available cryptands. Cryptands are a family of synthetic bi- and polycyclic multidentate ligands for a variety of cations. These molecules are three dimensional analogues of crown ethers but are more selective and complex. The most common and most important cryptand is $N[CH_2CH_2OCH_2CH_2OCH_2CH_2]_3N$. This compound is termed [2.2.2]cryptand where the numbers indicate the number of ether oxygen atoms (and hence binding sites) in each of the three bridges between the amine nitrogen "caps". All-amine cryptands exhibit particularly high affinity for alkali metal cations, which has allowed the isolation of salts of $K^+$.

The term "fluid" means a liquid, vapor, gas, slurry or any combination thereof.

In one embodiment of the present invention, preparation of target water is achieved separately from the system disclosed herein. In one embodiment of the present invention, target water is supplied to the system from a cartridge; in another embodiment, from a pre-filled individual vial.

A "valve" (or "micro-valve") means a device that may be controlled or actuated to control or regulate fluid, gas or solution flow among various components of the macro- or microfluidic device, including flow between flow channels, solvent or reagent reservoirs, reaction chamber, columns, manifold, temperature controlling elements and devices, and the like. For example, such valves may include mechanical (or micromechanical valves), (pressure activated) elastomeric valves, pneumatic valves, solid-state valves, and other valves adapted for a similar and/or equivalent function or purpose.

The term "RAD" means a unit of absorbed radiation dose or shorthand for "radioactive". Also in the flow charts (see, for example, FIGS. 16a, 16c, 17a, and 17c) disclosed herein, "RAD" defines radiation detectors.

The term "AV" as shown in flow charts (see, for example, FIGS. 16a, 16c, 17a, and 17c) and disclosed herein means an air valve. It can be, for example, a macro-valve.

The term "LV" as shown in flow charts (see, for example, FIGS. 16a, 16c, 17a, and 17c) and disclosed herein means an liquid valve. It can be, for example, a macro-valve.

The term "DV" as shown in flow charts (see, for example, FIGS. 16a, 16c, 17a, and 17c) and disclosed herein means a distribution valve.

The term "RTV" as shown in flow charts (see, for example, FIGS. 16a, 16c, 17a, and 17c) and disclosed herein means a Rheodyne trapping valve.

The term "RPA" as shown in flow charts (see, for example, FIGS. 16a, 16c, 17a, and 17c) and disclosed herein means an on chip liquid valve. It can be, for example, a micro-valve.

The term "LPA" as shown in flow charts (see, for example, FIGS. 16a, 16c, 17a, and 17c) and disclosed herein means an on-chip gas (vent) valve. It can be, for example, a microvalve.

The term "LG" as shown in flow charts (see, for example, FIGS. 16a, 16c, 17a, and 17c) and disclosed herein means a liquid/gas detector. Such detectors "sit" on the tubing and provide feedback regarding current tubing contents.

Examples of such valves may be found, for example, in U.S. patent application Ser. No. 12/102,822, which is hereby incorporated by reference in its entirety.

Figure 3:
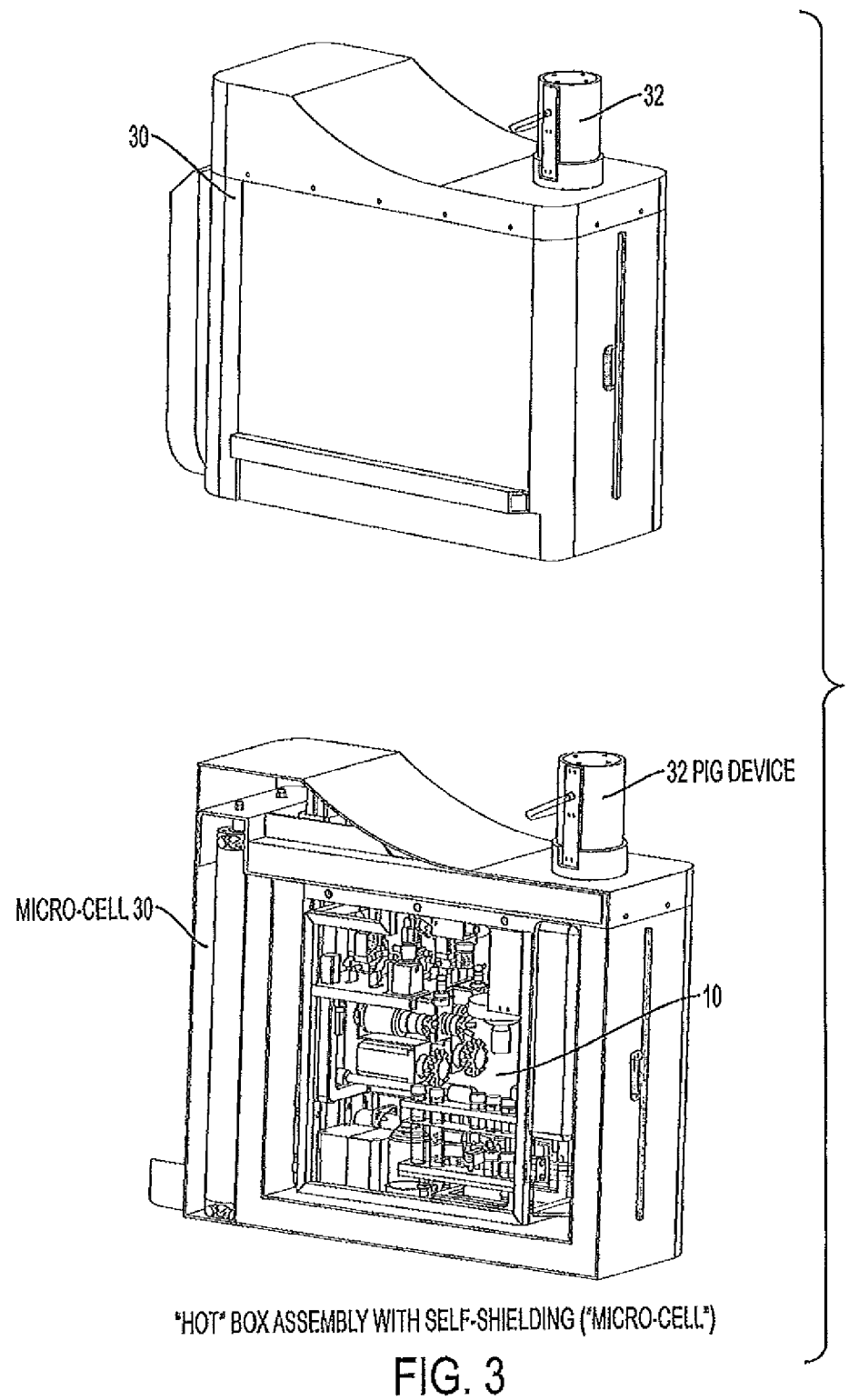
FIG. 3 illustrates an exemplary "Hot Box" Assembly with self-shielding ("micro-cell").
Figure 4:
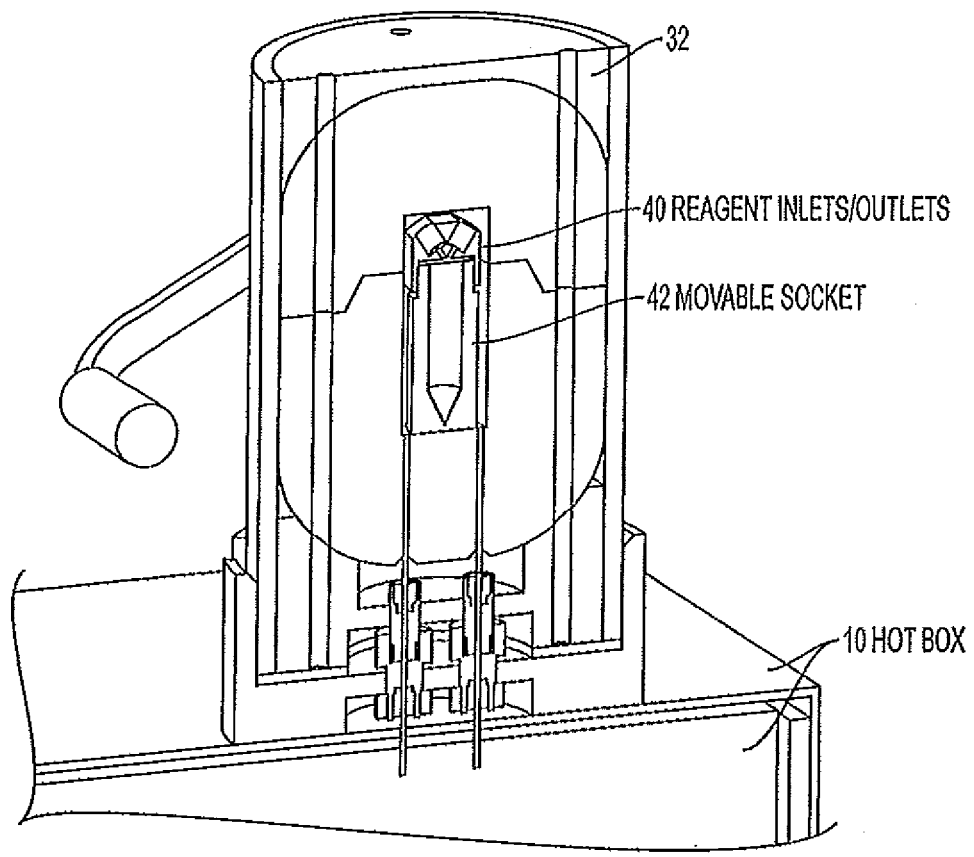
FIG. 4 illustrates an exemplary interlocking pig device.

An Interlocking Pig device ("pig") is, for example, a device that can be plugged into a socket on a self-shielded hot box 10 as shown in FIGS. 3 and 4 as component 32, forming a completely shielded path from pig to box for transferring materials through reagent inlets and/or outlets 40 by a movable socket 42 in and out of the pig without opening either the pig or the box and without any user exposure to radiation. A Peltier cooler, heater, or thermoelectric heat pump is a solid-state active heat pump which transfers heat from one side of the device to the other side against the temperature gradient (from cold to hot), with consumption of electrical energy. Such an instrument is also called a Peltier device, Peltier heat pump, solid state refrigerator, or thermoelectric cooler (TEC). Thermoelectric cooling uses the Peltier effect to create a heat flux between the junction of two different types of materials.

The term "radioactive isotope" refers to isotopes exhibiting radioactive decay (e.g., emitting positrons). Such isotopes are also referred to in the art as radioisotopes or radionuclides. Radioactive isotopes are named herein using various commonly used combinations of the name or symbol of the element and its mass number (e.g., 18F, [F-18], fluorine-18). Exemplary radioactive isotopes include I-124, F-18, C-11, N-13, and O-15, which have half-lives of approximately 4.2 days, 110 minutes, 20 minutes, 10 minutes, and 2 minutes, respectively.

The term "reactive precursor" or "precursor" refers to an organic or inorganic non-radioactive molecule that is reacted with a radioactive isotope, typically by nucleophilic substitution, electrophilic substitution, or ionic exchange, to form the radiopharmaceutical. The chemical nature of the reactive precursor depends upon the physiological process to be studied. Typically, the reactive precursor is used to produce a radiolabeled compound that selectively labels target sites in the body, including the brain, meaning the compound can be reactive with target sites in the subject and, where necessary, capable of transport across the blood-brain barrier. Exemplary organic reactive precursors include sugars, amino acids, proteins, nucleosides, nucleotides, small molecule pharmaceuticals, and derivatives thereof. One common precursor used in the preparation of $^{18}$F—FDG is 1,3,4,6-tetra-O-acetyl-2-O-trifluoromethanesulfonyl-β-D-mannopyranose. For example, $^{18}$F—FLT precursor is 3-N-Boc-1-[5-O-(4,4'-dimethoxytrityl)-3-O-nosyl-2-deoxy-β-D-lyxofuranosyl] thymine.

The phrase "reactor temperature" refers to a temperature observed, measured and/or maintained in the reaction chamber.

"Reaction time" refers to the time allowed for a reaction to run before the next step takes place.

The phrase "reagent pressure" or "solvent pressure" refers to the pressure of a gas (usually an inert gas such as nitrogen or argon) applied to a reagent or solvent vial that drives a reagent or solvent into a flow channel, e.g. on the way to the reaction chamber.

The term "module" as used herein means a stand-alone facility or instrument, or unit or device, or a "plug-in" functional element that is programmed or designed to perform a specific function or task. A module may also be, for example, an electronic storage medium such as RAM, ROM, EEPROM, or other memory device, such as an optical disk, optical tape, CD, or a floppy disk, a hard disk, flash drive, or a removable cartridge, which may be inserted into a port (e.g., a USB port) or interconnector, on which digital information is stored in the form of bits. It may also include recorders to record to and read from mass storage devices such as, for example, optical disks, magnetic disks, flash semiconductor disks, and other types of storage which may be temporary or permanent.

The phrase "time of reagent filling" or "time of solvent filling" refers to the time allowed for a reagent or solvent to enter the chip before the on-chip valve closes, thereby inhibiting passage of additional reagent or solvent into the reaction chamber.

The term "evaporation" refers to the change in state of solvent from liquid to gas that is usually followed by removal of that gas from the reactor. One method for removing gas is effected by applying a vacuum. Various solvents are evaporated during the synthetic route disclosed herein, such as for example acetonitrile and water. For example, each solvent, such as acetonitrile and water, may have a different evaporation time and/or temperature.

In another embodiment of the present invention the evaporation takes place by heating the reaction chamber while introducing an inert gas over the reaction mixture to effect the removal of vapors from the reaction chambers.

In another embodiment of the present invention the evaporation can be affected by changes in pressure. For example, the evaporation can start under low pressure and end under high pressure or the evaporation can start under positive pressure and end under vacuum.

The term "elution" generally refers to removal of a compound from a particular location. Elution of [F-18]fluoride from the ion exchange column refers to the conveyance of [F-18]fluoride by the eluting solution from the column to the reaction chamber. Elution of product from the reaction chamber refers to conveyance of the product from the reaction chamber to the off-chip product vial (or into the purification system) by, for example, flushing the reaction chamber with a volume of solvent, e.g. water.

The "off/on time" in reference to the vacuum (or gas pressure) applied at a point in the system refers to the point in time of the radiosynthesis operation when the vacuum (or gas pressure) is turned "on" or "off".

"Inert gas pressure", including "nitrogen pressure" or "argon pressure" refers to pressure of inert gas, such as nitrogen or argon, allowed past a given regulator.

The phrase "internal filter" refers to a vial, a syringe or another container that is filled with absorbent material such as charcoal and comprises two ports. When the exhaust from the chip is passed through such a filter, radioactive and nonradioactive contaminants are generally caught by and stay on the filter. After passage of the reaction exhaust through an internal filter purified gas is released into the atmosphere. Use of an appropriate internal filter reduces or even eliminates the need for an additional exhaust processing for safe operation of the portable system. In one embodiment, it is not necessary to operate the portable system disclosed herein in a fume hood.

The term "priming" when used in reference to a reagent flow channel refers to conveying a reagent through the flow channel connecting the reagent source and the reaction chamber, wherein the reagent flow passes a closed on-chip valve and flows via an open flow channel to a waste receptacle. In this fashion, when the reagent is to be added to the reaction chamber, the corresponding on-chip valve is opened and pneumatic actuation conveys the reagent from the primed flow channel into the reaction chamber with minimal delay.

In the alternative, when a flow channel is not primed, the reagent must travel the length of the flow channel from the reagent source to the reaction chamber, displacing the gas in that path through the reaction chamber and an open vent channel on the synthesis chip. This can lead to losses of reagents or solvents, which is avoided by priming the flow channel. Analogously, when appropriate, the term 'priming' can be used in reference to a solvent flow channel. An alternative priming technique involves moving the reagent from the reagent vial up to the reactor while displacing the gas out of the line in front of the reagent into the waste but not letting the reagent go to waste (accomplished with a 3-way valve mounted on interface base). When the reagent is needed ion the reactor, this valve is switched to deliver the entire volume (not a fraction) of reagent to the reactor with minimal delay and without pushing gas through the reactor.

The phrase "pre-packaged disposable reagent cartridge" or "reagent cartridge" refers to an apparatus or device designed to fit removably and interchangeably into or onto an automated system described herein. The reagent(s) held within the cartridge, after fitting the cartridge into the system described herein, can be conveyed to the chip or reactor or reaction chamber. When appropriate for the preparation of a radiolabeled compound, the reagent cartridge may contain solvents as well as reagents. Alternately, solvents may be provided separately from the reagents. Reagent kits may comprise various number and type of reagent cartridges.

Various prototype components of the system described herein are disclosed in International Patent Application No. PCT/US2008/060267 published as WO 2008/128201 and U.S. patent application Ser. Nos. 12/011,220 and 12/102,822, which are hereby incorporated by reference in their entirety.

The present invention (one embodiment of which is illustrated in FIG. 1) relies on an instrument which is split into two separate units: a "hot box", for example, 10, which contains all radiation-handling components, and a separate "cold box" such as, for example, 12 containing all electronics, reagents and pumps (everything that does not handle radiation directly). The two units are connected via an approximately 20-feet bundle of cables and tubing 14. The bundle of cables and tubing connecting the "hot" and "cold" boxes is equipped with a Safety Radiation Detector (shown as part 272 in FIG. 17*c*).

The hot box can be either encased in its own shield (as shown in FIG. 3), or can be placed into a mini cell with optional additional hot boxes (as shown in FIG. 1), Either option allows protection of electronics from radiation and remote access to reagents without user exposure. Also the footprint of the instrument occupying shielded area is minimized such that one can fit 3 instruments such as, for example, three copies of instrument 10 in one mini-cell 16 side by side. The instrument is designed such that escape of radiation out of the hot box is not possible during normal operation. And for the cases of abnormal operation, there is an automated response system which stops all transfers if an unwanted release is detected. It is conceivable that one cold box such as 12 can be used to control multiple hot boxes such as 10.

Figure 2:
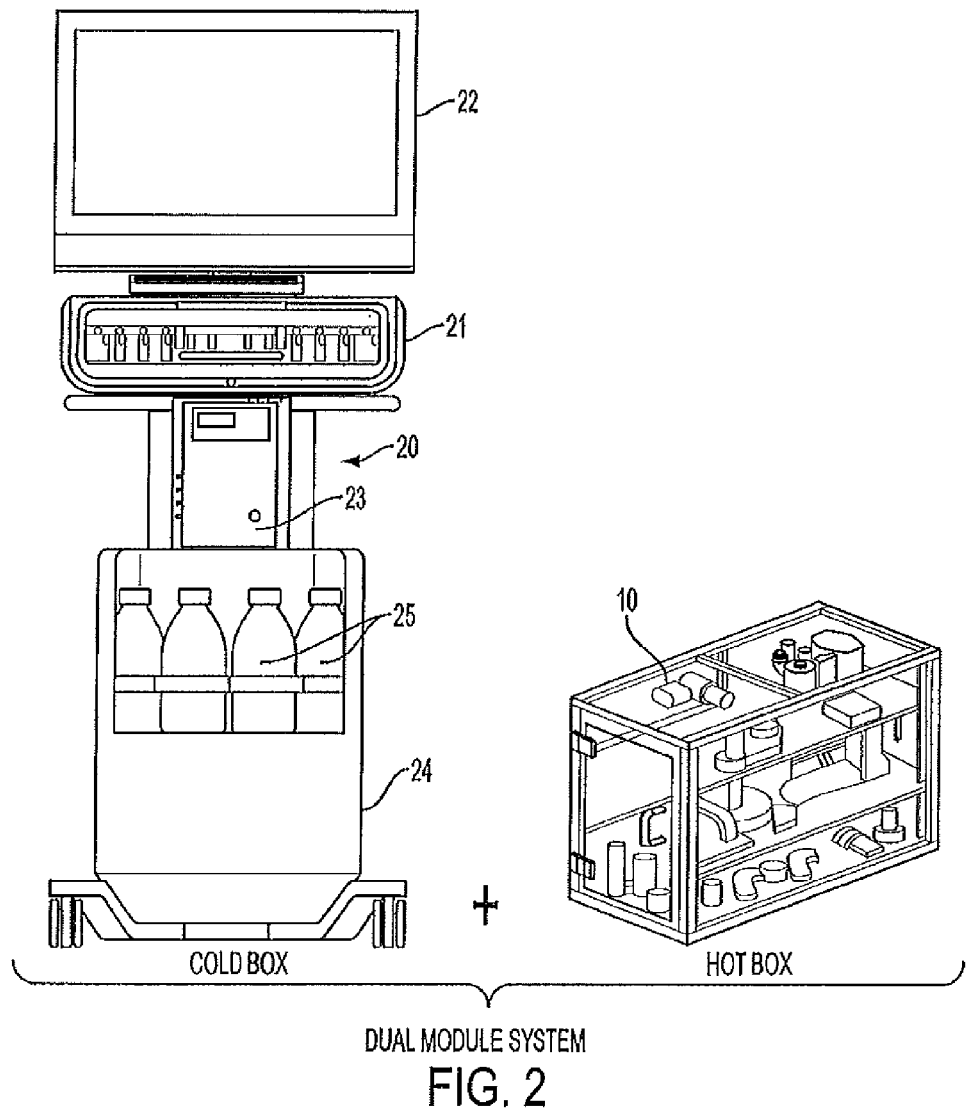
FIG. 2 illustrates an exemplary Dual Module System.
Figure 13:
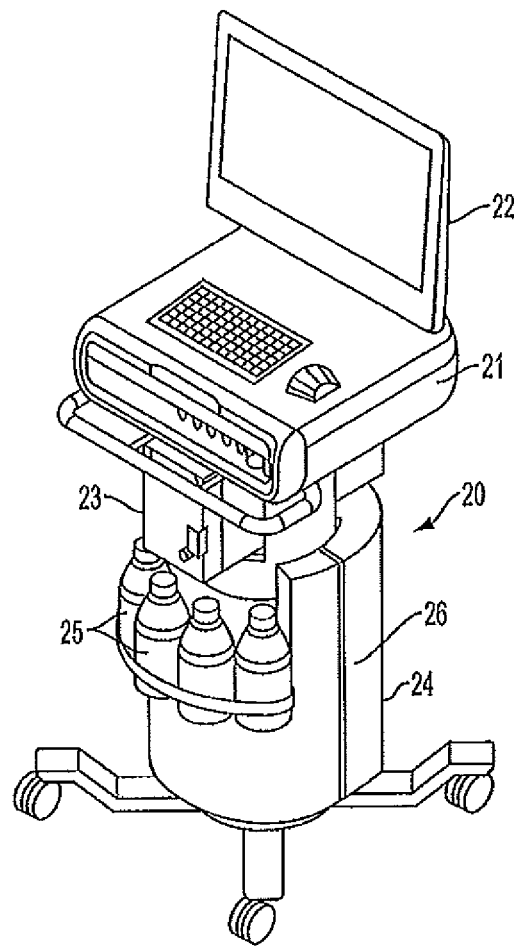
FIG. 13 illustrates an exemplary "Cold Box" assembly.
Figure 14:
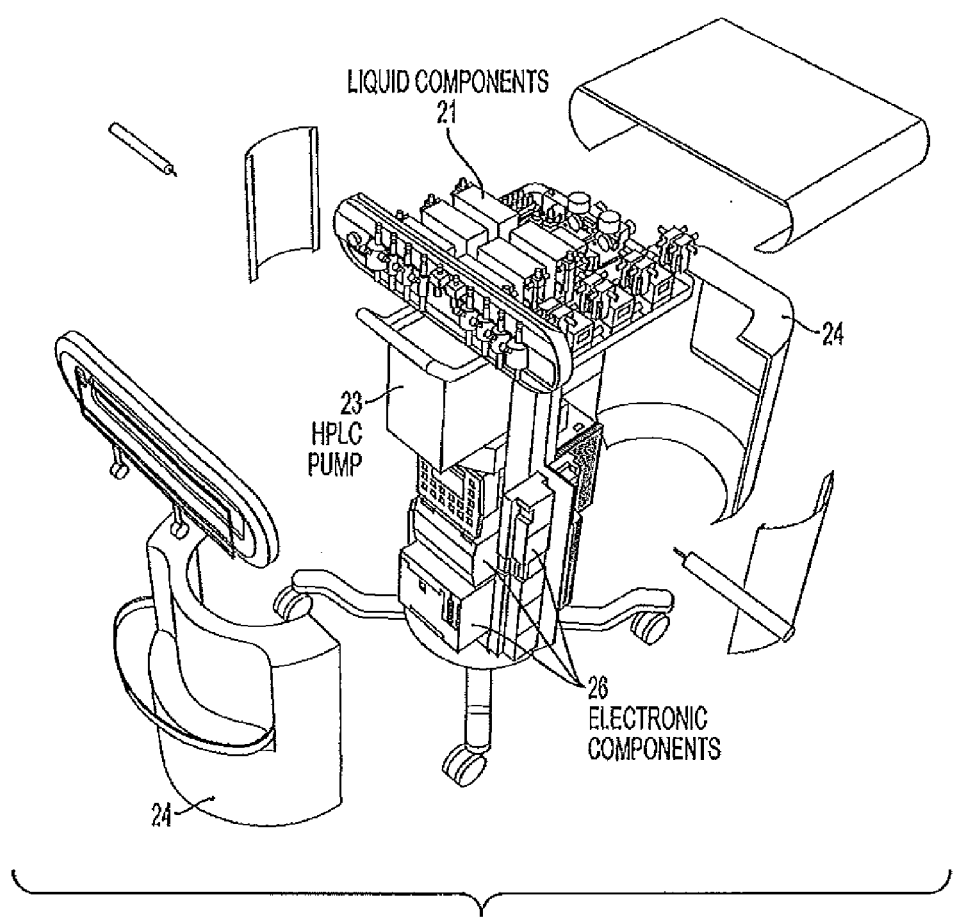
FIG. 14 illustrates a partial inside view of an exemplary cold box.
Figure 15:
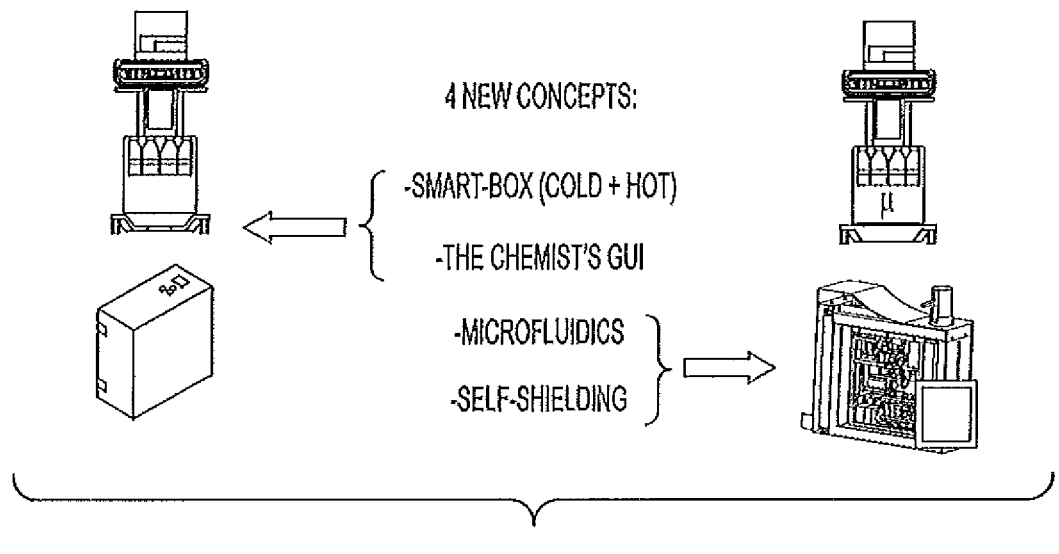
FIG. 15 shows examples of concepts separated between the exemplary instrument configurations A (left) and B (right).

Another embodiment of the present invention is directed to dual module "Hot Box-Cold Box" Instrument (FIG. 2). As shown in FIG. 2, the hot box 10, can be a self-shielded unit containing all radiation-handling components. The cold box 20 comprises a liquid handling components 21, a PC 22, an HPLC pump 23, and a compartment 24 containing reagent bottles 25 on the outside and all electronic components inside (not shown here, but shown as part 26 in FIG. 14). An alternative view of the cold box is shown on FIG. 13 and a partial inside view of an exemplary cold box is shown in FIG. 14. FIG. 14 shows liquid handling components 21, HPLC pump 23, and electronic components 26, protected by front and back covers of compartment 24. As shown on FIG. 3, the micro-cell shield 30 is equipped with an interlocking pig device 32 (shown in more detail in FIG. 4), which is used for delivery of raw isotope to the hot box 10 and to collect the product from the hot box without user exposure. When using such device in order to transfer activity, the user does not need to open the pig or the shield.

Another embodiment of the present invention is directed to "Cold Box" containing electronic equipment and non-radio-active reagents (FIGS. 13 and 14), and which is easy in exploitation and safe to the user.

Figures 3, 17A:
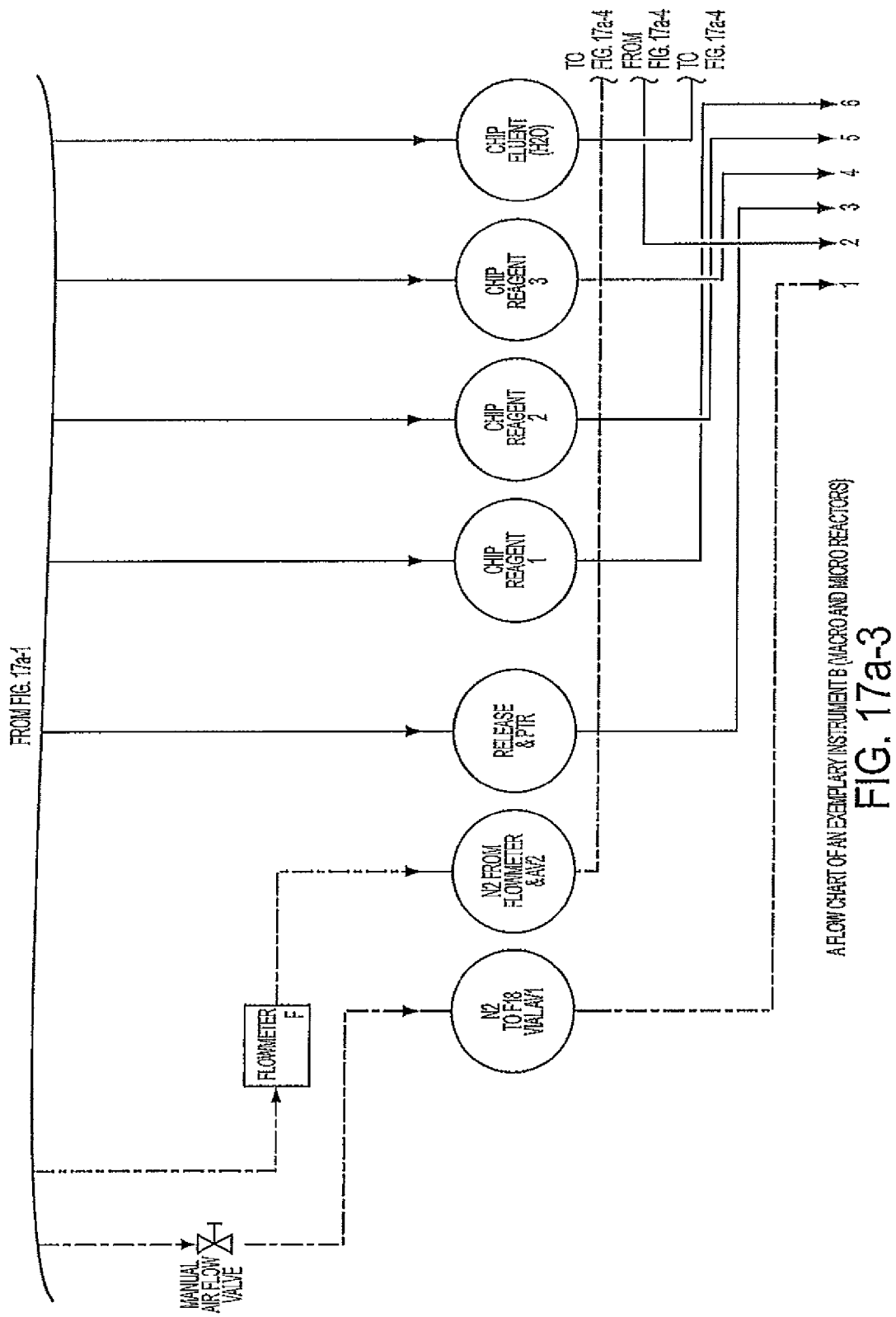
FIG. 17a illustrates a flow chart of an exemplary Instrument B (macro and micro reactors).
Figures 4, 17A:
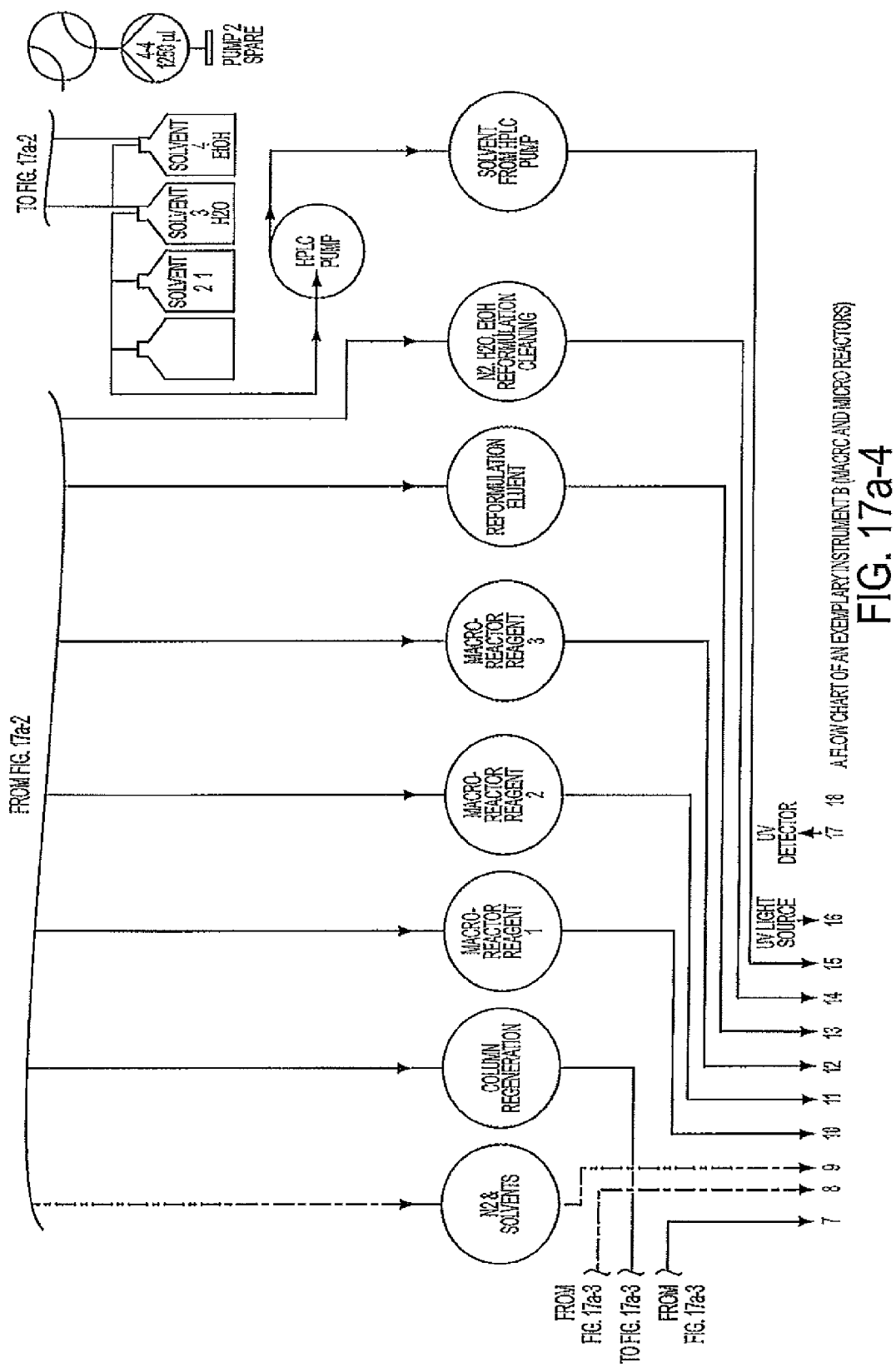
Figures 8, 17A:
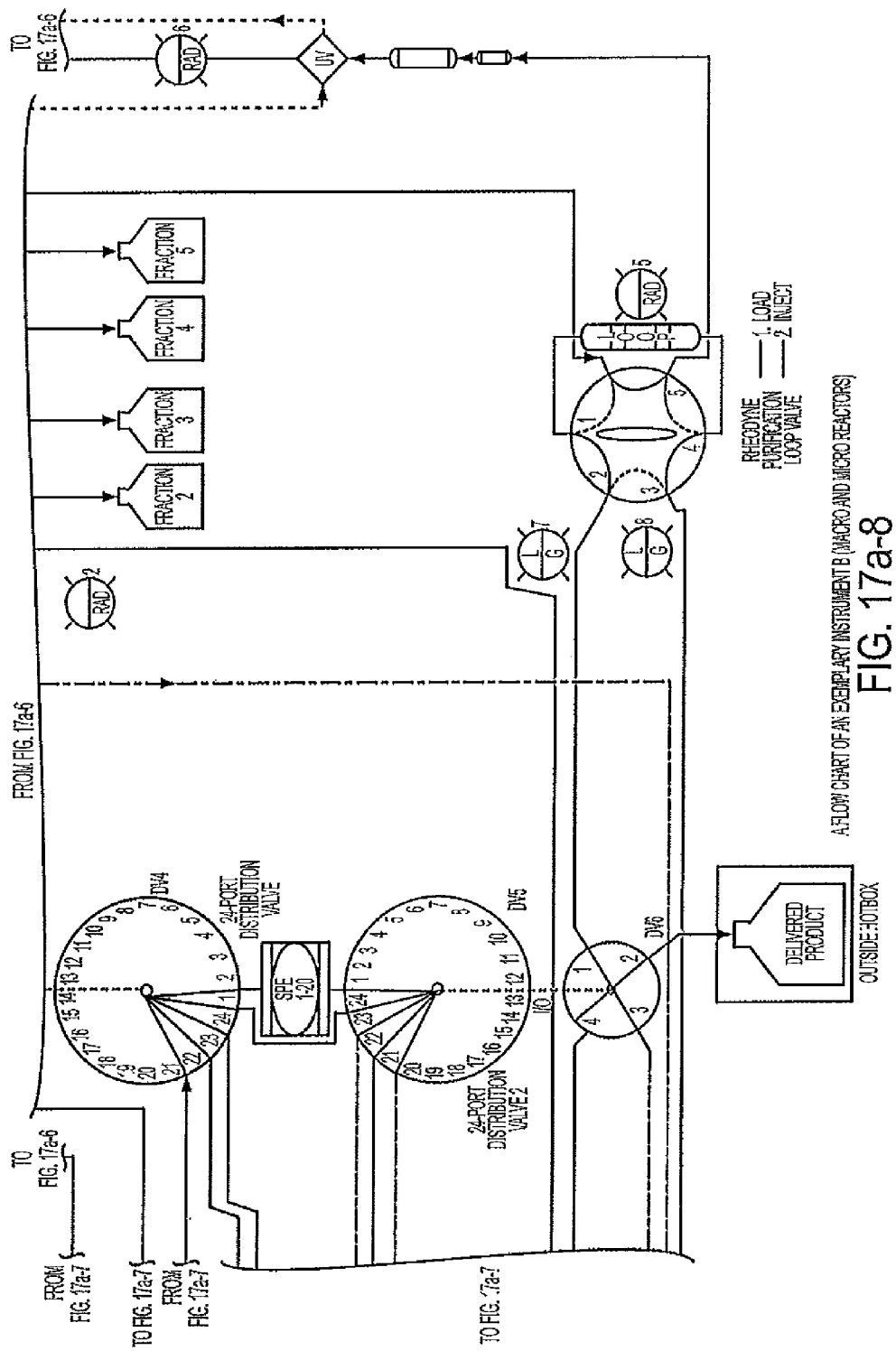
Figures 1, 17B:
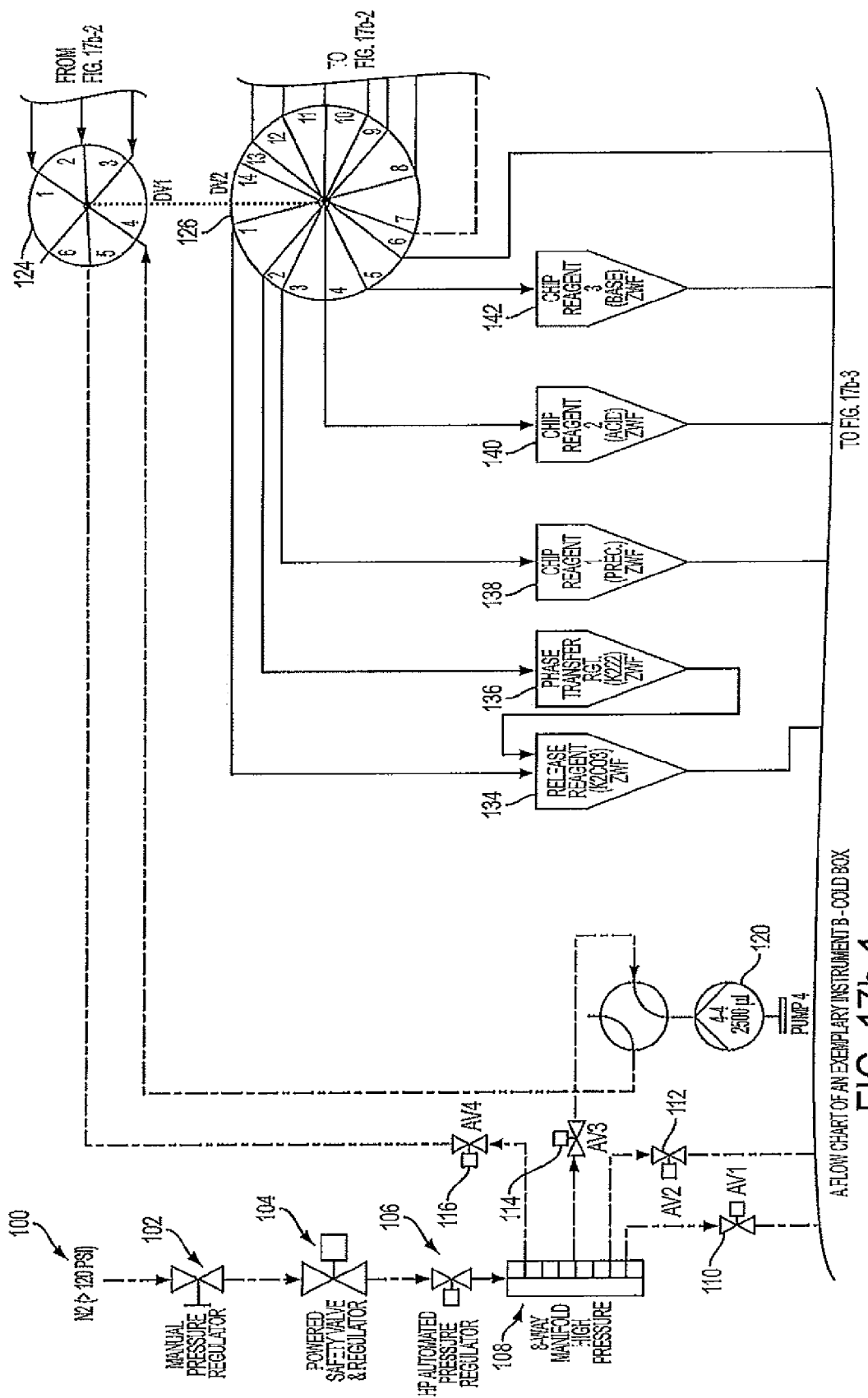
FIG. 17b illustrates a flow chart of an exemplary Instrument B-Cold Box.
Figures 2, 17B:
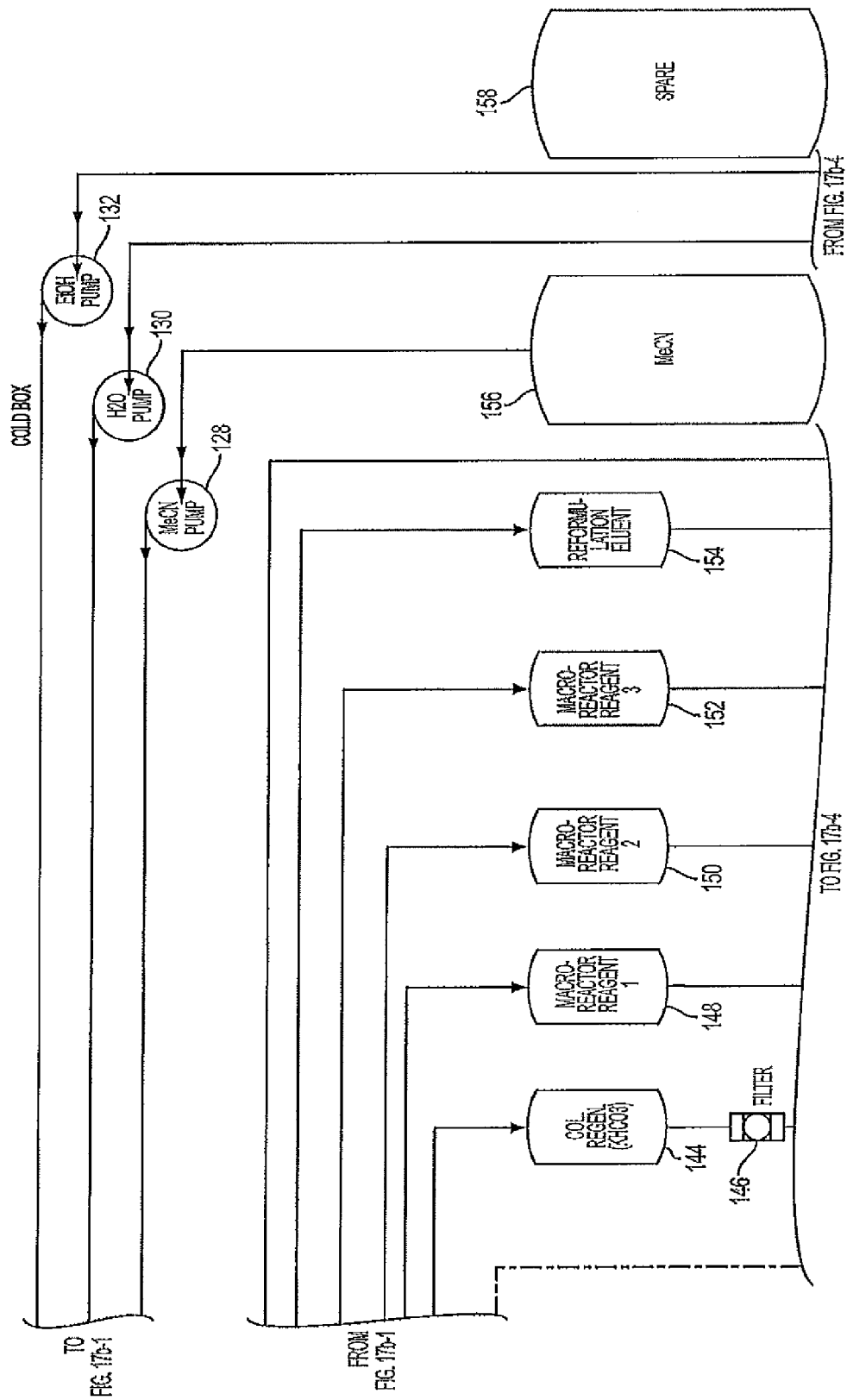
Figures 3, 17B:
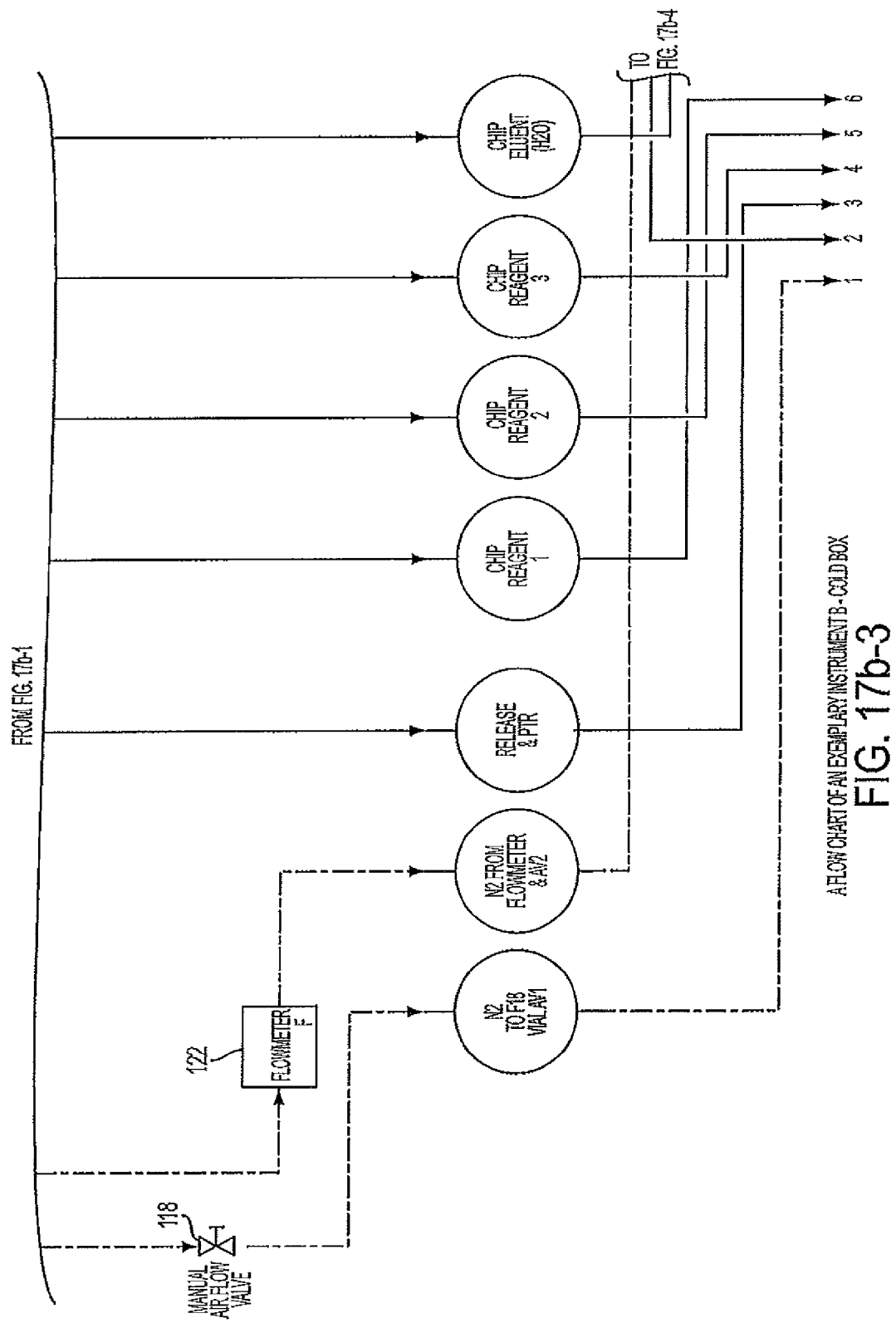
Figures 4, 17B:
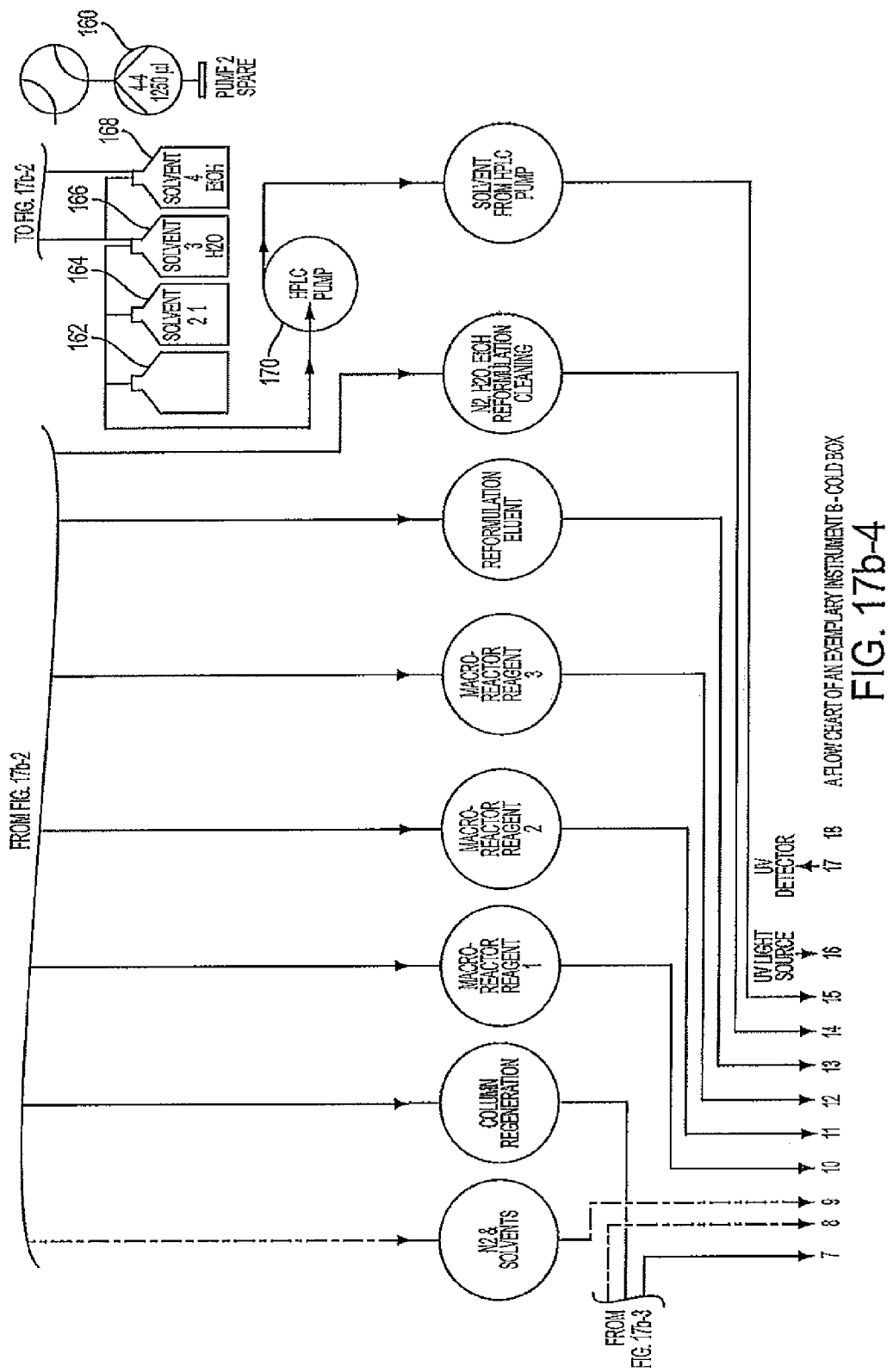
Figures 1, 17C:
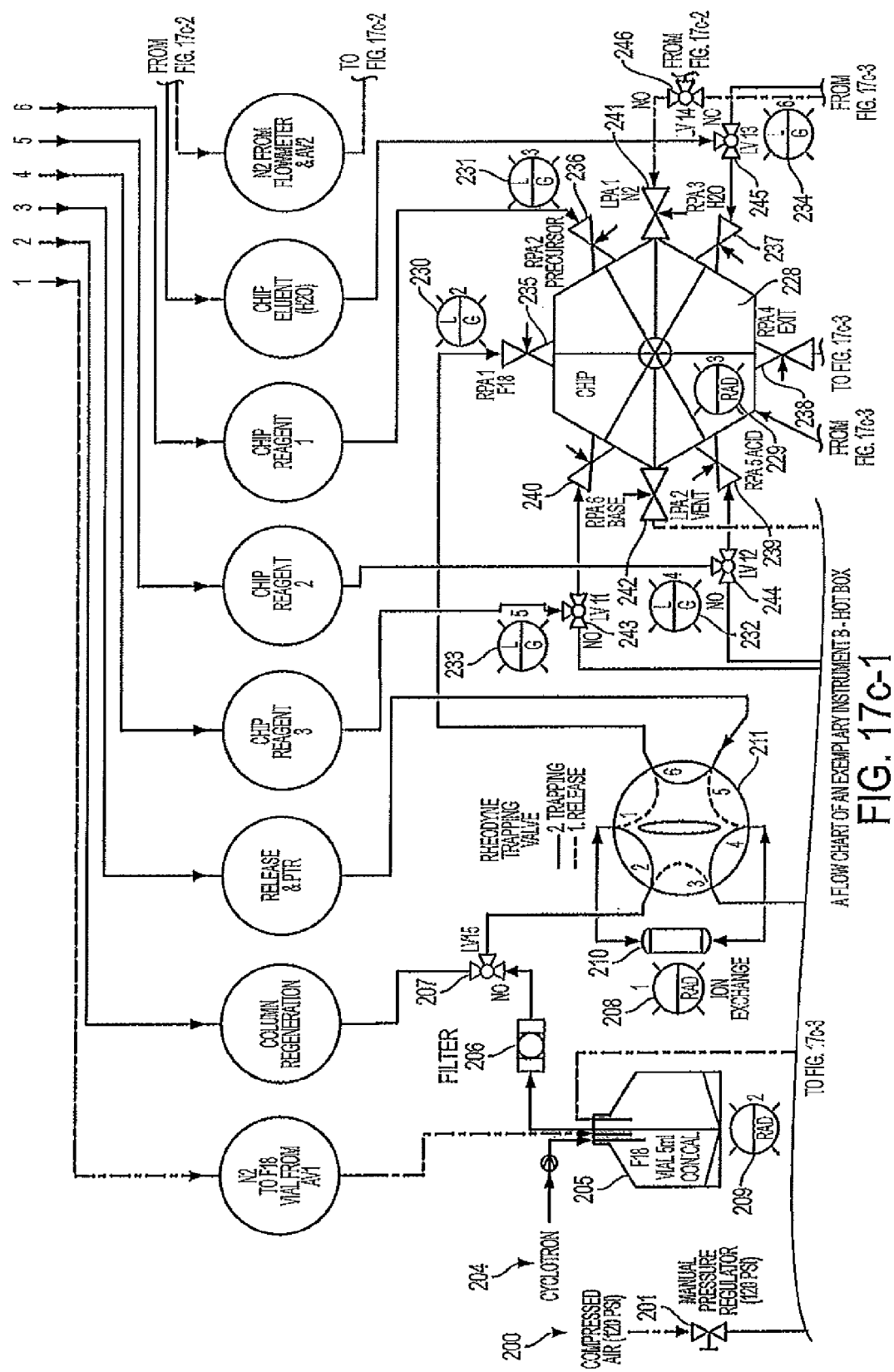
FIG. 17c illustrates a flow chart of an exemplary Instrument B-Hot Box.
Figures 2, 17C:
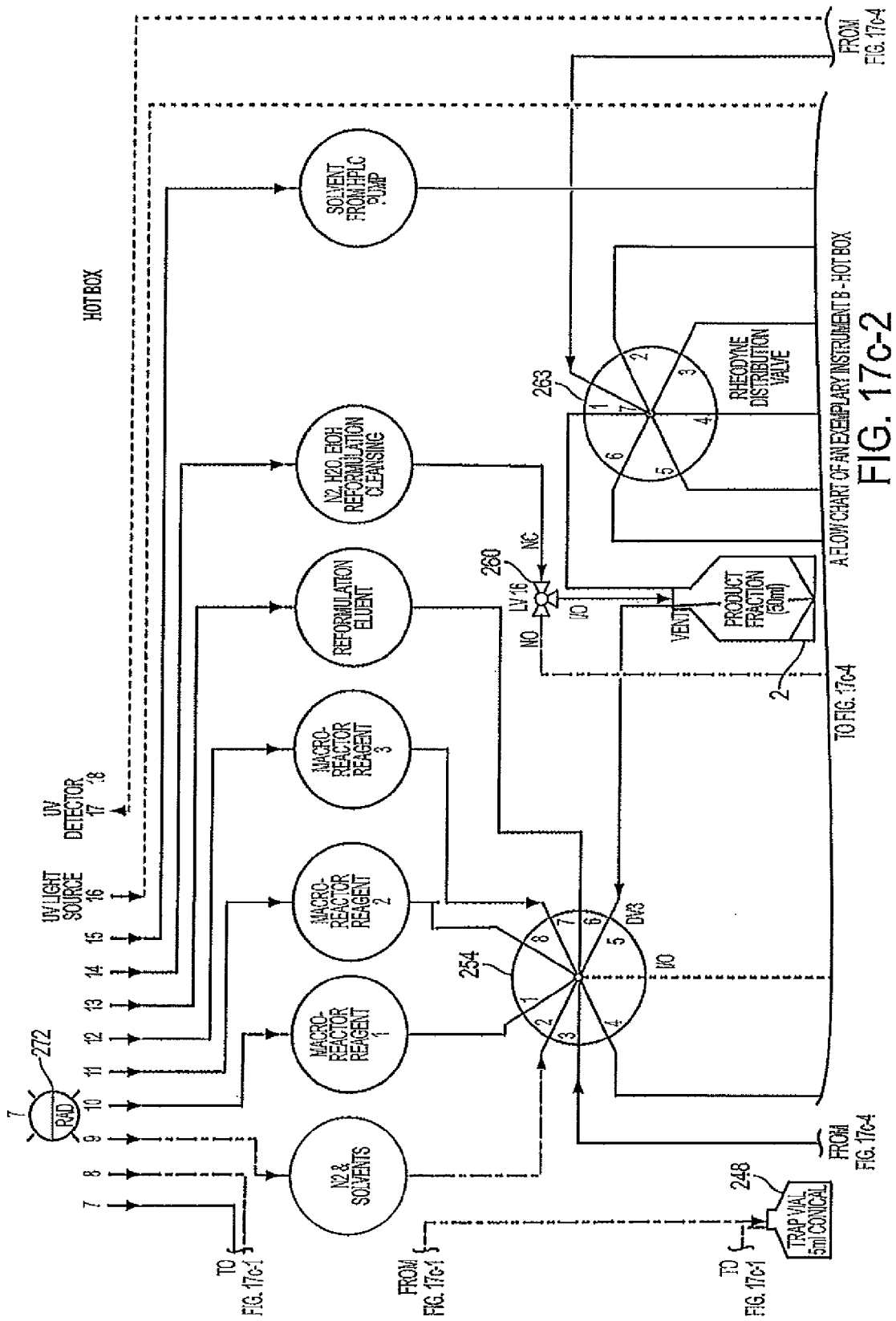
Figures 3, 17C:
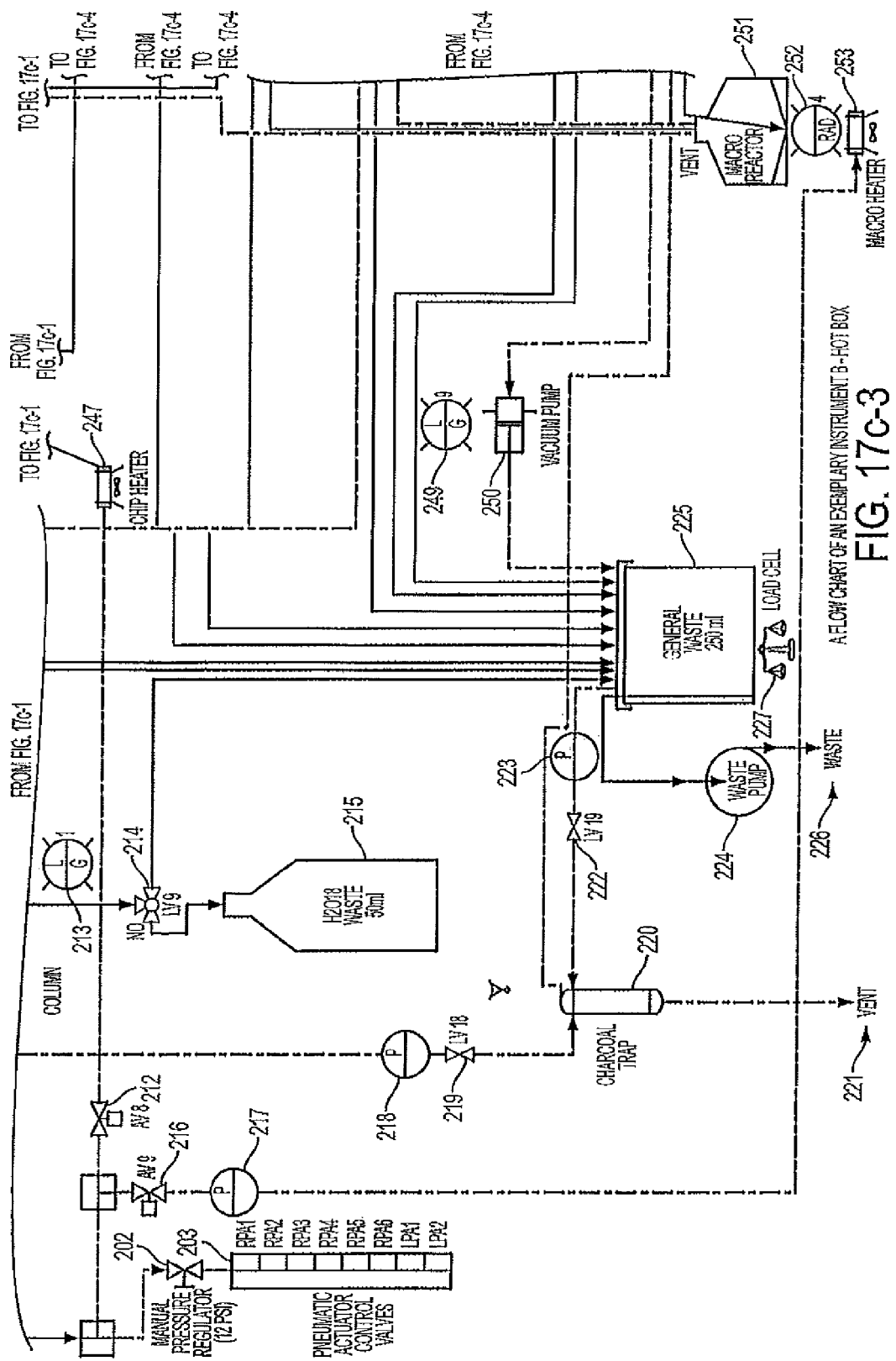
Figures 4, 17C:
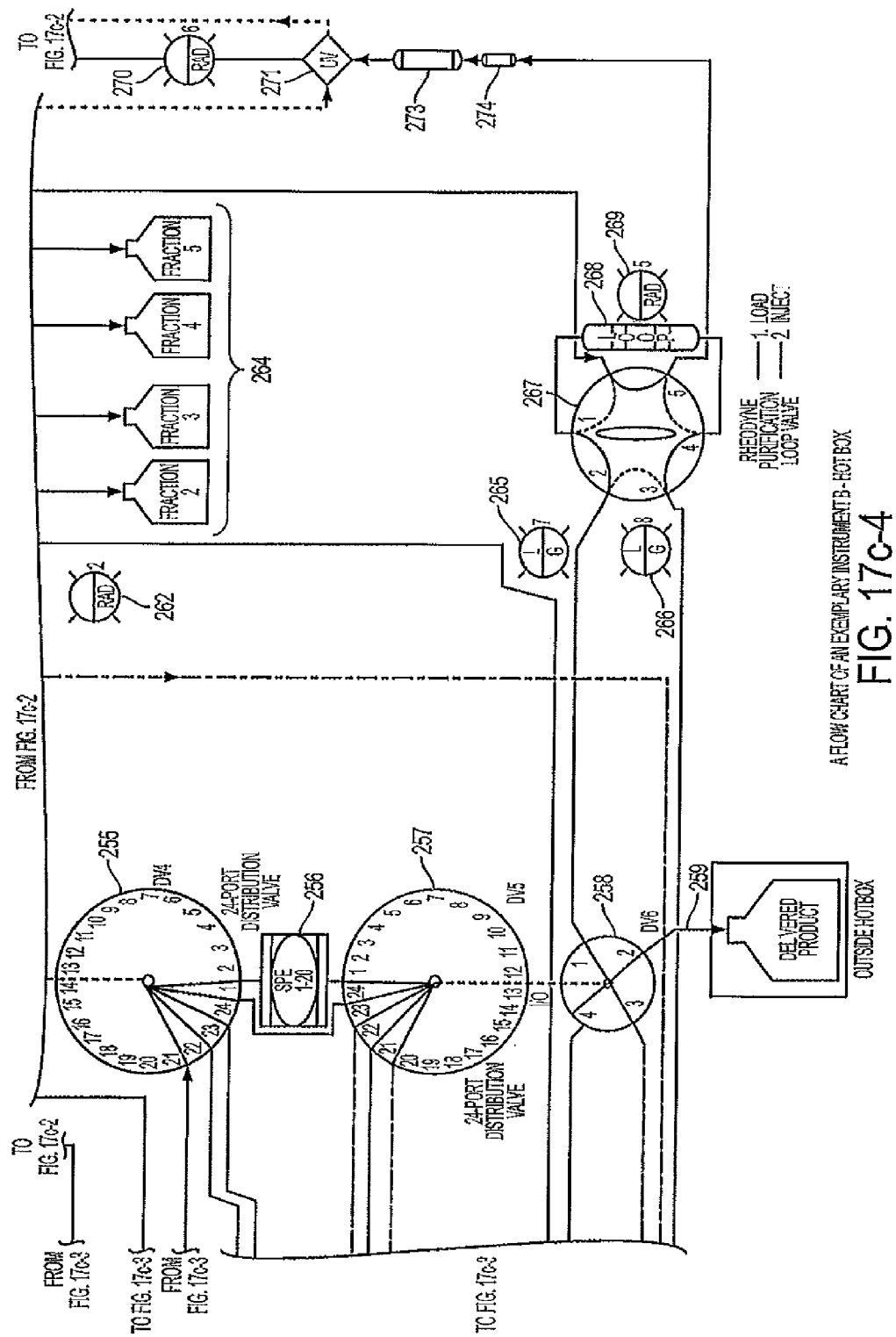

Other embodiments are directed to the following features of the present invention:

Ion exchange column (an example of which is shown as component 210 in FIG. 17c). Most frit materials lead to either clogging of frits or significant variation in back pressure, or retention of F-18 fluoride. The current invention resolves this by using fits made out of glass. They provide low flow resistance and do not clog. The use of glass frits on ion-exchange columns allows uniform pore size, inertness and robustness unlike metals, PEEK, PE and other traditional choices.

Trapping/release of F-18 fluoride. During release $K_2CO_3$ solution is passed through the column. As it enters the column the back pressure is low, but extra pressure needs to be generated behind the release solution in order to push it through the column. The solution comes out of the column slowly, but as soon as the last portion of liquid is out, the back pressure vents through the column accelerating the solution towards the chip rapidly. In order to avoid rapid uncontrolled entrance of the release solution into the chip, an expansion tube was added to the instrument. This is about 6-feet and about 0.030" ID line placed between the column and the chip. The release solution travels rapidly through this tube until the back pressure has been released (which happens before the solution reaches the chip.) Then the Loop valve controlling UE column is switched from Release to Trap and more gas is dispensed into this line. But this time it does not have to go through the column and overcome its resistance. It can drive the release solution into the chip in a controlled manner (by dispensing a known volume of gas at a known rate with a syringe).

Whether or not the expansion tube is used, some F-18 usually remains in the plumbing between the column and chip, and some even on the column. In order to maximize the use of F-18, the new instrument as described herein sends the K222 solution behind $K_2CO_3$ through the same lines and I/E column to mop up the remaining F-18. (In the earlier systems K222 was added to the reactor through its own dedicated line. In some macro reactors K222 and $K_2CO_3$ solutions are mixed prior to release, which significantly impairs the efficiency of release and requires large volumes.)

Figure 6:
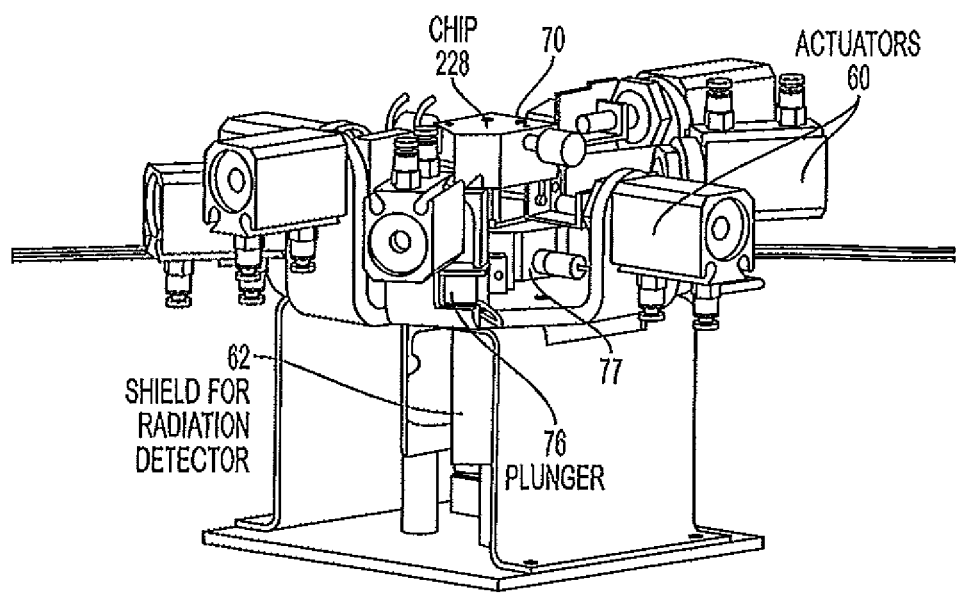
FIG. 6 illustrates an exemplary micro reactor assembly.
Figure 7A:
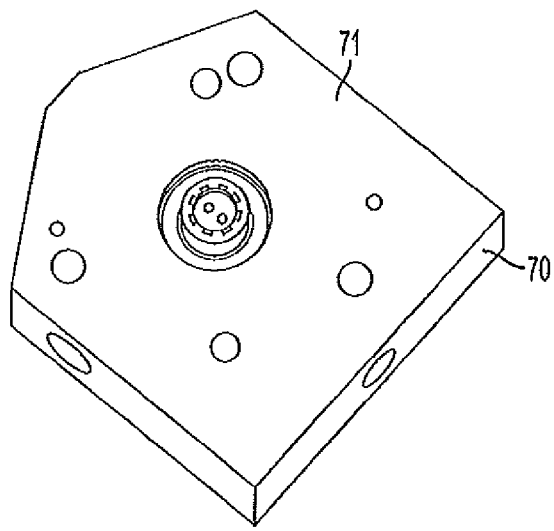
FIG. 7a illustrates an exemplary inverted lid with features on the ceiling that prevent escape of liquids into the vent ports by surface tension.
Figure 11:
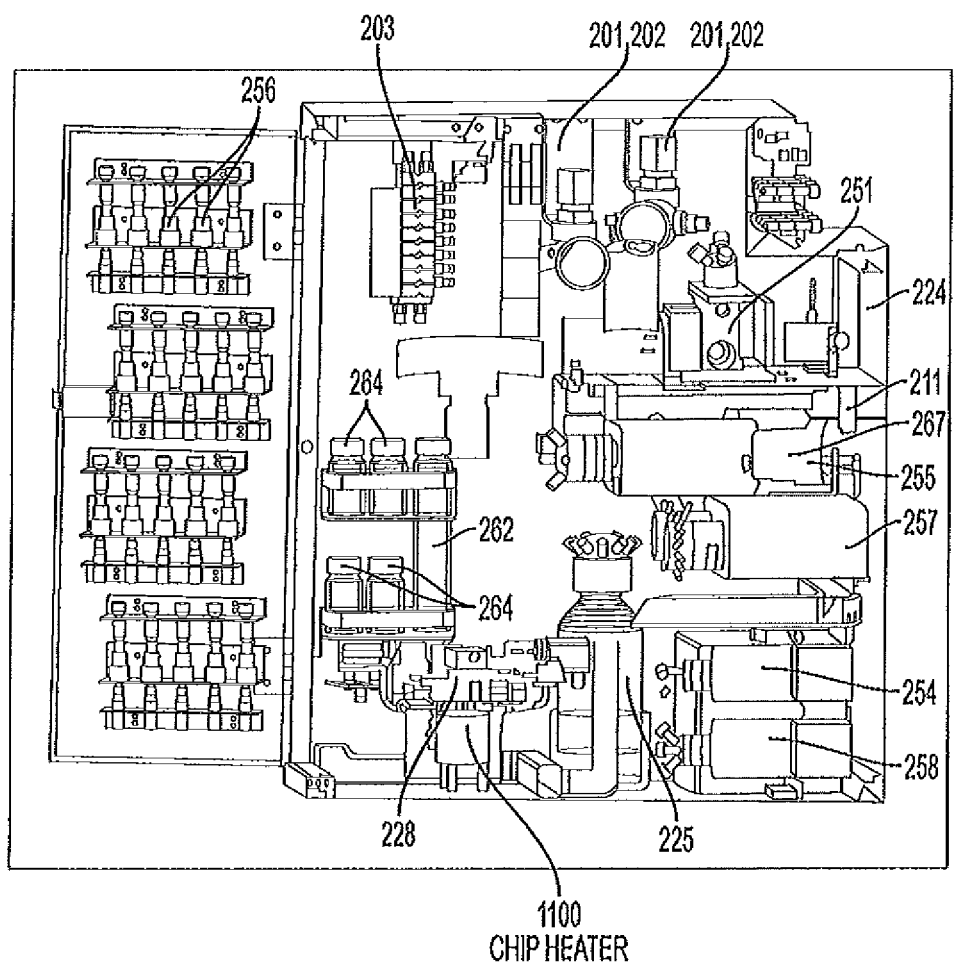
FIG. 11 illustrates a cross-section view of the exemplary hot box.

Chip: An exemplary chip assembly is shown as a part of the hot box assembly in FIG. 5a (component 228, as also shown in FIG. 17c) and as a separate component in FIG. 6. Unwanted loss of liquids into the vent during drying or filling is now prevented with a vertical step coupled with a ring arrangement of posts on the ceiling 71 of a chip lid 70 (FIG. 7a). FIG. 7a shows the inverted lid 70 with features on the ceiling 71 that prevent escape of liquids into the vent ports by surface tension. These provide barriers for liquid on its way to the vent ports that are stopping this liquid by surface tension. The liquid needs certain threshold velocity in order to overcome a 90-degree corner, which is much higher than that necessary to move liquid along a flat surface. This lid chip may be made of glass, Teflon™ AF, Ultem, pDCPD or other inert and at least partially transparent material. Non-transparent materials may also be used, but they may reduce visual monitoring of reactor contents. Some of the part of the exemplary microreactor assembly (also part 228 in FIG. 17c) are shown in FIG. 6: 8 chip actuators 60 (some partial view only), 3 plungers 76 (some not shown), microfluidic chip having lid frame 70 and interface base 77 (other parts not shown), and shield for Radiation detector (not shown). Chip assembly 228 can be also seen in FIG. 11, also showing the location of a chip heater 1100.

UV signal: In order to minimize space and cost, the expensive UV light source coupled to the flow cell via an optic fiber has been replaced with an LED of a given wavelength connected directly to the flow cell. In another embodiment of the present invention a variable-wavelength UV light source is coupled to the flow cell via fiber optics.

Figure 7B:
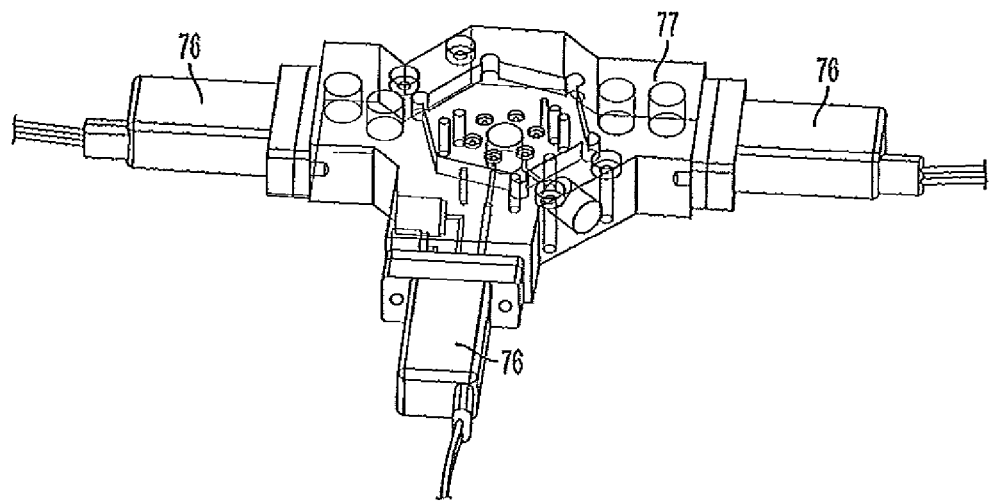
FIG. 7b illustrates a new interface base allowing off-chip priming of reagents close to chip.

Bypass plungers. Bypass plungers 76 (FIG. 7b) have a tendency to clog the priming lines. Since priming involves using excess solutions, loss of 10-100 µL of these solutions (solvents, acid, base) does not have a large impact. The on-chip valves are 2-way valves and the interface base is equipped with SMC (or other) 3-way liquid valves that are used for priming (FIG. 7b). FIG. 7b shows a new interface base 77 (also shown in FIG. 9) allowing off-chip priming of reagents close to chip. On-chip priming can be used in order to avoid the need to move massive amounts of gas in front of reagents through a partially filled reactor (see part 90 in FIG. 9). While the current invention involves moving gas in front of liquid, that volume is minimal (5-20 µL) and constant every time because the long multi-foot lines are primed with liquid.

Another embodiment of the present invention relates to the chip comprising soft plunger tips in it that mate to metal plungers that stay permanently within the instrument. Such soft plunger tips are multi-use consumables.

Dryness monitoring. Reactor dryness can be monitored by a flow meter (shown as part 122 in FIG. 17b). If the flow meter is placed in a gas line upstream of the chip, the user will watch for the flow rate to increase once the chip is free of solvent vapors. If the flow meter is placed downstream of the chip, the user will watch for the flow to decrease once the vapors are gone.

Material. pDCPD tends to acquire brown color after just a few runs with acid or high amounts of radiation. Telene® pDCPD is a polymer based on polydicyclopentadiene (PD-CPD). Besides going to glass chips, it is also possible to extend the lifetime of pDCPD chips by parylene coating. Parylene is the tradename for a variety of chemical vapor deposited poly(p-xylene) polymers used as moisture barriers and electrical insulators. Among them, Parylene C is the most popular due to its combination of barrier properties, cost, and other manufacturing advantages. Parylene is a green chemistry, which is self-initiated (no initiator needed) and un-terminated (no termination group needed) with no solvent or catalyst required. The precursor, [2.2]paracyclophane, yields 100% monomer and initiator and does not yield any by-products. Parylene C and to a lesser extent AF-4, SF, HT (all the same polymer) are used for coating printed circuit boards (PCBs) and medical devices. There are numerous other applications as parylene is an excellent moisture barrier. It is the most bio-accepted coating for stents, defibrillators, pacemakers and other devices permanently implanted into the body.

Chip exchange. The chip can be supplied with plunger tips inserted into it but without plungers. The plungers are a permanent fixture on the instrument. When the chip is inserted they are retracted and then actuated to "pick up" the new tips inside the chip. This reduces the cost of chips and simplifies chip exchange (each plunger does not need to be aligned with a corresponding "fork").

While conventional techniques applied heat transfer material to the top of the heater before inserting the chip, such process requires perfect alignment of the chip at all times during its insertion in order to avoid contamination of the interface with the heat transfer material or paste. A solution to this problem can be realized by using a syringe to dispense a precise amount of paste into the counter bore of the chip prior to insertion. That surface is unlikely to come in contact with anything other than the heater (and only at the final moment of chip insertion). It allows for aligning the chip as necessary during insertion without contamination.

Another embodiment of the present invention relates to the chip with pre-dispensed heat-transfer compound that cannot be accidentally smeared and cause contamination. The chip has a pocket which mates with the heater protrusion. Rather than placing the heat transfer material on the protrusion (where it can easily get smeared) the present invention places it within the pocket (hard to reach) where it is safe from contamination.

Chips can be pre-aligned manually or by an alignment device. Alternatively, there may be a self-aligning system where the non-aligned chip is aligned as it is inserted into the instrument. Also, it is possible to have a chip container (for shipment and storage) which either preserves the alignment, or even aligns a non-aligned chip.

Figure 8A:
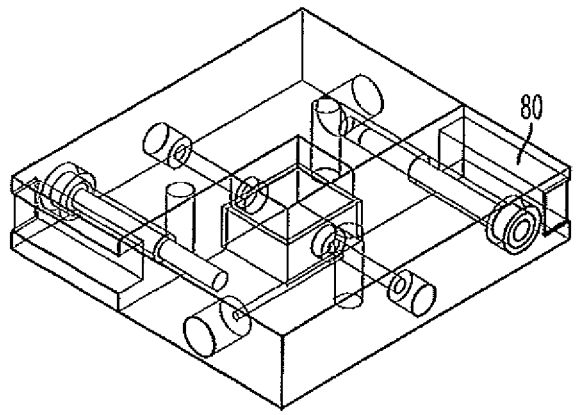
FIG. 8a illustrates an exemplary glass chip in a frame (assembled).
Figure 8B:
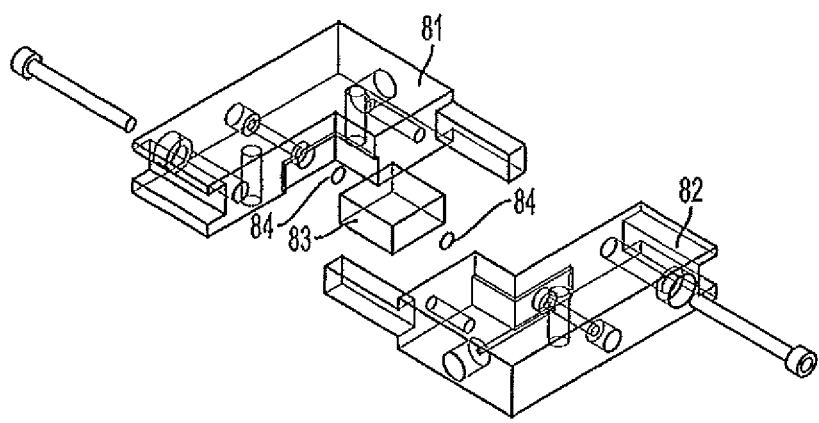
FIG. 8b illustrates an exemplary glass chip with a disassembled frame.
Figure 9:
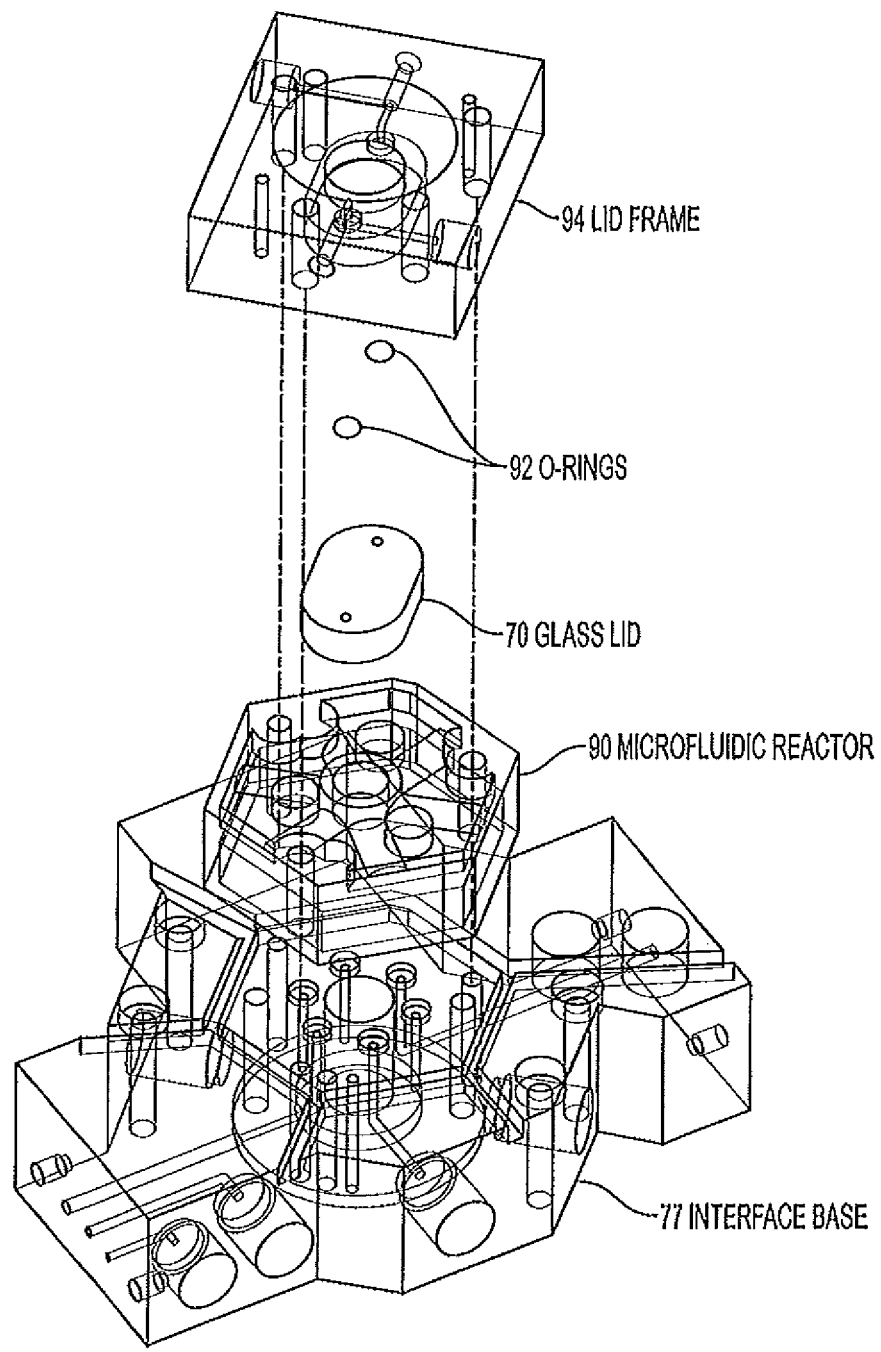
FIG. 9 illustrates an exemplary glass chip with a single-piece frame with a vertical seal.

Glass-PEEK chip. Polyether ether ketone (PEEK) is an organic polymer thermoplastic used in engineering applications. Whereas earlier applications mentions glass-PEEK arrangements, it does not show how to realize such an invention in case when valves are required in the chip lid. This arrangement requires an exemplary frame 80 to be split into 2 parts 81 and 82 which sandwich the chip 83 between them and seal with it via 2 o-rings 84 (the two parts are bolted together to hold the chip (FIGS. 8*a* and 8*b*). An alternative solution is to use the bolts that hold the chip down to create the seal. In order to realize this, the ports coining out of the glass part have to be vertical and reach the top surface outside the window necessary for viewing. Then the frame can be bolted down on top of the glass and seal vertically. This makes frame one piece, which leads to a more uniform sealing. Another exemplary full chip assembly including interference base 77, microfluidic reactor 90, glass lid 70, 2 o-rings 92, and lid frame 94 are shown in FIG. 9.

Method of evaporation. The evaporation is fast when the solution touches the heated floor of the reactor, and slow at the last stages when the condensation has to be removed from the ceiling. Best evaporation method involves low pressure in the beginning (in order not to suppress heat-driven evaporation). Once the liquid is off the reactor floor the pressure can go up and drive evaporation off the ceiling forward by high flow.

Release solution. A tube filled with multiple slugs of $K_2CO_3$ followed by a pre-measured amount of K222 can be used as a consumable in every run. This removes 2 syringes from the system, assures repeatability and simplifies the process. This tube is loaded off-instrument and replaces the corresponding reagent vials (which cannot host multiple 1-μL fractions of solution).

As shown in FIG. 14, HPLC pump is a part of the cold box. It handles only solvents (large volume, non-reactive entities).

According to one of the embodiments of the present invention, one cold box may run multiple hot boxes. Previously, even when the HPLC pump was placed outside the radiation-handling equipment, it was not configured to support multiple sets of "hot" purification systems.

Figure 12:
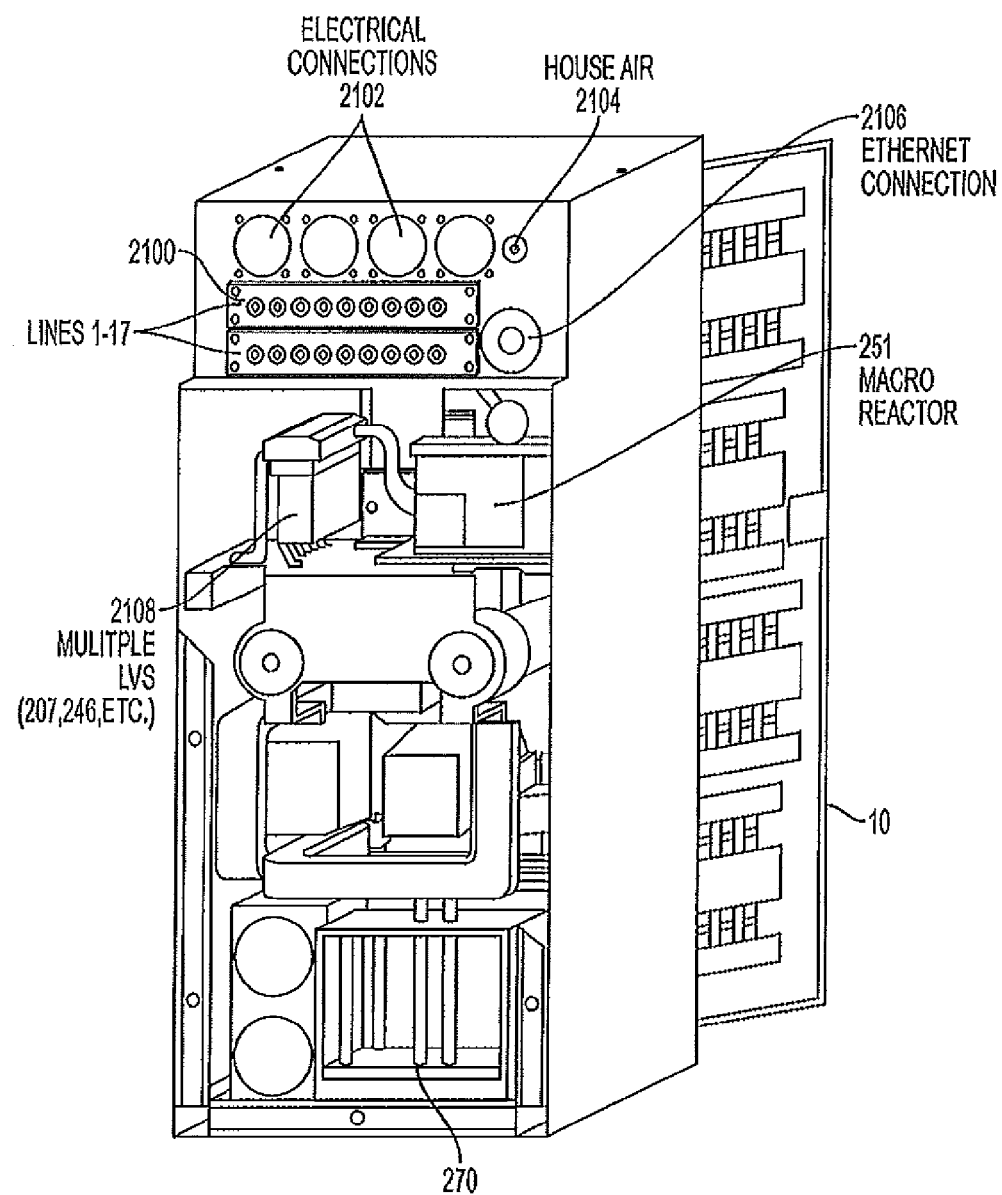
FIG. 12 shows an alternative cross-section of the exemplary hot box (from the back).

As shown in FIG. 12, the back side of the hot box 10 has a panel 2100 of outlets and for inlets connecting the cold box to the hot box via lines 1-17 (18, 19-spare), ports 2102 for electrical connections, port 2104 for house air, Ethernet port 2106. From this view, an HPLC radiation detector 270 and multiple liquid valves 2108 (LVs, such as 207, 246, etc.), and the micro reactor 251 can be seen.

Previously reagents have been typically handled inside the same unit handling radiation-related components. The instrument as disclosed herein represents a new feature, where radiation-handling components are located in the separate hot box and non-radiation-related components are combined in the cold box, wherein the hot and cold boxes are coupled via a bundle of cables and tubing. It has not been previously shown that the entire synthesis instrument alone (not just without purification) can be split into the stand alone hot and cold units connected by cables and tubing.

Furthermore, the instrument as disclosed herein is distinguished from the instruments with "localized shielding" (compartments of one instrument are individually shielded within such instrument). Localized shielding does not allow high-scale runs. Splitting the instrument into two units and placing the hot box into a mini-cell allows multiple high-scale runs without user exposure to radiation.

It has been discovered that breaking up the release solution into multiple boluses increases the efficiency of release. If one bolus is sent through a tube packed with glass beads, the train of multiple boluses separated by air bubbles comes out the other end. No valves or syringes are required to achieve this. Same volume of release solution works much more efficiently if it is broken into several gas-separated droplets (boluses) than as one continuous bolus. It releases more F-18 off the column. It has been discovered that a single bolus can be broken into multiple (irregular but still just as effective) boluses by passing it through a column of packed glass beads with no valves since the liquid picks up air bubbles stuck between the beads. The important factor is the number of gas/liquid interfaces rather than the uniformity of boluses.

Embodiments of the present invention allow multiple sequential high activity mini-cell-based runs with the benefits that are typically realized with low activity self-shielded runs in previous devices.

Embodiments of the present invention draw extra advantages from parallel processing. For example, a reagent may be primed while evaporation is ongoing.

One of the embodiments of the present invention is directed to a self-shielded instrument where the entire hot box is encased into a shield and there is no shielding required for the cold box, which is a separate unit connected to the hot box via a bundle of cables and tubing. The instrument comprises two or more units. The instrument according to one of the embodiments of the present invention is also conceptually different from the instruments with "localized shielding" which implies shielded compartments within one instrument.

In case of leaks out of the chip, the new invention protects the Peltier device by a special basin for collecting unwanted liquid on top of it.

One of the embodiments of the present invention relates to the instrument capable of handling the entire process from target water to purified injectable product which fits into a hot cell. Most of the users prefer to use mini-cells. Commercial macro-scale instruments can be small enough to fit into mini cells in a one-to-one arrangement. This invention allows a three-to-one arrangement where three instruments can simultaneously share one mini-cell.

Another embodiment of the present invention is directed to a self-shielded version allowing practical operation, which is safe for the user for about 500 mCi or less. The self-shielded hot box removed from the user becomes suitable for higher scales.

The self-shielded instrument of the present invention allows multiple runs without user exposure since the starting materials, solvent and other reagents are removed from the synthesis unit and are shielded from the radiation-handling components. Previously known instruments operated in a hot cell are the one-run instruments because in order to refill the reagents between runs, the user needs to enter the hot cell and receive a dose of radiation.

According to one of the embodiments of the present invention, electronic components (such as data acquisition boards) do not have to be replaced as frequently as they do not suffer damage from radiation as was previously seen with self-standing radiosynthesis systems. All electronic components are placed into the cold box unit of the instrument, which is moved about 20 feet from the unit operated in a hot cell (with large amounts of activity).

According to another embodiment, the instrument of the present invention overcomes the following drawbacks of the earlier introduced radiosynthesis devices:

The chips are susceptible to loss of liquid into the vents under certain conditions (which are abnormal, but occasionally possible).

Although release of F-18 from the ion exchange column is very efficient, a measurable amount of it (5-10%) may be lost in transit from column to chip.

The latter solution may enter the chip at different (uncontrollable) rates as it emerges out of the ion exchange column under pressure.

Bypass plungers are prone to occlusion of priming pathways after several uses. This leads to over pressurized lines and instrument failure.

In case of chip seal failure, the liquid escaping out of the chip runs down the heater block and into the Peltier unit causing it to burn out.

One of the most significant problems with previous systems was that when performing multiple high scale runs, the self-shielded unit (although designed for multiple runs) could only handle approximately 500 mCi of radiation and could not be placed inside a mini-cell for high activity runs because that would enclose the reagents inside the mini-cell and damage the electronics.

In order to address these issues the instrument according to various embodiments of the present invention, has been designed conceptually different.

Figure 10:
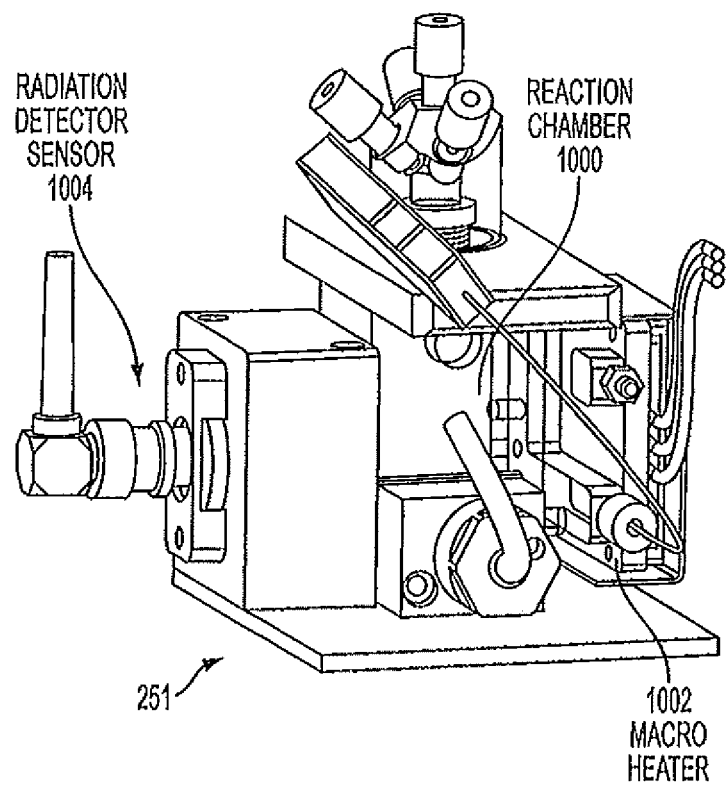
FIG. 10 illustrates an exemplary macro reactor assembly.

Another embodiment of the present invention relates to a device for automated radiosynthesis of a radiolabeled compound, comprising a self-shielded "hot box" with a macro reactor and a "cold box" containing the reagents' sources in fluid communication with the macro reactor, a gas and fluid delivery and removal network, and a controller adapted to control the operation of the network, An exemplary macro reactor 251 (see FIGS. 11 and 12) is also shown in FIG. 10 as having a reaction chamber 1000, macro heater 1002, and radiation detector sensor 1004 (other parts are not referenced in this figure).

In another embodiment, the system further comprises a camera for monitoring a reaction chamber within the microfluidic chip or macro reactor.

Figure 5A:
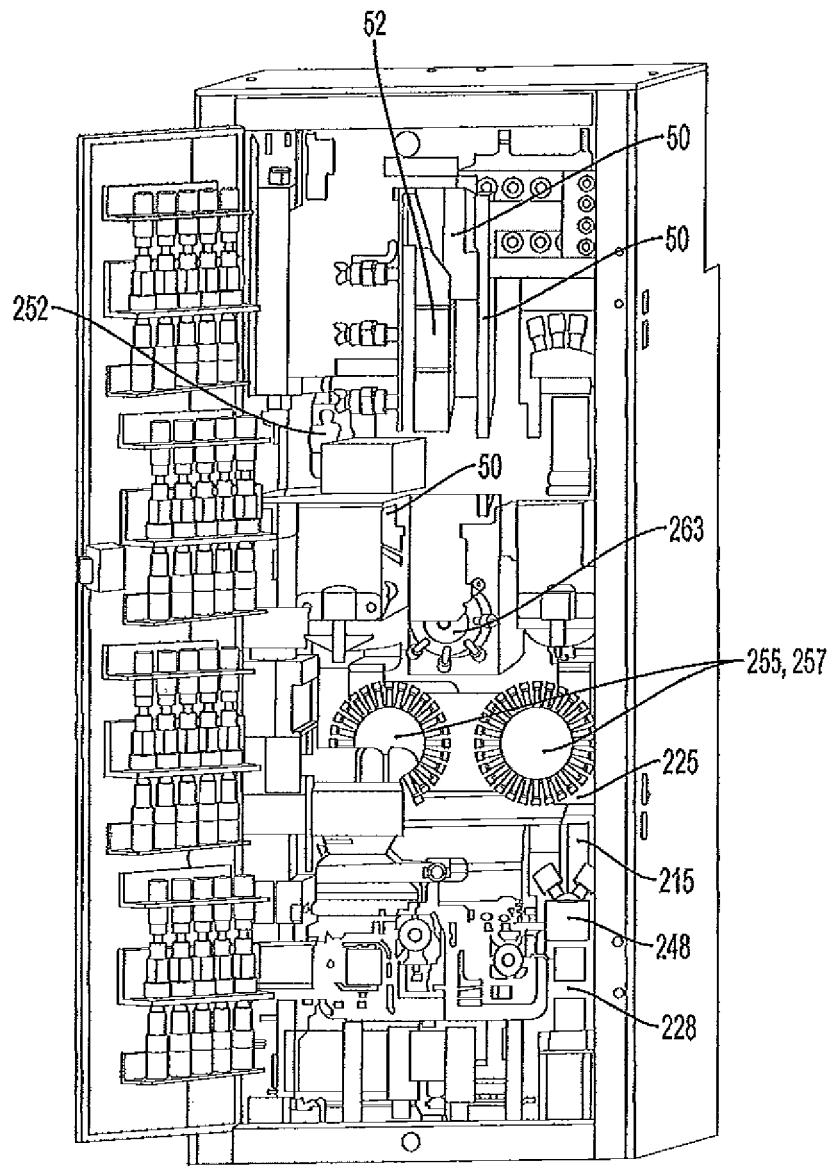
FIG. 5a illustrates the inside view of the exemplary hot box (with door open).
Figure 5B:
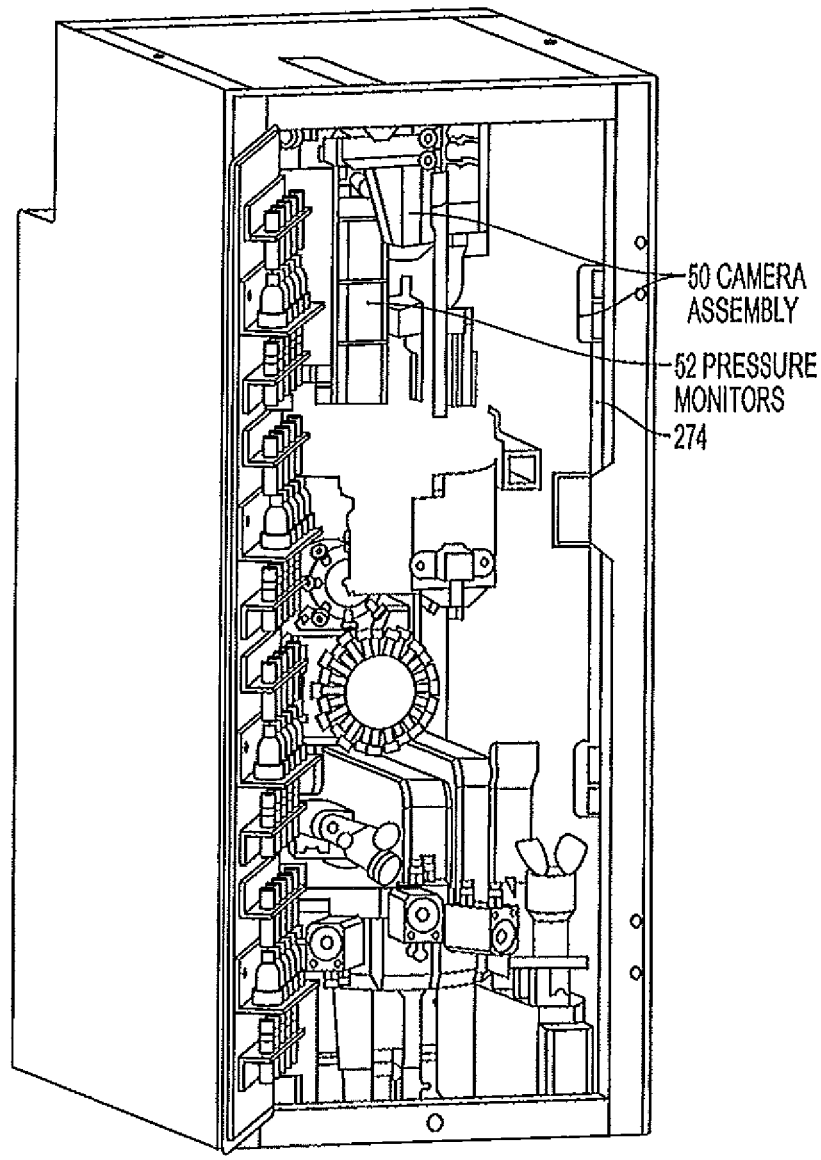
FIG. 5b illustrates an additional inside view of the exemplary hot box showing HPLC column (on the right side of the unit).

According to another embodiment, the device further comprises a Machine Vision system adapted to recognize the completion of one or more steps in accordance with information received from the camera 50 (see an exemplary camera assembly in, for example, FIGS. 5a and 5b). In one embodiment, a second step is started upon immediate completion of a first step.

According to another embodiment of the present invention, the device is configured to operate in a batch mode.

Another embodiment of the present invention relates to the instrument comprising a system of two or more valves that can send any reagent to any location (see, for example, FIGS. 5a and 17c and Table 1b, parts 255 and 257). The system can use at least from about 2 to 20 various reagents, which can be delivered to any of at least 2-20 receiving locations (valves, vials, reservoirs, reactors, etc.). Various custom designs can incorporate more than 20 reagents and more than 20 locations for processing such reagents.

In another embodiment, the controller comprises a programmable logic controller and a user interface. In one embodiment, the user interface is configured to affect at least one of a manual and an automatic operation of the device.

According to another embodiment, the device further comprises one or more internal filters for removal of exhaust.

In another embodiment, the self-shielding of the radiation-handling unit prevents user exposure to radiation in multiple synthesis runs conducted by the user.

In another embodiment, the device further comprises metering of reagents. Some reagents supplied in bulk (like solvents) are metered by metering pumps (see, for example FIG. 17b and Table 1a, parts 128, 130, 132), which deliver a specified fraction of a large total volume loaded onto the instrument.

In another embodiment the instrument is equipped with zero-waste fixtures (ZWF). Zero waste fixtures deliver pre-metered reagents where the entire amount loaded onto the box gets into the reactor.

A further embodiment of the present invention is related to a method for conducting radiosynthesis of a radiolabeled compound in an instrument comprising two separate units: a "cold" unit and a remote "hot" unit, which are connected with a bundle of cables and tubing (i.e., an umbilical of wires and tubing).

Another embodiment of the present invention is directed to a method where all reagents are driven from cold box to hot box before F-18 delivery and are ready to be dispensed into the reactor right next to the reactor. This is not the case even in modules with onboard reagents without the "cold box". The reagents have to travel through the fluid network of channels to get from their reservoirs to the reactor.

Another embodiment of the present invention is directed to a method of passing K222 solution behind $K_2CO_3$ solution to maximize F-18 transfer from ion exchange column into reactor.

Another embodiment of the present invention relates to a method of releasing [F-18]fluoride from the ion exchange column with a fraction of aqueous $K_2CO_3$ followed by a mixture of $K_2CO_3$ and $K_{222}$ in $H_2O$ and MeCN mixture of solvents.

Another embodiment of the present invention relates to a method of increasing the efficiency of the F-18 release comprising passing the solution bolus through a tube packed with glass beads to provide a train of multiple boluses.

In another embodiment, the present invention relates to the release of [F-18]fluoride from ion exchange column with a single fraction of $K_2CO_3$ followed by K222.

According to another embodiment of the present invention, release of [F-18]fluoride from ion exchange column with a fraction of aqueous $K_2CO_3$ is followed by a mixture of $K_2CO_3$ and K222 in $H_2O$ and MeCN mixture of solvents.

In another embodiment of the present invention, the method of releasing [F-18]fluoride from ion exchange column with a fraction of aqueous. $K_2CO_3$ followed by a mixture of $K_2CO_3$ and K222 in $H_2O$ and MeCN mixture of solvents is used when the multiple bolus-generating method is not suitable.

Another embodiment of the present invention is directed to a method for F-18 release using multiple fractions of eluent. This method is more efficient than when using a single fraction.

Another embodiment of the present invention is directed to a method of F-18 elution involving release direction and trapping direction being opposite. Most F-18 is trapped at the beginning of the column, so if it is released in the same direction, it will have to equilibrate along the entire column before being finally released. If released in reverse, it comes right off the end, maximizing the total percentage of released F-18 with the same volume of release reagent. The said reagent may comprise carbonates ($CO_3^-$), which include, but are not limited to sodium carbonate ($Na_2CO_3$), potassium carbonate ($K_2CO_3$), cesium carbonate ($Cs_2CO_3$), and trialkyl ammonium carbonates, and phase transfer reagents, which include, but are not limited to Kryptofix 2.2.2, crown ethers, and tetraalkyl ammonium salts.

Another embodiment of the present invention relates to a method of loading HPLC injection loop by moving liquids with pressure (not a syringe), which is enabled by specific positioning of liquid-gas interface detectors.

Another embodiment of the present invention relates to a method of conducting multiple runs comprising radiosyntheses of different products without opening shielded enclosures.

Another embodiment of the present invention is directed to the instrument capable of carrying out an unlimited number of radiosynthesis runs without user exposure. This is assured by "no consumable single-use components" inside the "hot box". An exemplary version of the instrument has 20 SP cartridges (see, for example, FIG. 11, cartridges 256) meaning that 20 runs is the limit. However, another exemplary version of the instrument has a newly discovered "cleanable Solid Phase Extractor (SPE)". The concept of a cleanable and reusable SPE allows the elimination the last single-use component. In previous instruments all hardware elements and components, such as, for example, SPEs, ion-exchange columns, filters, and others are consumables, meaning require replacement of service after each run.

Another embodiment of the present invention relates to the instrument with no single use consumables, meaning that all "consumables" can be used for an unlimited number of runs.

Another embodiment of the present invention relates to the instrument, where the hot box comprises a reusable Solid Phase Extractor (SPE) and a reusable Ion Exchange (I/E) Column.

Another embodiment of the present invention relates to the cold box containing all system-controlling hardware.

Another embodiment of the present invention relates to the instrument as described herein, with a reagent-loading system relying on a pre-loaded tube with multiple reagents separated by air pockets, such as, for example, $K_2CO_3$ and K222. Additionally, other combinations are possible, including loading the entire reagent set into one tube and preventing the reagents from mixing with each other by separating them with air pockets.

Another embodiment of the present invention relates to the instrument capable of parallel syntheses of multiple tracers (not parallel cleaning and operation, but making several compounds at the same time).

It has to be noted that there is a difference between a stand-alone mini-cell based instrument and a self-shielded instrument. Unless the mini cell is plumbed directly to the cyclotron with a shielded path, it is difficult to deliver isotope to the instrument without user exposure. (In some setups that do not have cyclotrons, but have hot labs, people are subjected to exposure when they need to get the isotope into the hot cell). In one of the embodiments of the present invention, the self shielded instrument comprises a plug-in pig device, which is used to bring activity into the system without opening any part of it and thus, with zero user exposure.

Another embodiment of the present invention relates to a method of avoiding radiolysis during the radiosynthesis process. Radiolysis is chemical decomposition of material in presence of radiation. Traditionally, radiolysis is proportional to concentration (high at high concentrations), and it is known to use stabilizers such as ascorbic acid to reduce radiolysis of the desired products.

According to one of the embodiments of the present invention, the instrument is designed to minimize the time the product spends in a concentrated solution. The solution is dilute up to the point it gets onto the I/E column. When it enters the reactor, the reactions occur rapidly and then the reaction mixture is diluted to a safe concentration. The time in concentrated solution can be minimized by operating the process inside a microfluidic chip.

Another embodiment of the present invention relates to a method of bringing all reagents into the reactor via one line as well as bringing all reagents from the cold box to the hot box through the same line.

In particular, embodiments of the present invention relate to a fully-automated synthesis of biomarkers, or radiolabeled pharmaceuticals, for positron emission tomography (PET). Some of the advantages associated with the various embodiments of the present invention include, for example, the ability to synthesize compounds on demand and in a flexible manner. Other advantages of the various embodiments of the present invention include the ability to synthesize multiple products sequentially or at the same time without user exposure to radiation between the runs (which is inevitable in conventional systems).

The presently disclosed system can contain mechanisms to add additional reagent modules, additional waste modules, and additional synthesis modules to allow the system to be used for different biomarkers simultaneously. Alternatively, the basic system can be used for sequential synthesis of different biomarkers involving the same or different number and order of steps. The instrument may be reused without hardware modifications, or with single-use cartridges that are pre-loaded with reagents and/or solvents for a single run. This ease of use enables tremendous flexibility in a research environment or in specialized clinical situations, where on-demand synthesis of biomarkers is needed, such as when several patients in the same day require different scans performed with different biomarkers.

One embodiment of the present invention is directed to an automated instrument that is easy to use and flexible. As such, the system enables non-experts to synthesize a variety of PET biomarkers on demand for biomarker development, synthesis-optimization, and testing. In another embodiment, the present invention provides an instrument that can be deployed in hospitals further from cyclotrons than is currently possible. The presently disclosed embodiments of devices enable synthesis of fresh product on demand as contrasted to the decayed products associated with conventional systems that require delivery from a centralized (and perhaps distant) synthesis facility. This type of on-site instrument greatly expands the accessibility of PET scanning to additional clinics, patients and research labs, and provides additional flexibility in obtaining desired biomarkers (with high specific activity) that goes beyond what is available from the local radiopharmacy. Furthermore, it allows multiple tracers to be produced in one day with one instrument.

In one embodiment, automated systems disclosed herein include those which comprise a disposable reagent cartridge. Using such a cartridge has a number of advantages including simplified set-up, rapid change between production runs, pre-run automated diagnostic checking of the cartridge and reagents, reagent traceability, single-use, tamper and abuse resistance. Substitution of a reagent cartridge eliminates the need to design an entirely new automated synthetic system each time a different radiopharmaceutical is to be prepared. The system described herein allows cartridge exchange without opening the shield and exposing the user to radiation (unlike current commercial systems). Such cartridges or kits can be used with the cold box. They allow quick and fail-safe preparation for runs. A kit is defined herein as a set of reagents. A cartridge is defined herein as a plug-in cassette (hardware) that contains all the reagents and sometimes reagent paths in it.

Suitable heat sources for use in the synthetic systems disclosed herein include, but are not limited to, resistive heating, localized and non-localized microwave heating and Peltier devices.

In one of the embodiment of the present invention, the heat source is a Peltier device. Additionally, in case of leaks out of the chip, Peltier device of the present invention is protected by a special basin for collecting unwanted liquid on top of it.

Various sensors for example, flow sensors, liquid-gas interface sensors, radioactivity sensors, pressure sensors, temperature sensors, and other sensing devices that are capable of performing the desired sensing function and other apparatus components (e.g., valves, switches, etc.) can be integrated into the system and connected to a computer or processing module for process control and monitoring purposes.

The synthetic systems disclosed herein comprise macro and microfluidic synthesis reactors (see, for example FIGS. 10 and 6), in which, for example, reagents are mixed and heated, solvents are exchanged, to carry out the desired chemical process.

In one embodiment, the present invention is directed to a self-shielded fully-automated radiosynthesis instrument based on batch-mode macro and microfluidic device.

Instruments and systems as described herein when used for radiochemical synthesis allow biomarkers as well as other compounds and compositions to be made with higher efficiency. Such devices enable production of new biomarkers allowing multi-run syntheses to be performed in one hot mini-cell, where each hot box may be functioning in parallel with the other or according to an individually selected protocol. Such arrangements enable the researchers to perform rapid optimizations of reaction conditions.

The present invention is directed to the system where a typical mini-cell comprises more than one unit, each equipped to carry out a radiosynthetic protocol including synthesis, purification and formulation procedures. This feature distinguishes the system disclosed herein from other systems on the market, which offer three units per mini-cell, where only one of the three would do only synthesis, one-only purification and one-only formulation. None of the units is configured to carry out all three processes if needed. (For example, synthesis unit does not have HPLC capabilities, and purification unit is not equipped with a reactor).

Another embodiment of the present invention relates to the instrument where different processes can take place in individual hot boxes within the mini-cell at the same time. Intermediate purification with a single reactor (for example, reactor is cleaned while the intermediate is purified). The system allows cleaning of certain parts within the box while still using other parts (for example, synthesis and purification).

Another embodiment of the present invention relates to the instrument capable of adjusting preset protocols and procedures. The software allows tuning and adjustment of the initial protocol based on live feedback such as pressure, flow, temperature, radiation or color detection.

The various embodiments of the present invention describe fully automated radiosynthesis (e.g. from target water to purified product in an injectable formulation) to take place in a single instrument run in a fully automated (e.g., one touch) manner, or allowing individual step control. The various example embodiments disclosed herein can be used for either discovery and/or production of known biomarkers in an automated mode, as well as for development of new biomarkers in a mode with individual step control.

A more detailed description of the reagent flow and delivery mechanism, in accordance with an exemplary embodiment of the present invention, is described herein in connection with FIGS. 16 and 17. Implementation of these schemes in the instrument allows priming of all reagents, delivery of reagents to the reactor, collection of products and miming multiple reaction cycles intermittent with cleaning cycles. An exemplary Instrument A (macro reactor only) operation, comprising cold and hot boxes is shown in FIG. 16. An exemplary Instrument B (micro and macro reactors) operation, comprising cold and hot boxes is shown in FIG. 17. In FIGS. 16*a*, 16*b*, 16*c*, 17*a*, 17*b*, and 17*c* lines 1-17 exemplify the flow lines or tubing connecting corresponding components of the cold and hot boxes. FIGS. 16*b* and 17*b* are the separate illustrations of the cold boxes of the corresponding instruments A and B, where uploading of reagents and preparation for their delivery into hot box takes place. FIGS. 16*c* and 17*c* show the flow charts or a diagrams of the hot boxes of the corresponding exemplary instruments A and B, where the reagents are being delivered to and processed according to the desired radiosynthesis protocol.

The systems disclosed herein have demonstrated significant yield and reaction time improvements, particularly over conventional chemistry.

One exemplary system automates the chip operation through a Visual Basic program and PLC (Programmable Logic Controller). The automation process also provides automated product isolation capability.

The hardware disclosed herein can be controlled using various electronic hardware instrumentations and devices. For example, a PC-104 based system may be used with 16 analog inputs, 10 analog outputs, 8 digital inputs, and 48 digital outputs. The controller can run, for example, embedded Windows-NT software that communicates via an Ethernet connection to a standard PC running the FIX32 automation software, an automation language that allows simple construction of graphical interfaces to visualize what is happening in the hardware and to control the various valves and other components. The interface may allow various modes of operation such as fully-automated, manual, or step-wise operations.

In one embodiment, the control software may access individual digital outputs (e.g., 2-way and 3-way valves, on-chip valves, temperature control system, heater enable, cooler enable, vacuum system, rotary injector, and other system components) and analog outputs (e.g., temperature set point, and other outputs). Analog inputs (e.g., reactor temperature, vent channel pressure, radiation levels) may be scaled to engineering units for monitoring on the main screen.

In addition to the interactive graphical interface described herein, dozens of scripts automate the process steps described herein. Each subprogram may perform a sequence of simple operations such as changing the state of a valve, waiting for a fixed amount of time, or waiting for particular value of an input (e.g. heating until the reactor reaches a specified temperature). The system in accordance with various embodiments of the present invention is capable of repeatably producing purified human-scale amounts of $^{18}$F—FLT and other materials, which include, by way of example, FHBG, Fallypride, and FMiso, in an automated fashion (the steps in the radiosynthesis are initiated with a single button on the computer screen).

Another embodiment of the present invention involves a program code embodied on a computer-readable medium, the program code comprising instructions for causing a controller to implement a method for radiosynthesis of a radiolabeled compound using a microfluidic chip or a macro reactor, the method comprising introducing one or more reagents into a reaction chamber of a chip or macro reactor, operating the synthesis system to process the reagent(s) responsive to a predetermined algorithm to generate a radiolabeled compound, and collecting the radiolabeled compound.

In another embodiment the entire process starting with radionuclide received from the cyclotron and finishing with a purified product in an injectable formulation is performed automatically without user intervention.

In a fully-automated system, the needed reaction times may be optimized, and a simple script, for example, in FIX32, may be written to execute all the operations in sequence. A working example may involve automated unit operations, such as filling, which in turn involve multiple sub-steps. The "unit operation" scripts may be designed to be "parameterized". That is, in a single place, an operator may set the flow times, reaction times, and heating temperatures. The automated script may then read all the information and adjusts the synthesis run accordingly. The automated operation may also be initiated, for example, by a simple user click on a 'start' icon that is part of the user interface. The systems in accordance with embodiments of the present invention provide a fully automated hands free operation of the entire radiosynthesis cycle on a microfluidic device or macro reactor yielding purified PET radiotracer.

In another embodiment, the instrument comprises internal filters which enable operation without any additional exhaust and doesn't require a fume hood.

In accordance with an exemplary embodiment of the present invention, the hardware disclosed herein may be controlled using a PC, a Programmable Logic Controller (PLC), and a Software control program written in Visual Basic. The PLC may control all of the I/O in the instrument using, analog inputs and outputs, relay outputs, digital inputs and outputs, and a Ladder Logic program. The standard PC, using, for example, a Visual Basic control software, may control the PLC and precision pumps using serial communication. This provides a very detailed graphical interface allowing visualization of what is happening in the hardware, and controlling the various valves, pumps, heaters and other components. The interface may also allow various modes of operation such as fully-automated, semi-automated, and manual.

In accordance with an example embodiment, in the Manual mode of operation, the control software may allow individual control of all of the components and processes in the instrument through button clicks and text input from the User Interface screen.

In accordance with an example embodiment, in the Semi-Automated mode of operation, various subroutines adapted for automated control of various processes such as, Initializing, Priming, Filling, Evaporation, Hydrolysis, Fluorination, and others may be used. Also, each of the automated steps may allow for particular values of input (e.g. temperature, pressure, flow rate, volume, and time).

In accordance with another embodiment, in the fully-automated mode of operation, the systems provide a fully automated hands free operation of the entire radiosynthesis cycle on a microfluidic device or macro reactor yielding purified PET radiotracer products, with the click of a single button. The desired reaction values may be input at the start of the reaction, if desired. That is, the default values may be changed, and an operator may set the flow times, reaction times, temperatures, pressures and volumes before starting the reaction. The automated script may then read all the information and adjust the synthesis run accordingly.

The general computer system includes a processing device, a system memory, a system bus coupling the system memory to the processing device, a storage device, such as a hard disk drive, a magnetic disk drive, e.g., to read from or write to a removable magnetic disk, and an optical disk drive, e.g., for reading a CD-ROM disk or to read from or write to other optical media. The storage device may be connected to the system bus by a storage device interface, such as a hard disk drive interface, a magnetic disk drive interface and an optical drive interface. Although this description of computer-readable media refers to a hard disk, a removable magnetic disk and a CD-ROM disk, it should be appreciated that other types of media that are readable by a computer system and that are suitable to the desired end purpose may be used, such as magnetic cassettes, flash memory cards, digital video disks, etc.

A user may enter commands and information into the general computer system or enter graphical information into the general computer system. A display device, such as a monitor, having a display screen, is connected to the system bus via an interface. In addition to the display screen, the general computer system can also include other peripheral output devices.

The general computer system can operate in a networked environment using logical connections to one or more remote computer systems, such as a server, a router, a peer device or other common network node, and such a system can include any or all of the elements described relative to the general computer system. When used in a local area network (LAN) environment, the general computer system is connected to the LAN through a network interface.

When used in a WAN networking environment, the general computer system typically includes a modem or other means for establishing communications over a WAN, such as the Internet. The modem, which may be internal or external, may be connected to the system bus via the serial port interface. In a networked environment, program modules depicted relative to the general computer system, or portions thereof, may be stored in the remote memory storage device. It should be appreciated that the network connections shown are exemplary and other means of establishing a communications link between the computer systems may be used. It should also be appreciated that the application module could equivalently be implemented on host or server computer systems other than general computer systems, and could equivalently be transmitted to the host computer system by means other than a CD-ROM, for example, by way of the network connection interface. Program modules stored in the drivers of the computer system may control how the general computer system functions and interacts with the user, with I/O devices or with other computers. Program modules may include routines, operating systems, target application program modules, data structures, browsers, and other components.

It should be appreciated that no particular programming language is described for carrying out the various procedures described in the detailed description because it is considered that the operations, steps, and procedures described herein are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer should be aware of the language and tools which are most useful for that user's needs and purposes.

Moreover, the method may be embodied in the form of computer-implemented processes and apparatuses for practicing those processes. The above may also be embodied in the form of computer program code containing instructions embodied in tangible media, which is non-transitory, such as, for example, floppy diskettes, CD-ROMs, hard drives, or any other computer readable storage medium, wherein, when the computer program code is loaded into and executed by a computer, the computer becomes an apparatus for practicing embodiments of the invention. Existing systems having reprogrammable storage (e.g., flash memory) can be updated to implement embodiments of the present invention. The above can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing embodiments of the present invention. When implemented on a general-purpose microprocessor, the computer program code segments may configure the microprocessor to create specific logic circuits in whole or in part.

The embodiments of the present invention are further described by the following non-limiting examples which further illustrate the invention, and are not intended, nor should they be interpreted to, limit the scope of the invention.

The following disclosure is a description of the equipment, process and control in accordance with the various embodiments of the present invention. This instrument is one embodiment of the present invention and allows for the automated synthesis and purification of multiple types of radiolabeled compounds for use in the Positron Emission Tomography (PET) scanning of animals and humans.

Users of the exemplary system can select between manual and automated modes of instrument operation. One such device can use a Visual Basic control program, as well as a Ladder Logic PLC for control of the device.

The instrument according to embodiments of the present invention can be used in any one of a plurality of modes. Examples of three modes include: (1) full automation that takes the process from target water to purified product in an injectable formulation with one click of a start button; (2) individual step automation, which allows the user to pause after each synthetic step and decide which parameters to use in the next step, or to skip steps, or to stop the process; and (3) a fully manual mode, where the user can control every device in the instrument such as a valve, pressure regulator, syringe, etc. All modes allow the user to monitor the processes taking place in the chip or macro reactor in real-time by watching the output on the PC monitor screen Machine vision can use the same images to drive certain step sequences in the automated process or give the user an indication of step completion in the manual mode.

Figures 1, 16A:
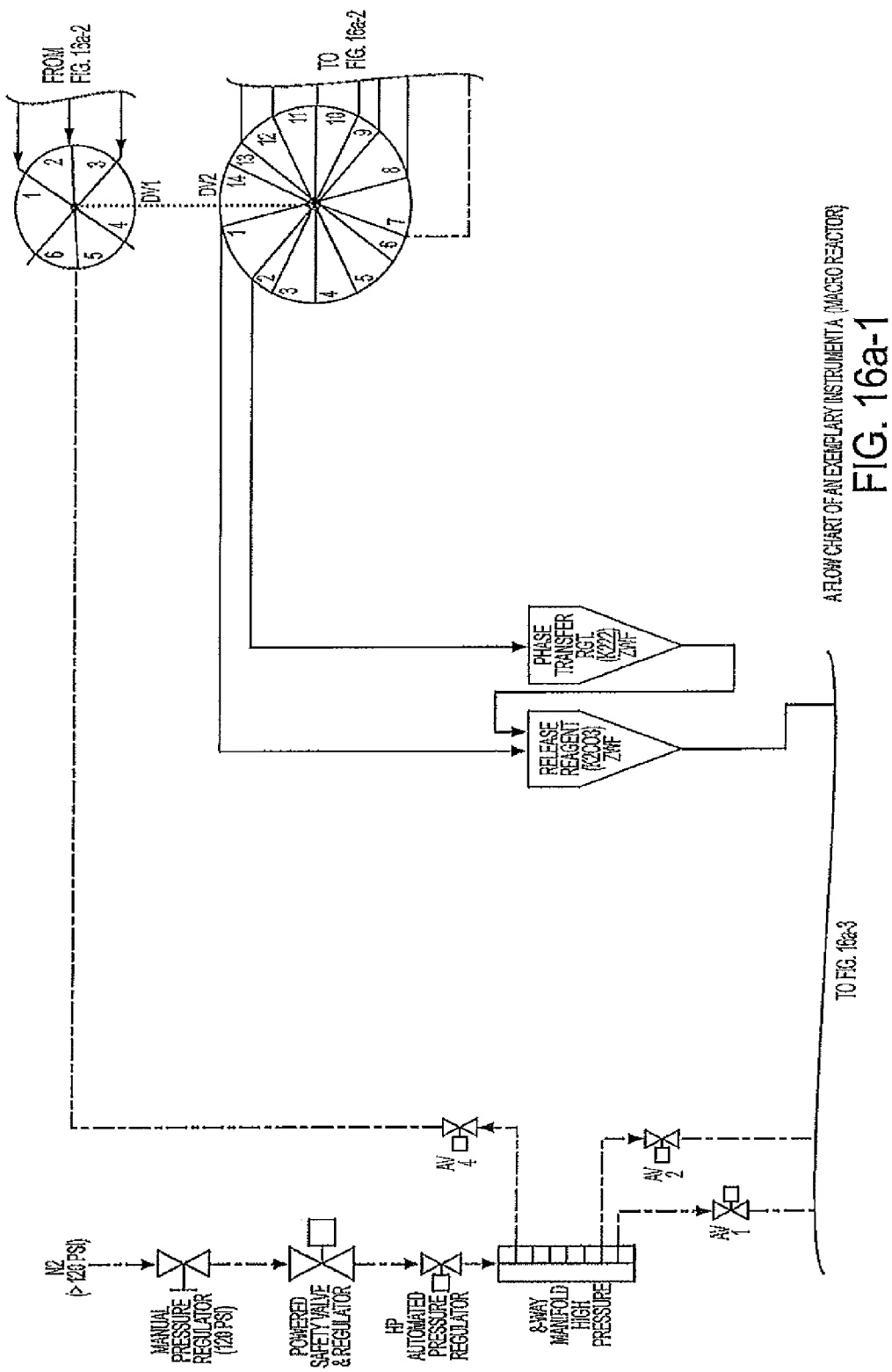
FIG. 16a illustrates a flow chart of an exemplary Instrument A (macro reactor).
Figures 2, 16A:
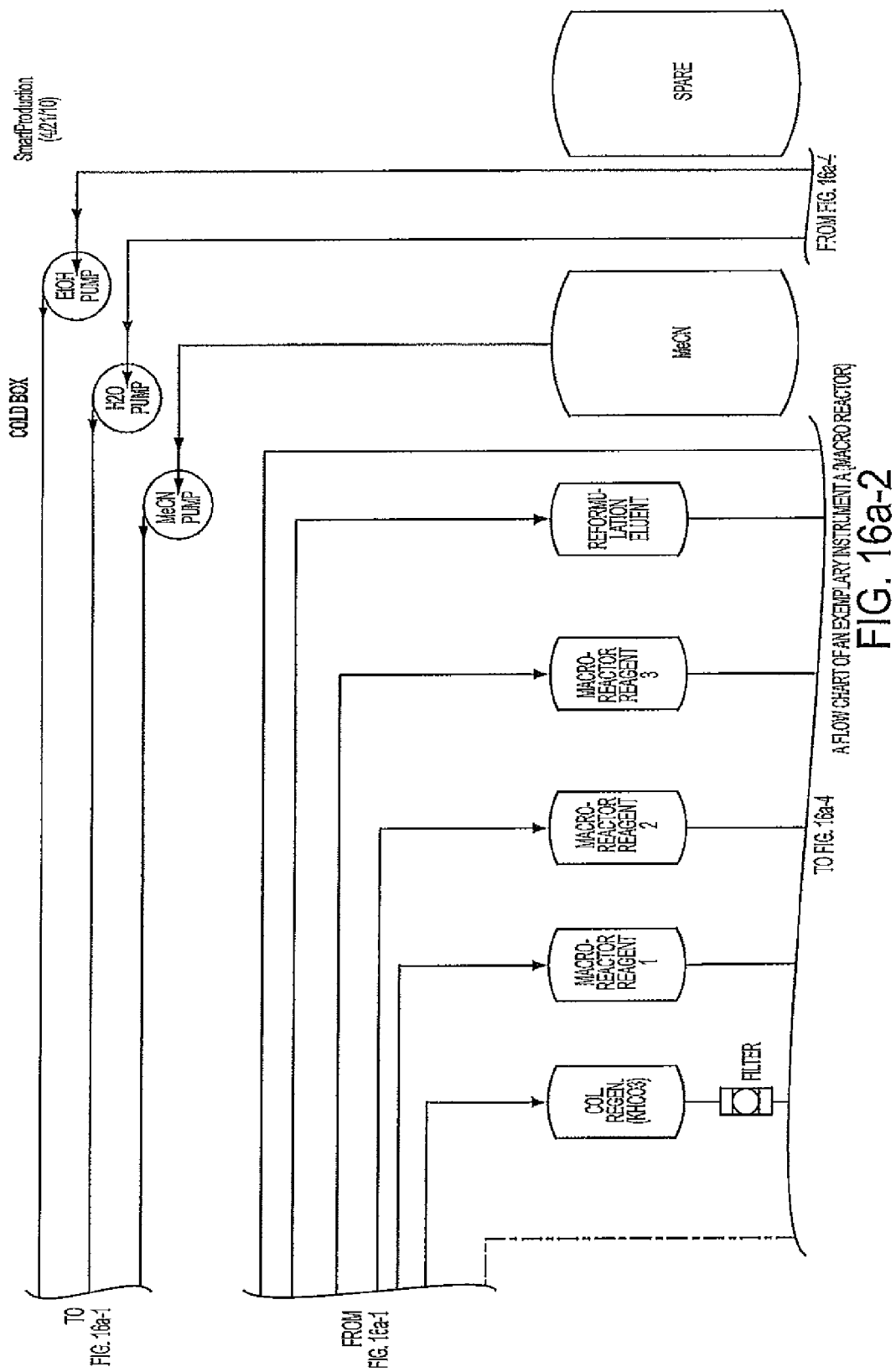
Figures 3, 16A:
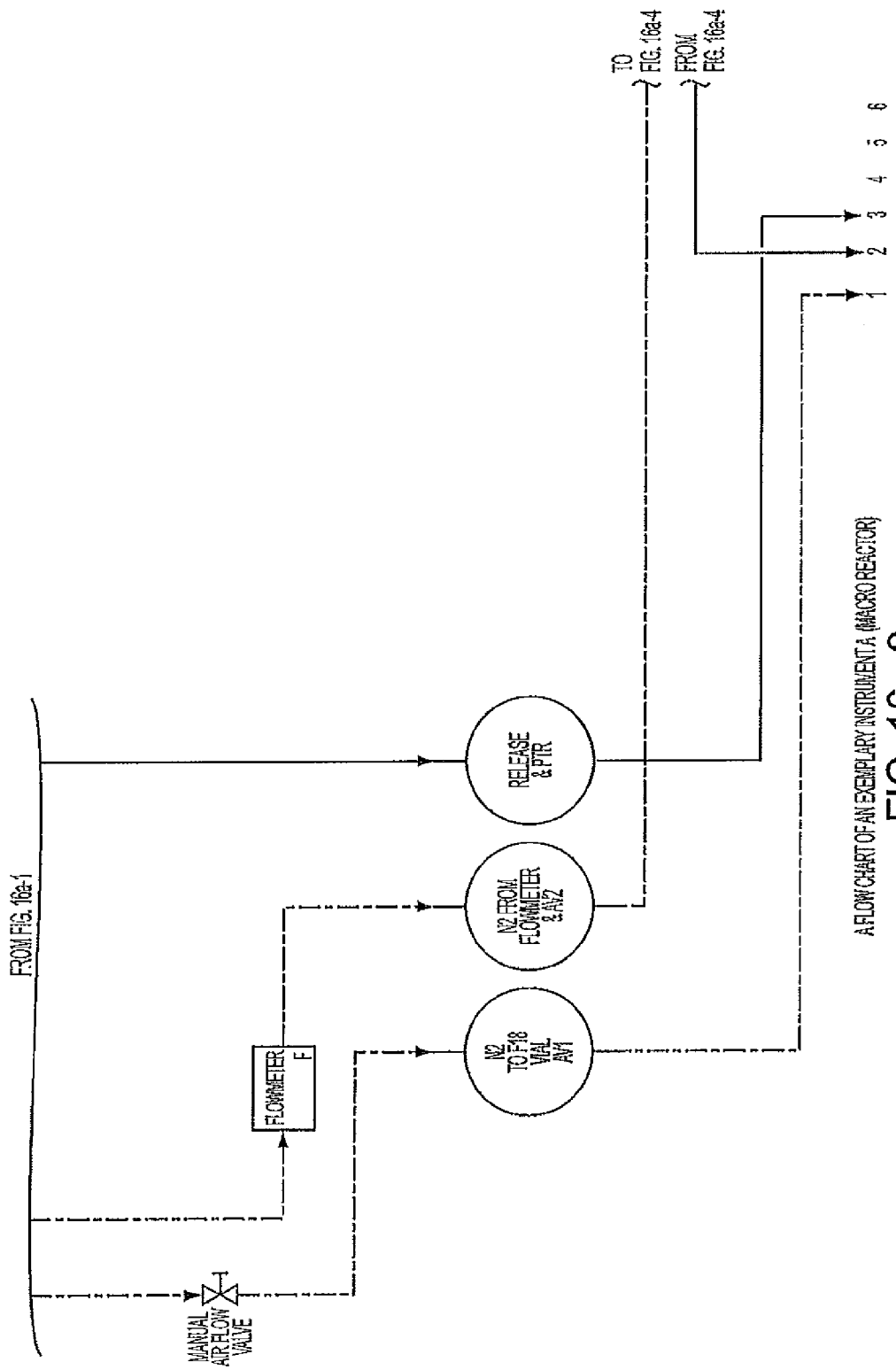
Figures 4, 16A:
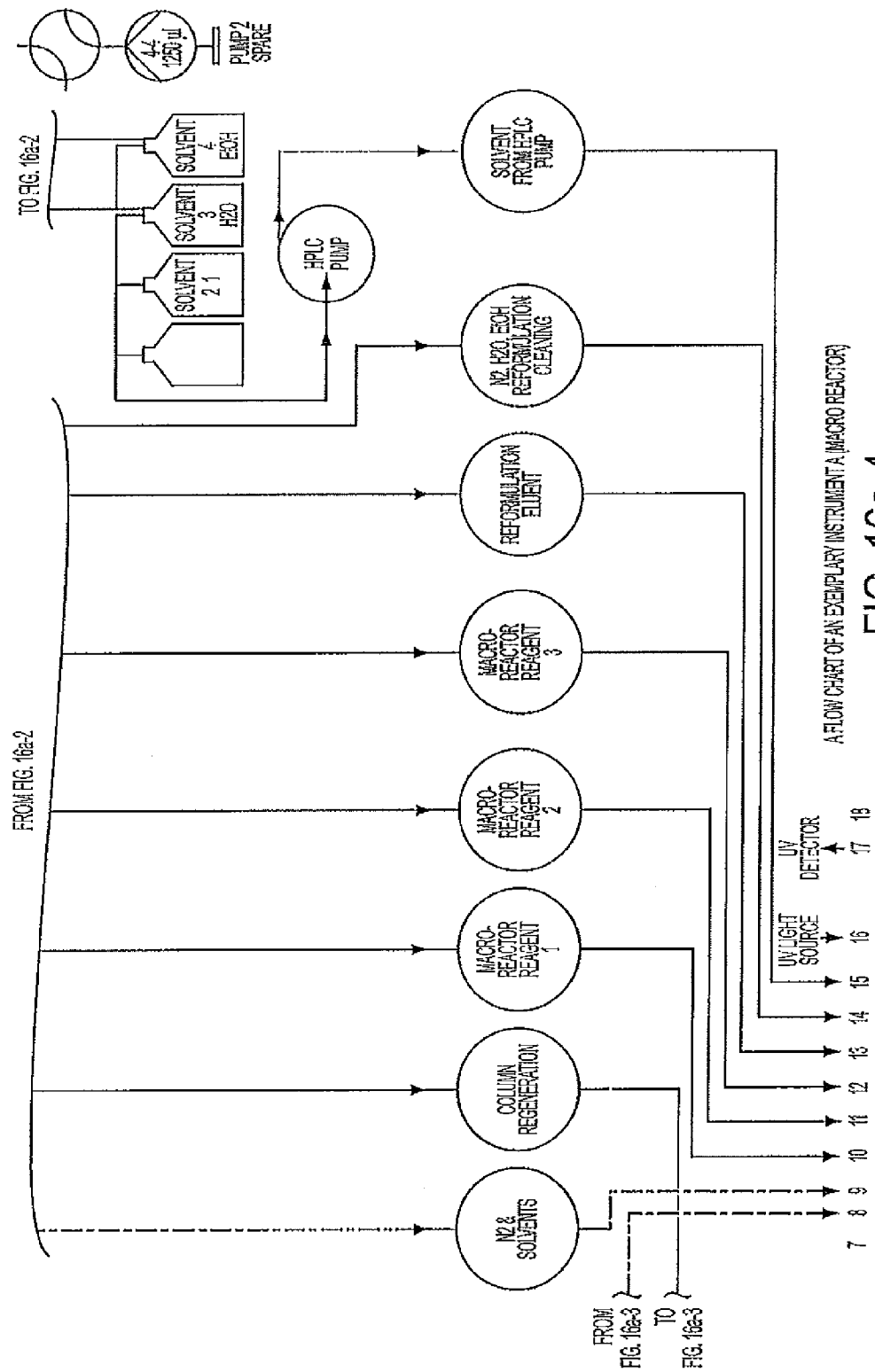
Figures 5, 16A:
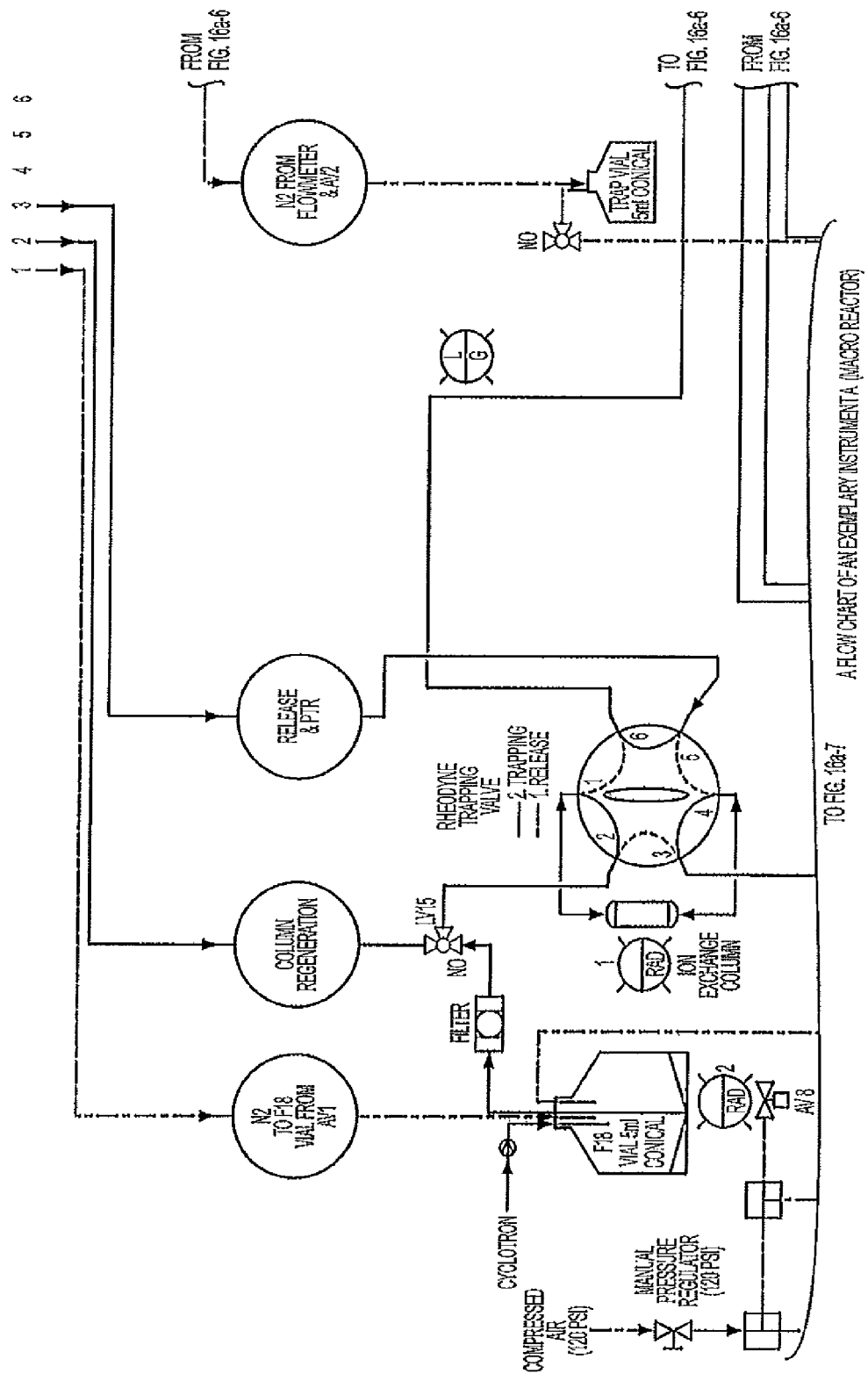
Figures 6, 16A:
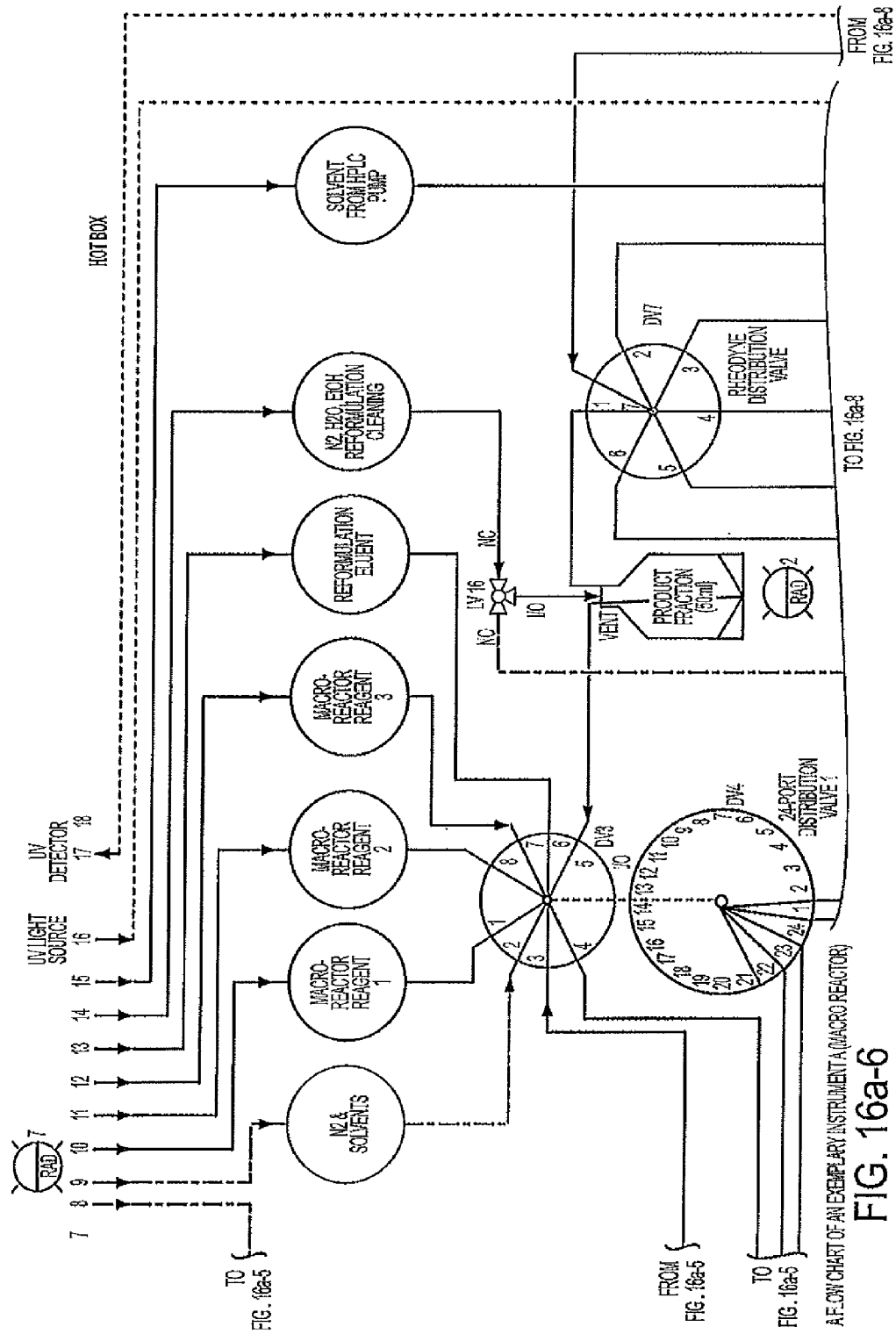
Figures 7, 16A:
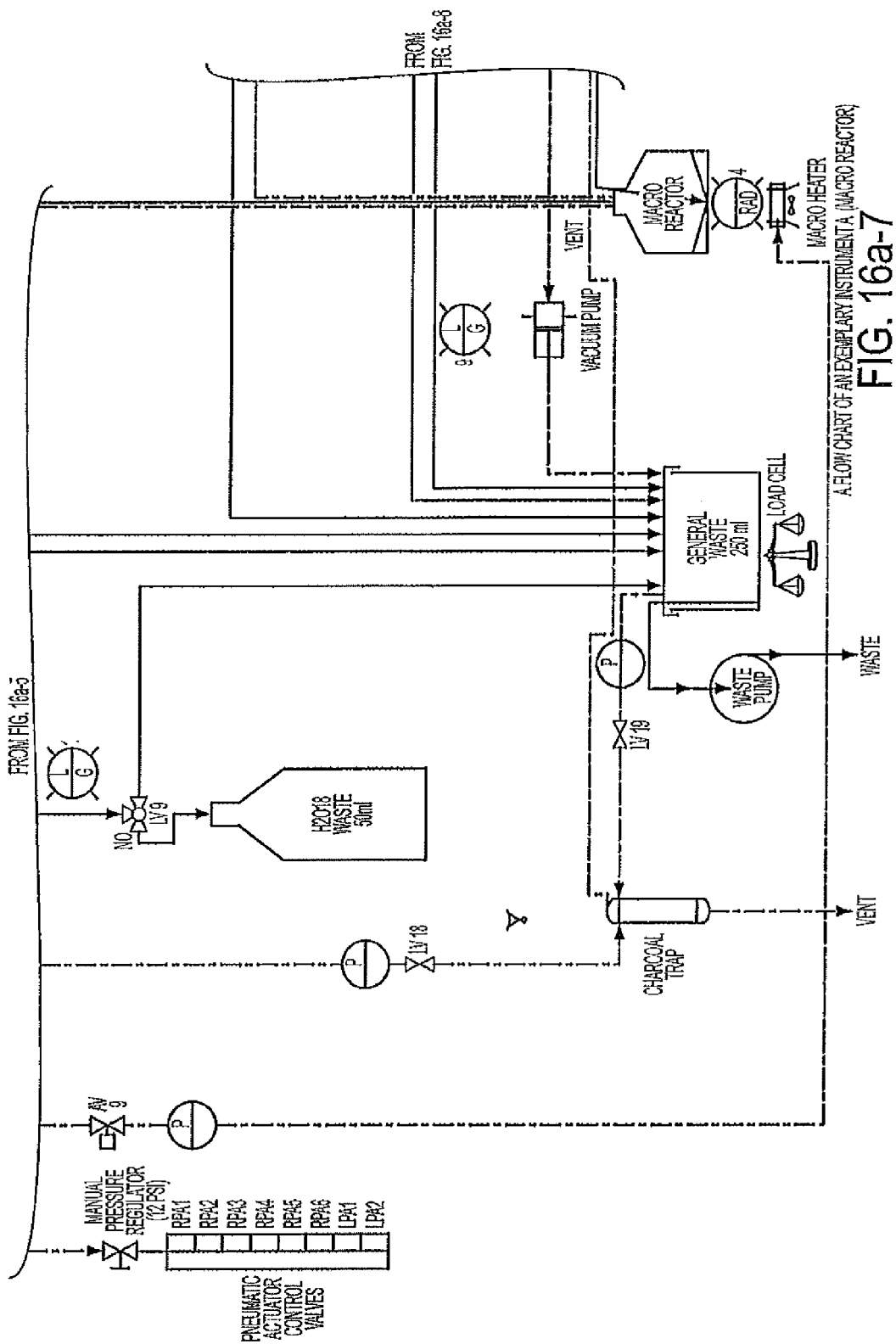
Figures 8, 16A:
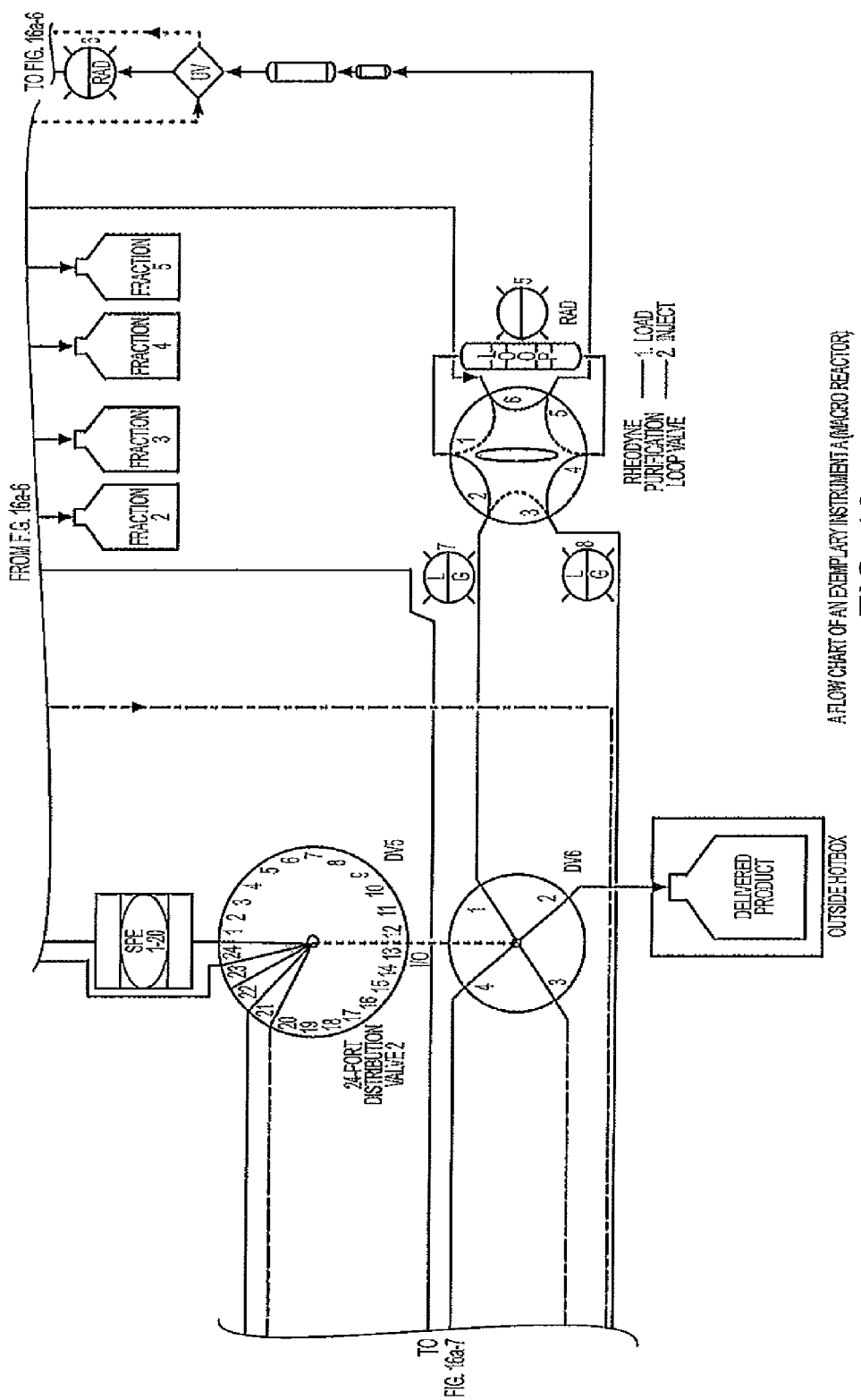
Figures 1, 16B:
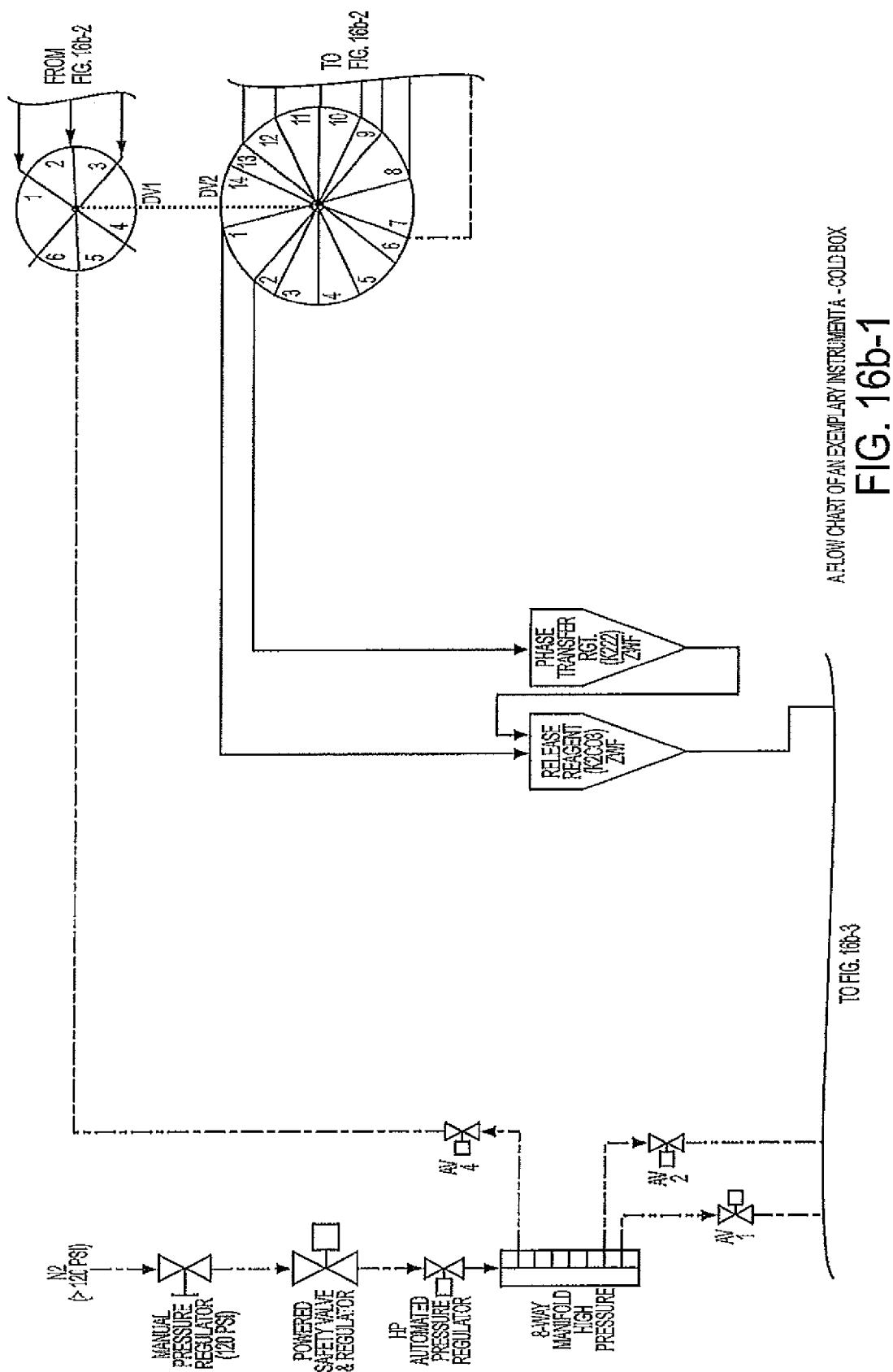
FIG. 16b illustrates a flow chart of an exemplary Instrument A-Cold Box.
Figures 2, 16B:
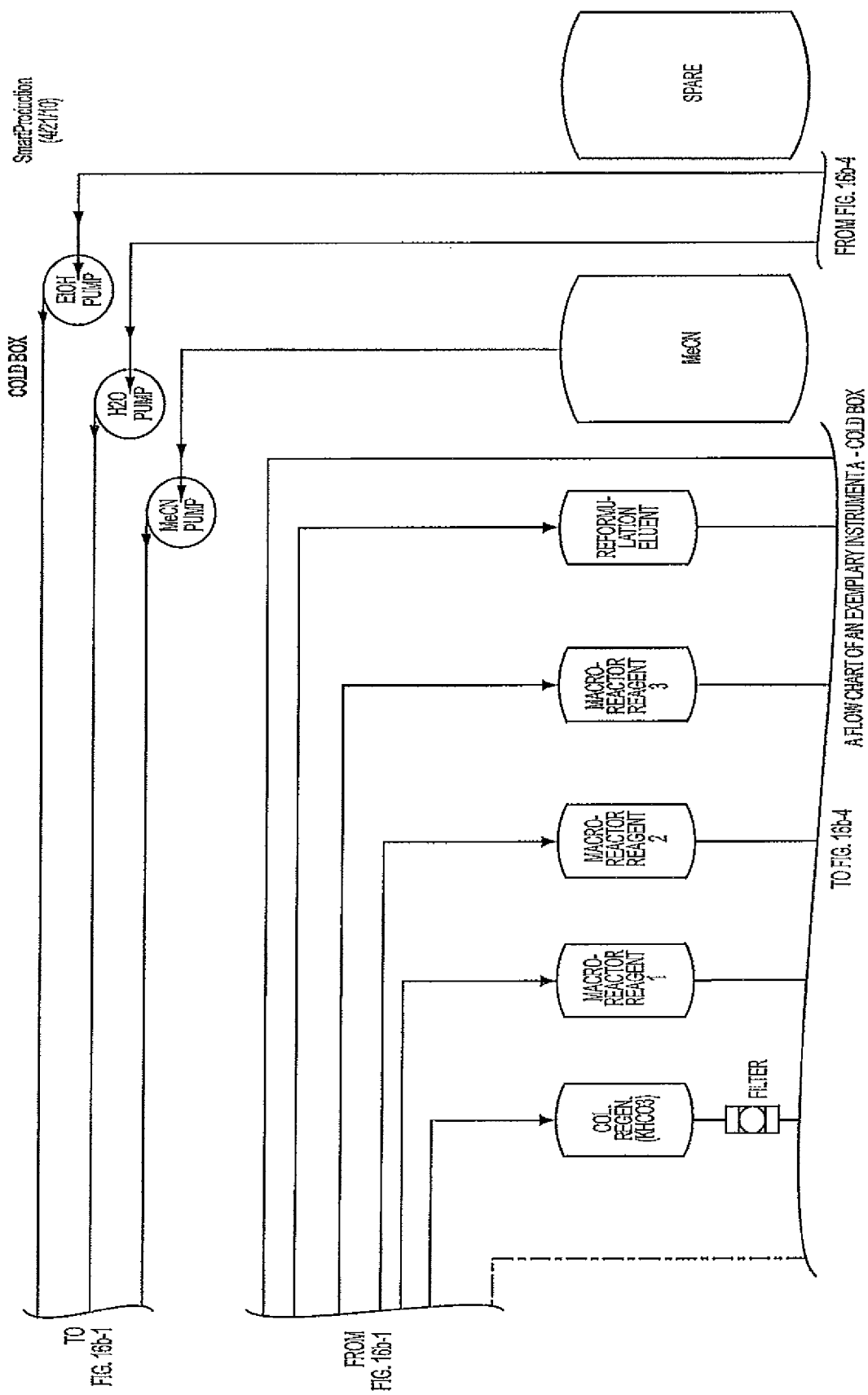
Figures 3, 16B:
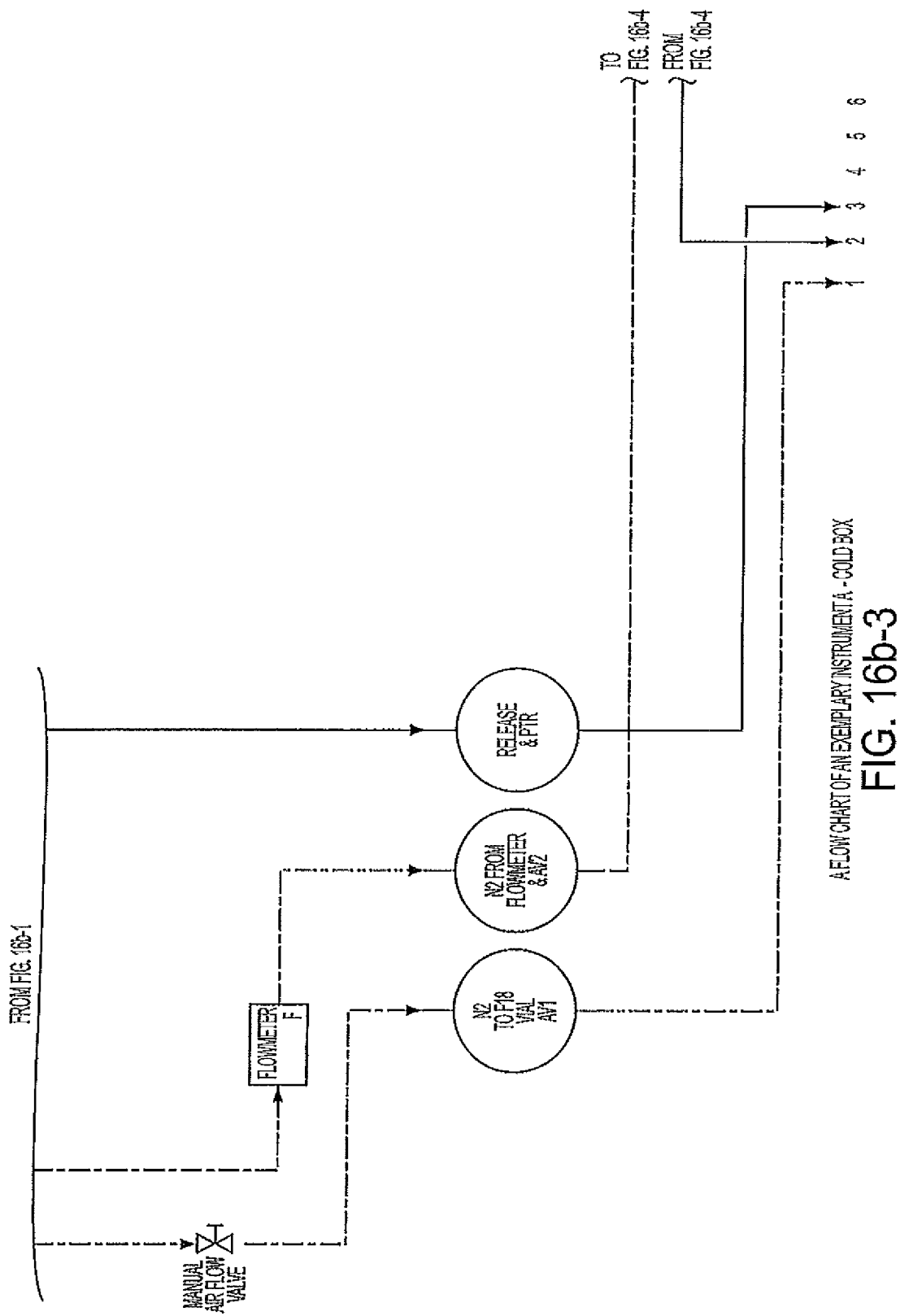
Figures 4, 16B:
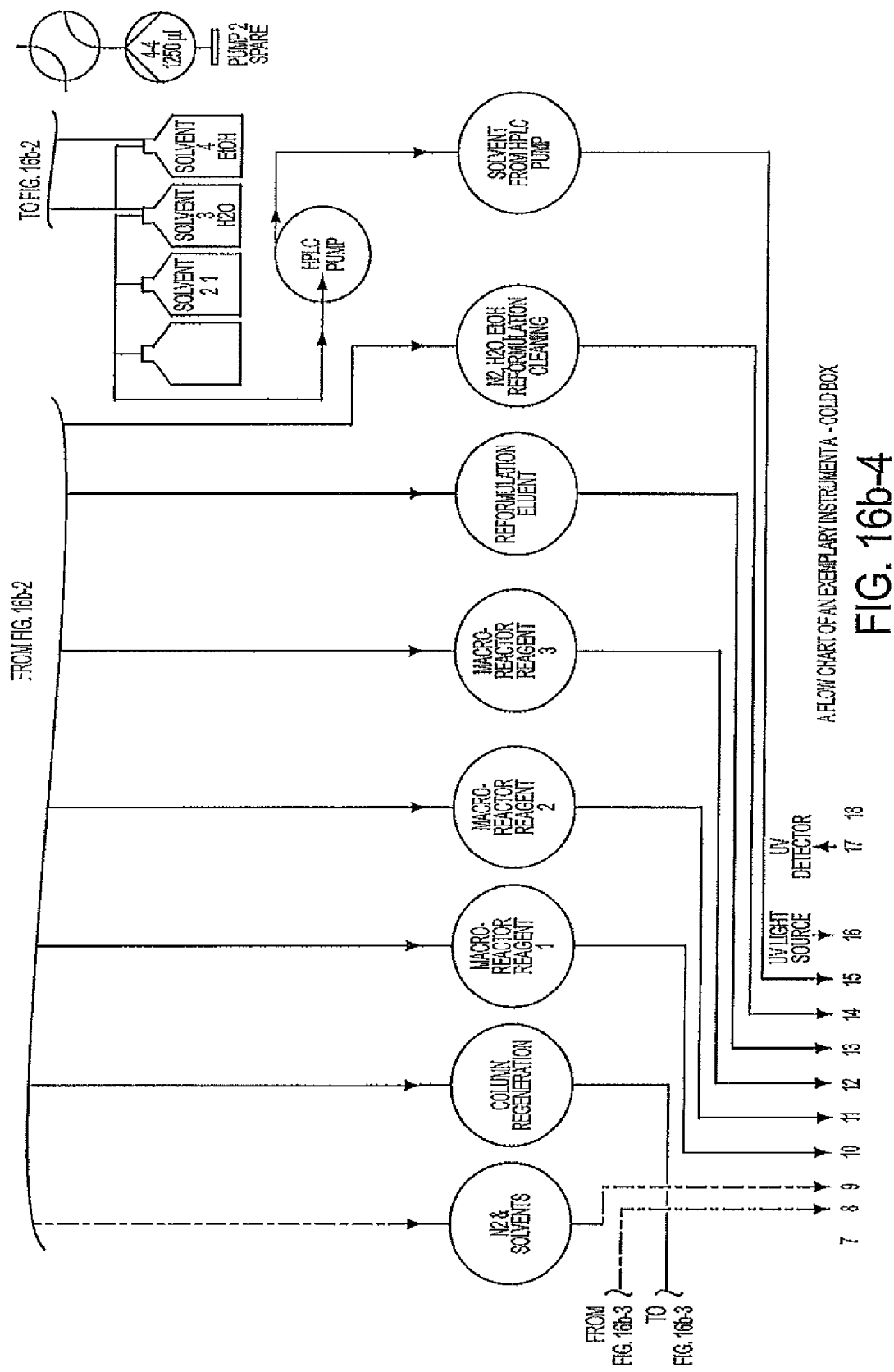
Figures 1, 16C:
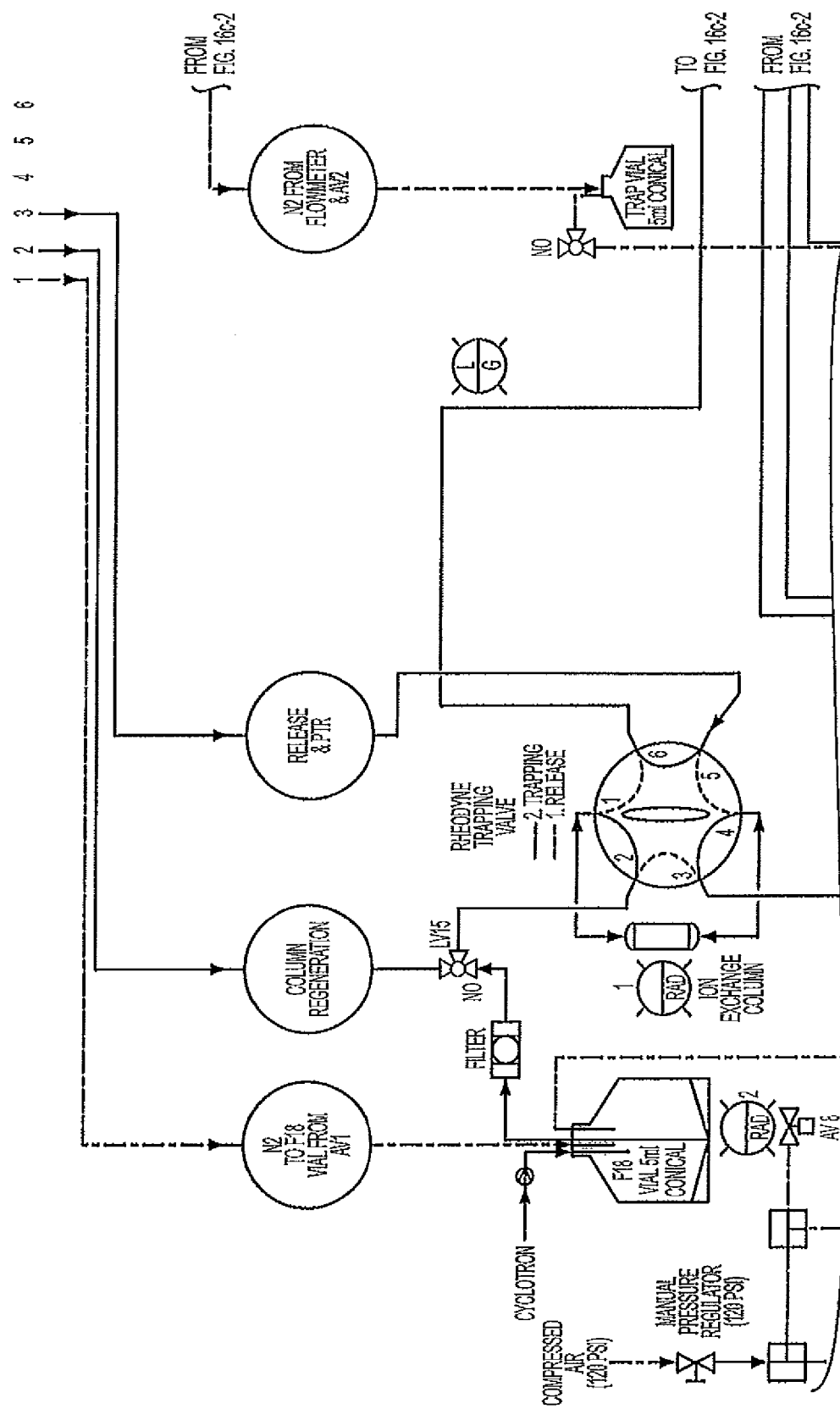
FIG. 16c illustrates a flow chart of an exemplary Instrument A-Hot Box.
Figures 3, 16C:
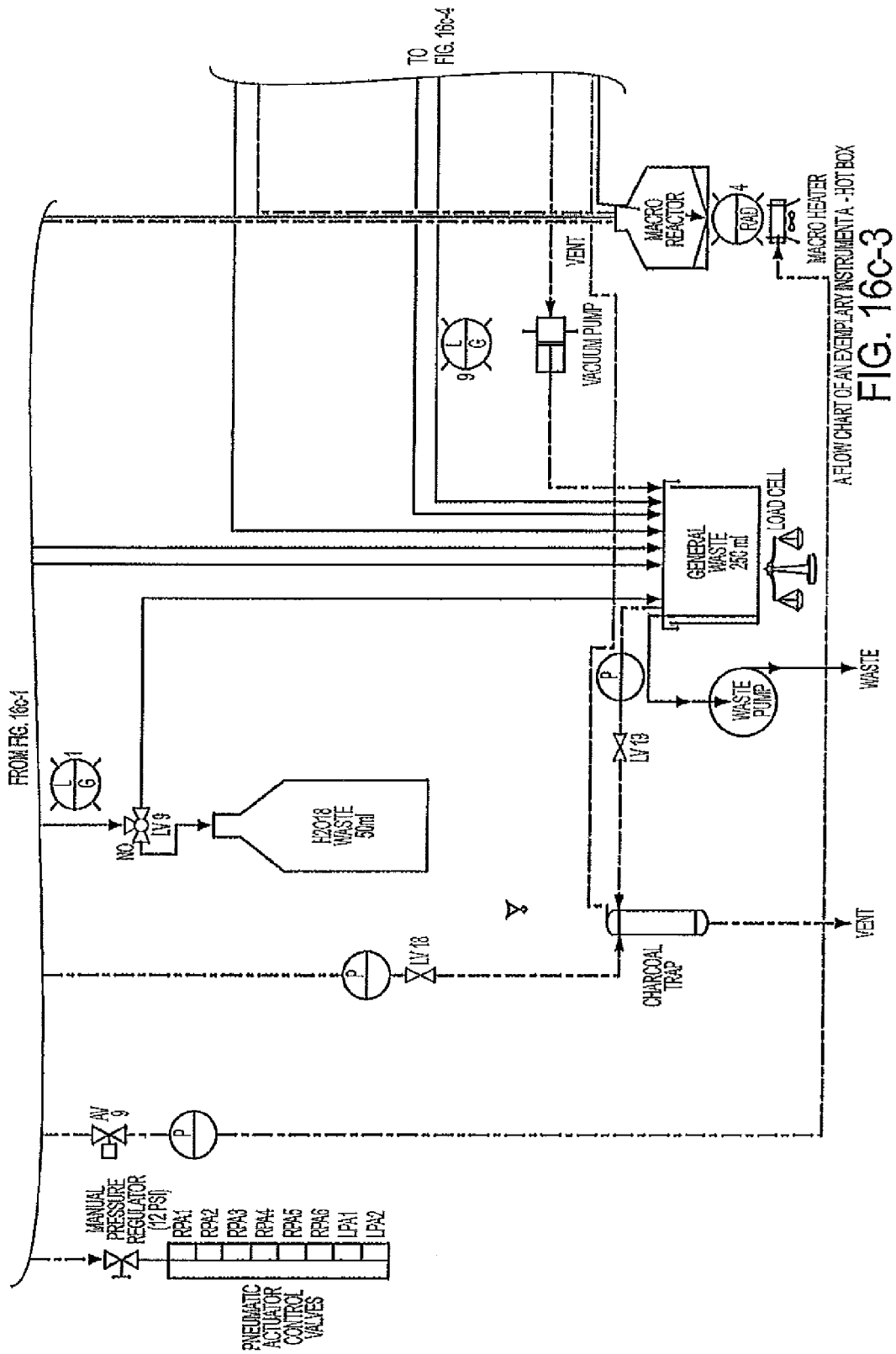
Figures 4, 16C:
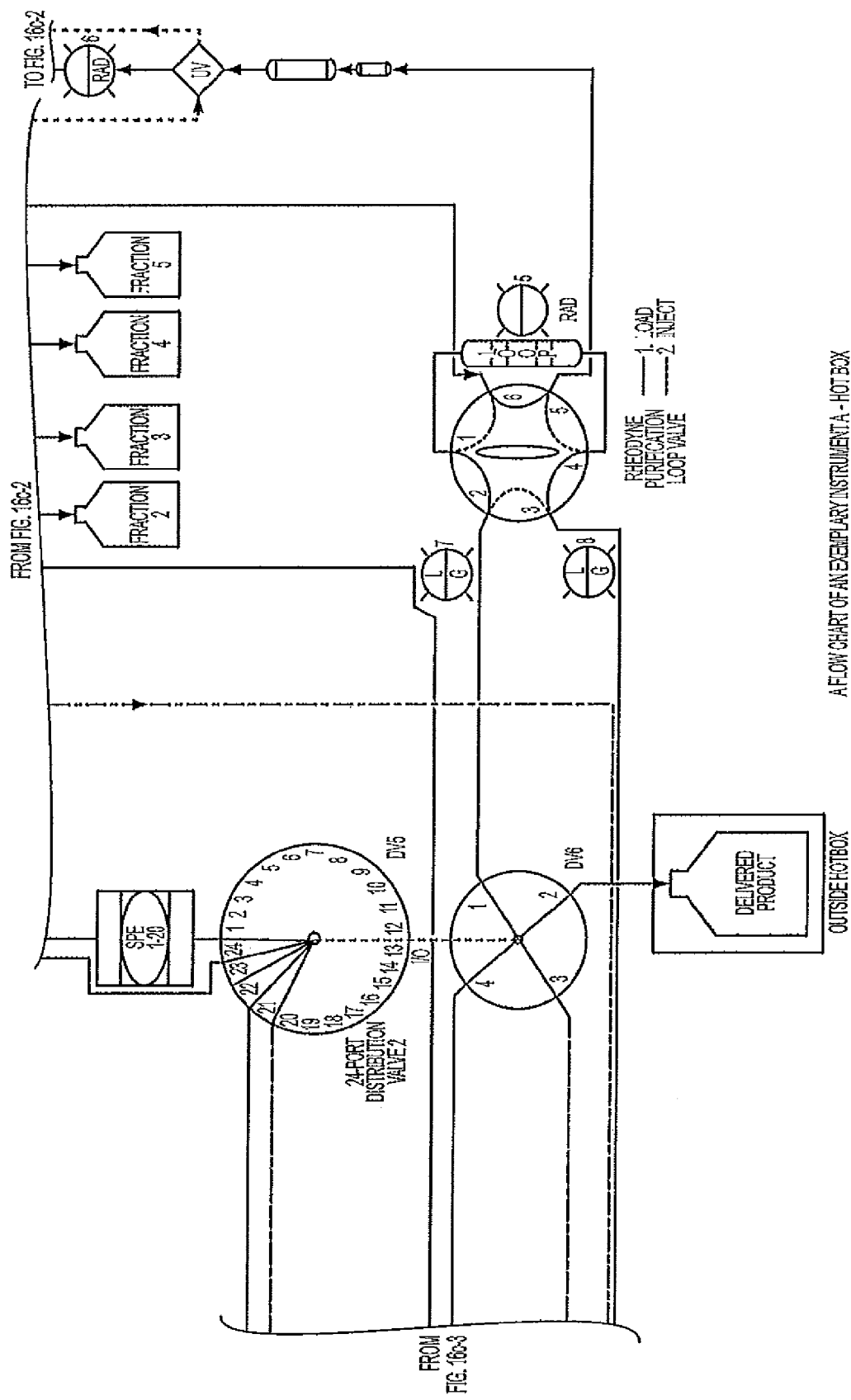

FIGS. 16a-c (Instrument A) and 17a-c (Instrument B) are similar to each other in that they both illustrate the detailed diagrams of the various components (Tables 1a and 1b) as well as fluid and gas network in accordance with various embodiments of the present invention. However, FIGS. 17a-c illustrating Instrument B scheme includes additional details regarding the micro-reactor or the chip system as disclosed herein. FIGS. 16a-c show Instrument B operation setup, where the macro reactor (only, no microfluidic chip) is used for the radiosynthesis of PET tracers with macro-scale reagent volumes. Typical operation volumes for micro reactors are from about 5 to about 50 µL of solution or 1 ng to 10 mg of the dissolved solids. Typical volumes used in macro reactors are from about 0.1 to about 10 mL of solution and from about 1 mg to abut 1 g of solid components. The operational volumes and amounts can differ from the typically used values and go beyond these ranges depending on the properties of individual precursors (solubility, molecular weight, etc.).

TABLE 1a

Instrument B Component List - Cold Box:

Part Number/Part Name

100 Inert Gas Inlet ($N_2$, >120 PSI)
102 Manual Pressure Regulator (120 PSI)
104 Powered Safety Valve & Regulator
106 HP Automated Pressure Regulator
108 8-Way Manifold High Pressure
110 AV-1
112 AV-2
114 AV-3
116 AV-4
118 Manual Air Flow Valve
120 Pump 4
122 Flowmeter
124 DV-1
126 DV-2
128 EtOH Pump
130 $H_2O$ Pump
132 MeCN Pump
134 Release Reagent (K2CO3) ZWF
136 Phase Transfer Reagent (K222) ZWF
138 Chip Reagent 1 (Prec.) ZWF
140 Chip Reagent 2 (Acid) ZWF
142 Chip Reagent 3 (Base) ZWF
144 Col. Regen. (KHCO3)
146 Filter
148 Macro Reactor Reagent 1
150 Macro Reactor Reagent 2
152 Macro Reactor Reagent 3
154 Reformulation Eluent
156 MeCN Reservoir
158 Spare
160 Pump 2 Spare
162 Solvent 1
164 Solvent 2
166 Solvent 3 ($H_2O$)
168 Solvent 4 (EtOH)
170 HPLC Pump
Line 1 - $N_2$ To $^{18}$F Vial AV1
Line 2 - Column Regeneration
Line 3 - Release & PTR
Line 4 - Chip Reagent 3

TABLE 1a-continued

Instrument B Component List - Cold Box:

Part Number/Part Name

Line 5 - Chip Reagent 2
Line 6 - Chip Reagent 1
Line 7 - Chip Eluent ($H_2O$)
Line 8 - $N_2$ From Flowmeter & AV2
Line 9 - $N_2$ & Solvents
Line 10 - Macro-Reactor Reagent 1
Line 11 - Macro-Reactor Reagent 2
Line 12 - Macro-Reactor Reagent 3
Line 13 - Reformulation Eluent
Line 14 - $N_2$, $H_2O$, EtOH Reformulation Cleaning
Line 15 - Solvent From HPLC Pump
Line 16 - Light Source
Line 17 - UV Detector
Line 18 - Spare

TABLE 1b

Instrument B Component List - Hot Box:

Part Number/Part Name

Line 1 - $N_2$ To $^{18}F$ Vial AV1
Line 2 - Column Regeneration
Line 3 - Release & PTR
Line 4 - Chip Reagent 3
Line 5 - Chip Reagent 2
Line 6 - Chip Reagent 1
Line 7 - Chip Eluent ($H_2O$)
Line 8 - $N_2$ From Flowmeter & AV2
Line 9 - $N_2$ & Solvents
Line 10 - Macro-Reactor Reagent 1
Line 11 - Macro-Reactor Reagent 2
Line 12 - Macro-Reactor Reagent 3
Line 13 - Reformulation Eluent
Line 14 - $N_2$, $H_2O$, EtOH Reformulation Cleaning
Line 15 - Solvent From HPLC Pump
Line 16 - Light Source
Line 17 - UV Detector
200 Inert Compressed Air (120 PSI)
201 Manual Pressure Regulator (120 PSI)
202 Manual Pressure Regulator (12 PSI)
203 Pneumatic Actuator Control Valves (RPA1-RPA6, LPA1, LPA2)
204 Inlet From Cyclotron
205 $^{18}F$ Vial 5 mL Conica
206 Filter
207 LV-15
208 RAD 1
209 RAD 2
210 Ion Exchange Column
211 Rheodyne Traping Valve
212 AV 8
213 LG 1
214 LV-9
215 $^{18}H_2O$ Waste 50 ml
216 AV 9
217 P (blue)
218 P (orange)
219 LV 18
220 Charcoal Trap
221 Vent Outlet
222 LV 19
223 P (purple)
224 Waste Pump
225 Waste Outlet
226 General Waste 250 mL
227 Load cell
228 Chip
229 RAD 3
230 LG 2
231 LG 3
232 LG 4
233 LG 5
234 LG 6

TABLE 1b-continued

Instrument B Component List - Hot Box:

Part Number/Part Name

235 RPA 1 $^{18}F$
236 RPA 2 Precursor
237 RPA 3 $H_2O$
238 RPA 4 Exit
239 RPA 5 Acid
240 RPA 6 Base
241 LPA 1 $N_2$
242 LPA 2 Vent
243 LV 11
244 LV 12
245 LV 13
246 LV 14
247 Chip Heater
248 Trap Vial 5 mL Conica
249 LG 9
250 Vacuum Pump
251 Macro Reactor
252 RAD 4
253 Macro Heater
254 DV 3
255 DV 4 (24-port DV1)
256 SPE 1-20
257 DV 5 (24-port DV2)
258 DV 6
259 Delivered Product Outlet
260 LV 16
261 Product Fraction Collector
262 RAD 2
263 Rheodyne Distribution Valve DV 7
264 Fraction Collectors 1-5
265 LG 7
266 LG 8
267 Rheodyne Purificaton Loop Valve
268 Loop
269 RAD 5
270 RAD 6
271 UV Detector
272 RAD 7
273 HPLC Column
274 Guard Column Before the synthesis, the instrument goes through a cleaning cycle, then the system completes the priming step which brings the reagents used in excess (for example, HCl and $H_2O$) to the chip or the macro reactor via the dead volume bypass system (automatically). Solvents for cleaning, priming, reaction use and purification and other processes are being drawn from the cold box solvent reservoirs 156 (Acetonitrile or MeCN reservoir) (see FIGS. 17b), and 162 (Solvent 1 reservoir), 164 (Solvent 2 reservoir), 166 (Solvent 3, for example $H_2O$), and 168 (Solvent 4, for example EtOH) by the corresponding solvent pumps 128 (EtOH pump), 130 ($H_2O$ pump) and 132 (MeCN pump) through the distribution valves DV1 and DV2 into the corresponding solvent and reagent vials such as 134 (release of $K_2CO_3$ reagent), 136 (Phase transfer reagent K222), 138 (Chip reagent 1 or precursor), 140 (Chip reagent 2 or precursor), 142 (Chip reagent 3 or Base), 144 (Column regeneration reagent $KHCO_3$) equipped with a filter 146, macro reactor vials 148, 150, and 152, and reformulation eluent vial 154. The spare solvent reservoir 158 and a spare pump 160 are also incorporated into the instrument to replace one of the existing components or for additional use. HPLC pump 170 delivers the required solvent from reservoirs 162, 164, 166, and 168 of the cold box into the hot box for purification and column regeneration purposes.

Pressurized nitrogen gas is introduced into the cold box through the gas inlet 100. Nitrogen passes through manual pressure regulator 102, power safety valve and regulator 104 and high pressure automated pressure regulator 106 on the way to the 8-way high pressure manifold, from which nitrogen is being used for actuating the distribution valve DV1 and for delivery and dispensing reagents in the hot box. High pressure nitrogen is controlled by air valves 110, 112, 114, and 116. Precise volumes of nitrogen are aspired by pump 4, component 120, from the 8-way manifold 108 via air valve 114 and dispensed toward the distribution valve D1, component 124, for pneumatic actuation of Pumps 128, 130 and 132 and distribution valve D2, component 126 for dispensing the exact amounts of the reagents into the lines or tubing leading to the hot box for the further radiosynthesis procedure. Pressurized nitrogen gas (HP) is controlled by and distributed from manifold 108 through air valves 110, 112, 114, 116, and 118 to lines 1 and 8, pump 4 and to distribution valve DV1, component 124. These processes are described in more detail in Table 2, which shows an exemplary run of the system according to the flow chart on FIG. 17c.

FIG. 16b outlines the instrumental set up of the hot box. Radioactive target water containing [F-18]fluoride is delivered into the vial 205 (labeled "$^{18}$F Vial 5 mL Conical") from cyclotron 204 before the trapping procedure is started. Rheodyne Trapping Valve 211 (RTV) can be set to a "trapping" position. High pressure nitrogen comes from the cold box and may be controlled by AV1 110 and/or manual air flow valve 118 is used to force the target water through the filter 206, valve LV 15, part 207, onto the ion exchange column 210 (IEC or I/E column) which traps and holds the [F-18]fluoride while passing the stripped water on to a collection vial 215 (labeled "$H_2^{18}O$ Waste"). Then, the rheodyne trapping valve 211 can be switched to the "release" position. $K_2CO_3$ and K222 from the corresponding reservoir 134 and 136 of the cold box may be delivered via the corresponding line 3 ("Release & PTR") and dispensed toward the I/E column by means of the RTV 211. The precise volume of nitrogen is used to push the $K_2CO_3$ through the TIE column in the opposite direction to release the trapped [F-18]fluoride and then deliver it into the reaction chamber within the microfluidic chip 228 through the chip valve RPA 1, element 235.

During release, $K_2CO_3$ solution is passed through the column. As it enters the column the back pressure is low, but extra pressure can be generated behind the release solution in order to push it through the column. The solution comes out of the column slowly, but as soon as the last portion of liquid is out, the back pressure vents through the column accelerating the solution towards the chip rapidly. In order to avoid rapid uncontrolled entrance of the release solution into the chip, an expansion tube was added to the instrument. This can be about 6-feet long with about 0.030" ID (internal diameter) line placed between the column and the chip. The release solution travels rapidly through this tube until the back pressure has been released (which happens before the solution reaches the chip.) Then the Loop valve controlling I/E column (same as RTV) is switched from Release to Trap and more gas is dispensed into this line. But this time it does not have to go through the column and overcome its resistance. It can drive the release solution into the chip in a controlled manner (by dispensing a known volume of gas at a known rate with a syringe).

Some F-18 may remain in the plumbing between the column 210 and the chip 228, and some even on the column. In order to maximize the use of F-18, according to one of the embodiments of the present invention, the instrument sends the K222 solution behind $K_2CO_3$ through the same lines to mop up the remaining F-18.

According to an embodiment of the present invention, F-18 is delivered into the macro reactor (RPA 4 (238) and DV3 (254)) through micro reactor in the design shown on FIG. 16b.

Another embodiment of the present invention relates to an instrument where F-18 can be directed off the column to either of the reactors. Such design involves I/E column placed between DV4 (24-port distribution valve, part 255) and DV 5 (24-port distribution valve, part 257) similar to one of the SPEs (such as, for example SPE 256).

Chip 228 is configured to receive the exact amounts of PET tracer precursor, base, acid, and chip eluent from the corresponding reagent reservoirs from the cold box via the corresponding lines 4 ("Chip Reagent 3"), 5 ("Chip Reagent 2"), 6 ("Chip Reagent 1"), and 7 ("Chip Eluent ($H_2O$)") and through the corresponding RPA 2 (on chip liquid valve) (port 236), RPA 3 (port 237), RPA 5 (port 239), and 6 (port 240). The chip is further equipped with RPA 4 (port 238) for the exit line going to DV3 (254), LPA 1 (port 241) connected with the nitrogen gas line 8 a line going to the microreactor 251 (also shown on FIG. 10) through LV 14 (246) and LPA 2 (port 242), which is connected to a vent line leading to the distribution valve 5 (DV5, component 257) for further distribution of raw product to HPLC, macro reactor or final product vial (delivered product) or waste.

Distribution valves DV1-DV6 are used for delivery of reagents to various locations. The system as described herein can use at least from 2 to 20 various reagents, which can be delivered to any of at least 2-20 receiving locations (valves, vials, reservoirs, reactors, etc.). Various custom designs can incorporate more than 20 reagents and more than 20 locations for processing such reagents.

The temperature of the system described herein may be controlled by resistive heaters and compressed air cooling.

According to another embodiment of the present invention, during acetonitrile evaporation process, the precise drying amount is determined using the timer plus the feedback from the machine vision system. In the machine vision system, several boxes within the view area of the reactor are programmed when wet and dry using red, green, blue, hue, saturation, and brightness values for each box. These values plus time are used to determine the level of dryness. The chip nitrogen valve LPA 1 is closed while chip vent valve LPA 2 stays open in order to fill the acid. The acetonitrile evaporation is designed to be only partial—just to clear enough room for the acid. If the evaporation is allowed to proceed to completion, it will be difficult to dissolve the organic residue in aqueous acid without stirring.

In another embodiment of the present invention, elution takes place when chip valve RPA 3 (237) is opened, chip valve PRA 4 "EXIT" (238) is opened, and water is dispensed toward the chip to elute the raw product into DV3 from which the sample can be delivered to macro reactor or into the "Injection Loop" 268 depending on the position chosen for the "Injection Loop Valve" 267 or to the general waste system 225.

Another embodiment of the present invention relates to a purification procedure. If the product is eluted into the "Injection Loop", now the "Injection Loop Valve" 282 has to switch from "Chip" to "HPLC" position. Next the "HPLC Pump" 170 (FIG. 16a) is started forcing the raw product into the "HPLC Column" 273, equipped with a guard column 274. The column separates various compounds in the raw product stream so that they come off the column at various retention times (HPLC) and distributed via RDV 7 (263) as various fractions to fraction collectors 279. The system is programmed to detect and isolate known compounds such as FLT automatically while executing pre-programmed gradient, step or isocratic programs. A radiation detector RAD 6

(270) and a UV detector 271 may be used to monitor the liquid leaving the column and to trigger the DV6 (valve 258) to direct the purified product into a purified product receiver through the product outlet 259 and the remaining liquid into the "General Waste" container 225. The purified product receiver is connected with the interlocking pig device (not shown on FIGS. 17*a* and 17*c*).

Another embodiment of the present invention relates to the cleaning step which performs the ion exchange column 210 regeneration as well as the microfluidic chip 228 and macro reactor 266 cleaning before a subsequent run. Additional details regarding cleaning operations are shown in Table 2, entries 8-11.

Operations of the exemplary instrument B are analogous to the operations of the exemplary instrument A except, for example, for the processes and hardware related to the microfluidic reactor or chip operations.

Use of the System for Preparation of $^{18}$F—FLT

Furthermore, the following description provides an example of a set of steps that may be carried out in accordance with the various embodiments of the present invention for preparation of [$^{18}$F]-FLT. Throughout the following description reference is made to the various components that are shown in FIGS. 17*a*, 17*b*, 17*c* and 18 and Table 2. All flow chart components shown in FIGS. 17*b* abd 17*c* are listed in Tables 1a and 1b.

TABLE 2

Unit Operations of the exemplary Instrument B

| No. | Category | Unit Operation Name | UO on modified flow diagram |
|---|---|---|---|
| 1 | Trap | Trapping | Set HP (High Pressure) to default or specified value. Set Rheo trapping valve to "trapping". Make sure LV15 and LV9 are off. Turn on LV18 (close it). Turn on AV1. L/G detector 1 (LG1) will first detect liquid then gas. After it detects gas, pause 10 seconds and turn off AV1 and drop HP to zero. Turn off LV18. |
| 2 | Release | Release with Release Agent volume | Cold Phase: Set HP = 0. Aspirate 2500 by Pump 4 from position 1. Hot Phase: Open RPA 1 and LPA 1. Make sure LV14 is off. Turn trapping valve to "release". Turn DV2 to position 1. Turn DV1 to position 5. Turn 4-4 on SP4 to position 2. Set HP regulator to 10 psi, open AV4 and watch LG2. When LG2 detects liquid, drop HP to zero and close AV4. Pause 3 seconds. Open AV3. Turn DV1 to position 4. Dispense 500 uL at the rate of 50 to position 2 with SP4. Close RPA 1. Close LPA 1. Close AV3. User instructions: Fill release reagent in vial. |
| 3 | Release | Release with release reagent and Phase Transfer Reagent volume | Same as 2 except (1) DV2 goes to position 2 not 1 (2) user instructions should request placing the specified volume of phase transfer reagent into vial. If the release is done with both, instruct the user to fill both vials, but the unit operation is identical. |
| 4 | Evaporation | Evaporation in Micro Reactor with Temp, pressure, time | Set HP to zero. Open LPA 1. Open LPA 2. Set DV5 to 23. Set DV6 to 4. Set T to specified value. Open AV2. Make sure LV14 is off. Ramp HP from zero to set value at a rate of 1 psi/sec up to 10 psi then 10 psi/sec up to the final value. Start timer. When timer runs out, set T = 45 deg. Drop pressure to zero at 10 psi/sec. Close LPA 1. Close LPA 2. Close AV2. |
| 5 | Evaporation | Evaporation in Macro Reactor with Temp, pressure, time | Set HP to zero. Turn on LV14. Turn DV5 to 21 and DV6 to 4. Make sure Purification loop valve is in "inject" position. Set macro T to specified value. Open AV2. Ramp High P to specified value at 10 psi/sec. Start timer. When timer runs out, set T = 45 deg. Drop pressure to zero at 10 psi/sec. Turn off AV2. Turn off LV14. |
| 6 | Reaction | Reaction in Micro Reactor with Temp, pressure, time | open LPA1. Open AV2. Make sure LV14 is off. Ramp HP to desired pressure (between 0 and 10 psi at 1 psi/sec, above 10 psi at 10 psi/sec). Close LPA1. Close AV2. Set temperature. Start timer. When timer is finished, set T = 45 deg. Wait for T to drop below 55 deg. Open AV2. Open LPA1. Ramp pressure down at 10 psi/sec. Close LPA 1. Close AV2. Set HP = 0. |
| 7 | Reaction | Reaction in Macro Reactor with Temp, pressure, time | Turn on LV14. Turn Rheodyne purification valve to "inject". DV6 to 4. DV4 and DV5 to 24. Open AV2. Ramp HP to desired pressure (at 10 psi/sec). Close LV14. Close AV2. Set temperature. Start timer. When timer is finished, set T = 45 deg. Wait for temperature to drop to 55 deg. Open AV2. Open LV14. Ramp pressure down at 10 psi/sec. LV14 off. Close AV2. Set HP = 0 |
| 8 | Clean cycle | Cleaning cycle in Chip | Set Chip T = 100 deg. (1) Fluoride lines: DV4 to 23. DV3 to 3. RPA 4 on. LPA 1 and LPA 2 off. RPA 1 on. Rheodyne trapping valve in "release" position. DV2 to 2. DV1 to 3. Meter 500 uL MeCN. Set HP = 30 psi. AV4 on. Turn DV1 to 5. When LG2 goes from liquid to gas wait 10 sec and turn AV4 off. Turn DV1 to 2. Meter 500 uL of water. Av4 on. DV1 to 5. Wait for LG 2 to go from liquid to gas, wait 10 sec and turn off AV4. Turn Rheodyne to "trap" position. Turn DV1 to 3. Meter 500 uL MeCN. Turn AV4 on. Turn DV1 to 5. Wait for LG2 to go from liquid to gas, wait 100 sec and turn off RPA 1, then AV4. (2) Reagent 2 lines: Turn DV2 to 4, Dv1 to 2. Meter 500 uL of water. Turn on AV4. Turn on RPA 5. Turn on LV12. Turn DV1 to 5. When LG4 sees liquid alternate LV12 at 1 Hz 10 times leaving LV 12 on at the end. When LG 4 goes to gas wait 10 sec and turn off AV4. Turn DV1 to 3. Meter 500 uL MeCN. Turn on AV4. Turn DV1 to 5. When LG4 sees liquid alternate LV12 at 1 Hz 10 times. When LG 4 |

TABLE 2-continued

Unit Operations of the exemplary Instrument B

| No. | Category | Unit Operation Name | UO on modified flow diagram |
|---|---|---|---|
|  |  |  | goes to gas alternate LV 12 again 20 times leaving it on at the end. wait 100 sec and turn off RPA 5 then AV4. (3) Reagent 3 lines: Turn DV2 to 5, Dv1 to 2. Meter 500 uL of water. Turn on AV4. Turn on RPA 6. Turn on LV11. Turn DV1 to 5. When LG5 sees liquid alternate LV11 at 1 Hz 10 times leaving LV 11 on at the end. When LG 5 goes to gas wait 10 sec and turn off AV4. Turn DV1 to 3. Meter 500 uL MeCN. Turn on AV4. Turn DV1 to 5. When LG5 sees liquid alternate LV11 at 1 Hz 10 times. When LG5 goes to gas alternate LV 11 again 20 times leaving it on at the end. wait 100 sec and turn off RPA 6 then AV4. (4) Vents: Close RPA 4. Open LPA1 and LPA 2. Set DV5 to 23. DV6 to 4. AV2 on. Wait 100 sec. AV2 off. LPA 1 off. LPA 2 off. (5) Eluent Line: RPA 4 on. DV4 to 22, DV3 to 4. Turn DV2 to 6, DV1 to 2. Meter 500 uL of water. Turn on AV4. Turn on RPA 3. Turn on LV13. Turn DV1 to 5. When LG6 sees liquid alternate LV13 at 1 Hz 10 times leaving LV 13 on at the end. When LG 6 goes to gas wait 10 sec and turn off AV4. Turn DV1 to 3. Meter 500 uL MeCN. Turn on AV4. Turn DV1 to 5. When LG6 sees liquid alternate LV13 at 1 Hz 10 times. When LG 6 goes to gas alternate LV 13 again 20 times leaving it on at the end. wait 100 sec and turn off RPA 3 then AV4. (6) Reagent 1 (precursor) lines: Turn DV2 to 3. Turn DV1 to 3. Open RPA 2. Meter 500 uL MeCN. Turn on AV4. Turn DV1 to 5. When LG3 goes to gas Turn on LPA1 and LPA 2 wait 600 sec and turn off LPA 1, LPA2, RPA 2, RPA4 then AV4. Turn HP to 0. Set Chip T = 25 deg. |
| 9 | Clean cycle | Cleaning cycle in Macro reactor | Rheodyne purification valve to "inject" position. DV6 to1. DV5 to 22. DV4 to 22. Set Macro T = 100 deg. (1) Reagent 1 lines: DV3 to 1. DV2 to 9. DV1 to 2. Meter 1000 uL of water. Set HP = 30 psi. AV4 on. Turn DV1 to 5. LG7 will go from gas to liquid to gas. When it sees gas after liquid, wait 5 sec and turn off AV4. Turn DV1 to 3 and meter 1000 uL MeCN. Turn on AV4. Turn DV1 to 5. Wait for LG7 to go from liquid to gas. Wait 100 sec. Turn off AV4. (2) Reagent 2 lines: DV3 to 8. DV2 to 10. DV1 to 2. Meter 1000 uL of water. Set HP = 30 psi. AV4 on. Turn DV1 to 5. LG7 will go from gas to liquid to gas. When it sees gas after liquid, wait 5 sec and turn off AV4. Turn DV1 to 3 and meter 1000 uL MeCN. Turn on AV4. Turn DV1 to 5. Wait for LG7 to go from liquid to gas. Wait 100 sec. Turn off AV4. (3) Reagent 3 lines: DV3 to 7. DV2 to 11. DV1 to 2. Meter 1000 uL of water. Set HP = 30 psi. AV4 on. Turn DV1 to 5. LV7 will go from gas to liquid to gas. When it sees gas after liquid, wait 5 sec and turn off AV4. Turn DV1 to 3 and meter 1000 uL MeCN. Turn on AV4. Turn DV1 to 5. Wait for LG7 to go from liquid to gas. Wait 600 sec. Turn off AV4. Set macro T = 25 deg. |
| 10 | Clean cycle | Cleaning cycle in HPLC | This unit op involves only the HPLC pump. Rheodyne purification valve stays in the "inject" position throughout the entire cycle. The cycle consists of an HPLC program that starts with pumping water for 10 min, then ramp to 100% EtOH over 5 min, then pumps EtOH for 10 min and stops. |
| 11 | Clean cycle | Cleaning cycle in Ion Exchange column (to be done after chip cleaning) | Set Rheo trapping valve to "trapping" position. DV1 to 5. DV2 to 8. Turn on LV15 and LV9. Set HP = 30 psi. AV4 on. LG1 will detect liquid then gas. After it detects gas following liquid wait 30 sec and turn off AV4. Turn DV1 to 2. Meter 3 mL of water with a water pump. Turn DV1 to 5. LG1 should be seeing liquid now. When it goes to gas, wait 300 sec and turn AV4 off. Turn off LV15 and LV9. Set HP to zero. Setup phase: instruction "Fill KHCO3 with 3 mL of solution." |
| 12 | Pause | Pause for User | same |
| 13 | Pause | Pause for Wait at least 30 sec | same |
| 14 | Move product | Move product From Micro Reactor to Macro Reactor with solvent (water, EtOH or MeCN) | Cold phase: DV1 to 2. DV2 to 6. Make sure LV13 is off. Set DV4 to 21 and DV3 to 4. Meter 1000 uL of water by water pump. Turn DV1 to 5. Set HP = 10 psi. Open AV4. Monitor LG6. When it detects liquid, close AV4 and drop HP to zero. Wait 5 sec. turn DV2 to8. Hot Phase: DV6 to 1. DV4 and DV5 to 24. DV3 to 3. Make sure LPA1 and LPA2 are off. LV 13 on. LV14 on. Make sure Rheodyne purification loop valve is in "inject" position. Open RPA 4. Open RPA3. Set HP = 10 psi. DV2 to 6. DV1 to5. Turn on AV4. Monitor LG8. It will go from gas to liquid to gas again. When it goes to gas after liquid, wait 10 sec. Then turn off RPA3, RPA4, AV4, LV13, LV14. Set HP = 0 psi. Setup phase: check or top off water in HPLC bottle. (One can choose to move with EtOH or MeCN. In these cases pump with appropriate pumps instead of water pump and set DV1 to positions 1 or 3 respectively while pumping the solvent.) |

TABLE 2-continued

Unit Operations of the exemplary Instrument B

| No. | Category | Unit Operation Name | UO on modified flow diagram |
|---|---|---|---|
| 15 | Move product | Move Product From Micro Reactor to Macro Reactor with Reagent (Chip reagent 3) | Cold phase: Make sure LV11 is off. DV2 to 5, DV1 to5. Set HP = 10 psi. Open AV4. Monitor LG5. When it turns from gas to liquid turn off AV4 and drop HP to 0. Turn DV2 to 8. Hot Phase: DV6 to 1. DV4 and DV5 to 24. DV3 to 3. LV14 on. Make sure LPA1 and LPA2 are off and Rheodyne purification valve is in "inject" position. Set HP = 10 psi. DV2 to 5 DV1 to 5. Open RPA 4. Open RPA6. Turn AV4 on. Monitor LG8. It will go from gas to liquid to gas again. When it goes to gas after liquid, wait 10 sec. Then turn off RPA6, RPA4, AV4, LV14. Set HP = 0 psi. Setup phase: Place the appropriate volume of organic reagent into chip reagent 3 vial (if it has not been used in the process earlier). |
| 16 | Move product | Move product From Micro Reactor to SepPak with water (or MeCN or EtOH) | Cold phase: (1) SepPak prep: Cold Phase: Specify which sepPak will be used. Set DV6 to 4, DV5 and DV4 to the selected SepPak, DV3 to 2. DV2 to 7, DV1 to1. Pump 1000 uL of EtOH. Set HP = 30 psi. Open AV4. Turn DV1 to 5. Wait until LG9 goes from liquid to gas. Turn DV1 to 2. Pump 1000 uL of H2O with water pump. Turn DV1 to 5. Wait until LG9 turns from liquid to gas. Turn off AV4. (2) DV1 to 2 for water, to 1 for EtOH, to 3 for MeCN. DV2 to 6. Make sure LV13 is off. Set DV4 to 21 and DV3 to 4. Meter 1000 uL of solvent by the appropriate pump. Turn DV1 to 5. Set HP = 10 psi. Open AV4. Monitor LG6. When it detects liquid, close AV4 and drop HP to zero. Wait 5 sec. Turn DV2 to 8. Hot Phase: DV6 to 4. DV4 and DV5 to selected SepPak number. DV3 to 3. Make sure LPA1 and LPA2 are off. LV 13 on. Set HP = 10 psi. DV2 to 6. DV1 to5. Turn on AV4. Open RPA 4. Open RPA3. Monitor LG9. It will go from gas to liquid to gas again. When it goes to gas after liquid, wait 30 sec. Then turn off RPA3, RPA4, AV4, LV13. Set HP = 0 psi. Setup phase: check or top off water or solvents in appropriate bottles. |
| 17 | Move product | Move Product From Micro Reactro to SepPak with reagent (Chip Reagent 3) | Cold phase: (1) SepPak prep: Cold Phase: Specify which sepPak will be used. Set DV6 to 4, DV5 and DV4 to the selected SepPak, DV3 to 2. DV2 to 7, DV1 to1. Pump 1000 uL of EtOH. Set HP = 30 psi. Open AV4. Turn DV1 to 5. Wait until LG9 goes from liquid to gas. Turn DV1 to 2. Pump 1000 uL of H2O with water pump. Turn DV1 to 5. Wait until LG9 turns from liquid to gas. Turn off AV4. (2) Make sure LV11 is off. DV2 to 5, DV1 to 5. Set HP = 10 psi. Open AV4. Monitor LG5. When it turns from gas to liquid turn off AV4 and drop HP to 0. Turn DV2 to 8. Hot Phase: DV6 to 4. DV4 and DV5 to selected SepPak number. DV3 to 3. Make sure LPA1 and LPA2 are off. LV 11 on. Set HP = 10 psi. DV2 to 5. DV1 to5. Turn on AV4. Open RPA 4. Open RPA6. Monitor LG9. It will go from gas to liquid to gas again. When it goes to gas after liquid, wait 30 sec. Then turn off RPA6, RPA4, AV4, LV11. Set HP = 0 psi. Setup phase: check or top off water or solvents in appropriate bottles. |
| 18 | Move product | Move product From Micro Reactor to HPLC with water (or EtOH or MeCN) | Cold phase: DV1 to 2 for water, to 1 for EtOH. to 3 for MeCN. DV2 to 6. Make sure LV13 is off. Set DV4 to 21 and DV3 to 4. Meter 1000 uL of solvent by the appropriate pump. Turn DV1 to 5. Set HP = 10 psi. Open AV4. Monitor LG6. When it detects liquid, close AV4, LV13 on, and drop HP to zero. Wait 5 sec. Turn DV2 to 8. Hot Phase: Turn Rheodyne purification valve to "Load". DV6 to 1. DV4 and DV5 to 24. DV3 to 3. Make sure LPA1 and LPA2 are off. Set HP = 10 psi. DV2 to 6. DV1 to5. Turn on AV4. Open RPA 4. Open RPA3. Monitor LG7. It will go from gas to liquid to gas again. When it goes to gas after liquid, switch Rheodyne purification valve to inject". Then turn off RPA3, RPA4, AV4, LV13. Set HP = 0 psi. Setup phase: check or top off water or solvents in appropriate bottles. |
| 19 | Move product | Move Product From Micro Reactor to HPLC with Reagent (Chip reagent 3) | Cold phase: Make sure LV11 is off. DV2 to 5. DV1 to5. Set HP = 10 psi. Open AV4. Monitor LG5. When it turns from gas to liquid turn off AV4 and drop HP to 0. Turn DV2 to 8. Hot Phase: DV6 to 1. DV4 and DV5 to 24. DV3 to 3. LV11 on. Make sure LPA1 and LPA2 are off and Rheodyne purification valve is in "Load" position. Set HP = 10 psi. DV2 to 5, DV1 to 5. Open RPA 4. Open RPA6. Turn AV4 on. Monitor LG7. It will go from gas to liquid to gas again. When it goes to gas after liquid, switch Rheodyne purification valve to "inject". Then turn off RPA6, RPA4, AV4, LV11. Set HP = 0 psi. Setup phase: Place 900 uL of reagent into Chip Reagent 3 vial organic reagent into chip reagent 3 vial (if it has not been used in the process earlier). |
| 20 | Move product | Move product From Micro Reactor to Final Product Vial with water (or EtOH or MeCN) | Cold phase: DV1 to 2 for water, to 1 for EtOH, to 3 for MeCN. DV2 to 6. Make sure LV13 is off. Set DV4 to 21 and DV3 to 4. Meter 1000 uL of solvent by the appropriate pump. Turn DV1 to 5. Set HP = 10 psi. Open AV4. Monitor LG6. When it detects liquid, close AV4 and drop HP to zero. Wait 5 sec. Turn DV2 to 8. Hot Phase: DV6 to 2. DV4 and DV5 to 24. DV3 to 3. Make |

TABLE 2-continued

Unit Operations of the exemplary Instrument B

| No. | Category | Unit Operation Name | UO on modified flow diagram |
|---|---|---|---|
| | | | sure LPA1 and LPA2 are off. Set HP = 30 psi. DV2 to 6. DV1 to5. Turn on AV4. Open RPA 4. Open RPA3. Wait 30 sec. Then turn off RPA3, RPA4, AV4. Set HP = 0 psi. Setup phase: check or top off water or solvents in appropriate bottles. Make sure the product vial is vented. |
| 21 | Move product | Move Product From Micro Reactor to Final Product Vial with Reagent (Chip reagent 3) | Cold phase: Make sure LV11 is off. DV2 to 5. DV1 to5. Set HP = 10 psi. Open AV4. Monitor LG5. When it turns from gas to liquid turn off AV4 and drop HP to 0. Turn DV2 to 8. Hot Phase: DV6 to 2. DV4 and DV5 to 24. DV3 to 3. Make sure LPA1 and LPA2 are off. Set HP = 30 psi. DV2 to 5, DV1 to 5. Open RPA 4. Open RPA6. Turn AV4 on. Wait 30 sec. Then turn off RPA6, RPA4, AV4, LV11. Set HP = 0 psi. Setup phase: Place 900 uL of reagent into Chip Reagent 3 vial organic reagent into chip reagent 3 vial (if it has not been used in the process earlier). |
| 22 | Move product | Move product From Macro Reactor to SepPak (not with Organic Solvent or anything else, just by itself) | Cold Phase: Specify which sepPak will be used. Set DV6 to 4, DV5 and DV4 to the selected SepPak, DV3 to 2. DV2 to 7, DV1 to1. Pump 1000 uL of EtOH. Set HP = 20 psi. Open AV4. Turn DV1 to 5. Wait until LG9 goes from liquid to gas. Turn DV1 to 2. Pump 1000 uL of H2O with water pump. Turn DV1 to 5. Wait until LG9 turns from liquid to gas. Turn off AV4. Hot Phase: DV6 to 1. DV5 and DV4 to the desired SepPak #. Rheodyne purification valve to "inject" position. DV3 to 4. LV14 on. Set HP = 10 psi. AV2 on. Wait 30 sec after LG7 goes from liquid to gas. AV2 off. LV14 off. Set HP = 0. Setup phase:. |
| 23 | Move product | Move product From Macro Reactor to HPLC (with gas, not with any Solvents) | Rheodyne purification valve to "load". DV4 to 1. DV5 to 22. Set HP to 10 psi. Open AV2. Turn on LV14. When LG8 goes from Liquid to gas turn Rheodyne valve to "inject". Turn AV2 off. Turn LV14 off. |
| 24 | Move product | Move product From Macro Reactor to Delivered Product Vial | (Takes place through a purified product vial.) DV6 to1, DV5 and DV4 to 24. DV3 to5. Make sure Rheodyne purification valve is in "inject" position. Set HP to 20 psi. LV14 on. AV2 on. After LG7 turns from liquid to gas wait 30 sec and turn off LV14. AV2 off. DV6 to 2. DV2 to 13. DV1 to 5. LV16 on. AV4 on. Wait 30 sec. LV16 off. AV4 off. |
| 25 | Move product | Move product From SepPak to Macro Reactor With SepPak Eluent | DV6 to 1. Make sure Rheodyne Purification valve is in "inject" position. DV4 and DV5 to selected SepPak. DV3 to 6. DV2 to 12. DV1 to 5. LV14 on. Set HP to 30 psi. AV4 on. When LG8 turns from liquid to gas wait 5 sec and Turn AV4 off. Set HP to 0. LV14 off. Setup instructions: fill Eluent vial with specified volume. |
| 26 | Move product | Move product From SepPak to Macro Reactor With ETOH | DV6 to 1. Make sure Rheodyne Purification valve is in "inject" position. DV4 and DV5 to selected SepPak. DV3 to 2. DV2 to 7. DV1 to 1. LV14 on. Meter 1 mL of EtOH. Set HP to 30 psi. Turn DV1 to 5. AV4 on. When LG8 turns from liquid to gas wait 5 sec and Turn AV4 off. Set HP to 0. LV14 off. Setup instructions: make sure there is enough EtOH |
| 27 | Move product | Move product From SepPak to Product Vial with eluent | DV6 to 2. DV4 and DV5 to selected SepPak. DV3 to 6. DV2 to 12. DV1 to 5. Set HP to 30 psi. AV4 on. Wait 90 sec and Turn AV4 off. Set HP to 0. Setup instructions: fill Eluent vial with specified volume |
| 28 | Move product | Move product From HPLC product vial to Macro Reactor (not With SepPak Eluent N2 only) | DV6 to 1. Make sure Rheodyne Purification valve is in "inject" position. DV4 and DV5 to 24. DV3 to 5. DV2 to 13. DV1 to 5. LV14 on. Set HP to 10 psi. LV 16 on. AV4 on. When LG8 turns from liquid to gas wait 5 sec and Turn AV4 off. Set HP to 0. LV14 off. LV16 off. Setup instructions: none |
| 29 | Move product | Move product From HPLC product to Macro Reactor (not With EtOH) | same as above |
| 30 | Move product | Move product From HPLC to SepPak | Cold phase: (1) SepPak prep: Cold Phase: Specify which sepPak will be used. Set DV6 to 4, DV5 and DV4 to the selected SepPak, DV3 to 2. DV2 to 7, DV1 to1. Pump 1000 uL of EtOH. Set HP = 30 psi. Open AV4. Turn DV1 to 5. Wait until LG9 goes from liquid to gas. Turn DV1 to 2. Pump 1000 uL of H2O with water pump. Turn DV1 to 5. Wait until LG9 turns from liquid to gas. Turn off AV4. Hot Phase: DV6 to 4. DV4 and DV5 to selected SepPak. DV3 to 5. DV2 to 13. DV1 to 5. LV14 on. Set HP to 10 psi. LV 16 on. AV4 on. When LG9 turns from liquid to gas wait 5 sec and Turn AV4 off. Set HP to 0. LV14 off. LV16 off. Setup instructions: none |

TABLE 2-continued

Unit Operations of the exemplary Instrument B

| No. | Category | Unit Operation Name | UO on modified flow diagram |
|---|---|---|---|
| 31 | Move product | Move product From HPLC product to Product Vial | DV6 to 2. DV4 and DV5 to 24. DV3 to 5. DV2 to 13. DV1 to 5. Set HP to 10 psi. LV16 on. AV4 on. Wait 30 sec and turn AV4 off. Set HP to 0. LV14 off. LV 16 off. Setup instructions: none |
| 32 | Move product | Move product From SepPak to HPLC with Eluent | DV6 to 1. Make sure Rheodyne Purification valve is in "load" position. DV4 and DV5 to selected SepPak. DV3 to 6. DV2 to 12. DV1 to 5. Set HP to 30 psi. AV4 on. Monitor LG7. It will go from gas to liquid to gas again. When it goes to gas after liquid, switch Rheodyne purification valve to inject". Then turn off AV4 and set HP = 0 psi. Setup instructions: fill Eluent vial with specified volume |
| 33 | Add reagent | Add Reagent To Micro Reactor From Chip Reagent 1 (precursor) | Cold Phase: Set HP = 0. Turn on LPA 1. Turn on RPA 2. DV2 to 3. DV1 to 5. Set HP = 10 psi. AV4 on and start monitoring LG3. When liquid is detected turn off RPA 2 set HP = 0 and turn off AV4. Wait 5 seconds. Turn off LPA 1. AV3 on. Aspirate 500 uL into Syringe on Pump 4 from Position 1 and turn to Position 2.. Hot Phase: Set HP = 0. DV1 to 4. DV2 to 3. Turn on LPA 1. Turn on RPA 2. Dispense 500 uL by syringe to position 2. Turn off RPA 2. Turn off LPA 1. Setup phase: tell user to add specified amount of reagent to vial. |
| 34 | Add reagent | Add Reagent To Micro Reactor From Chip reagent 2 (Acid) | Cold Phase: Set HP = 0. DV2 to 4. DV1 to 5. Set HP = 10 psi. AV4 on and start monitoring LG4. When liquid is detected turn off AV4. Turn DV2 to 8. HP to 0. AV3 on. Aspirate 500 uL into Syringe on Pump 4 from Position 1 and turn to Position 2. Hot Phase: Set HP = 0. DV1 to 4. DV2 to 4. Turn on LPA 1. Turn on LV12. Turn on RPA5. Dispense 500 uL with syringe to position 2. Turn off RPA 5. Turn off LPA 1. Turn off LV12. Setup phase: tell user to add specified amount of reagent to Chip reagent 2 vial |
| 35 | Add reagent | Add Reagent To Micro Reactor From Chip reagent 3 (base) | Cold Phase: Set HP = 0. DV2 to 5. DV1 to 5. Set HP = 10 psi. AV4 on and start monitoring LG5. When liquid is detected turn off AV4. Turn DV2 to 8. Set HP = 0. AV3 on. Aspirate 500 uL into Syringe on Pump 4 from Position 1 and turn to Position 2. Hot Phase: Set HP = 0. DV1 to 4. DV2 to 5. Turn on LPA 1. Turn on LV11. Turn on RPA6. Dispense 500 uL by syringe to position 2. Turn off RPA 6. Turn off LPA 1. Turn off LV11. Setup phase: tell user to add specified amount of reagent to Chip reagent 3 vial |
| 36 | Add reagent | Add Reagent To Macro Reactor (From Macro reagent 1, 2, or 3) | Set DV2 to 9, 10, or 11 for addition of macro reagents 1, 2, or 3 respectively. Set DV1 to 5. Set DV3 to 1, 8, or 7 for macro reagents 1, 2, or 3 respectively. DV4 and DV5 to 24. Rheodyne purification valve to "inject". LV14 on. Set HP to 10 psi. AV4 on. When LG8 goes from liquid to gas, wait 5 sec and turn AV4 off. LV14 off. DV6 to 4. |
| 37 | Add reagent | Add Solvent To Macro Reactor (water, MeCN or EtOH) | DV6 to 1. Rheodyne purification valve to "inject". DV4 and DV5 to 24. DV3 to 2. DV2 to 7. Turn on LV14. DV1 to 1, 2, or 3 for EtOH, H2O, or MeCN respectively. Pump specified amount by the appropriate pump. Turn HP to 10 psi. Turn on AV4. Turn DV1 to 5. When LG8 goes from liquid to gas, wait 5 sec and Turn off AV4. Turn DV6 to 4. LV14 off. |
| 38 | Add reagent | Add Reagent To Macro Reactor From Macro reagent 1 | Same as "Add Reagent To Macro Reactor (From Macro reagent 1, 2, or 3)" |
| 39 | Add reagent | Add Reagent To Macro Reactor From Macro reagent 2 | Same as "Add Reagent To Macro Reactor (From Macro reagent 1, 2, or 3)" |
| 40 | Add reagent | Add Solvent To SepPak From ETOH, water or MeCN | DV6 to 4. DV4 and DV5 to selected SepPak. DV3 to 2. DV2 to 7. DV1 to 1, 2, or 3 for EtOH, H2O, or MeCN respectively. Pump specified amount by the appropriate pump. Turn HP to 30 psi. Turn on AV4. Turn DV1 to 5. When LG9 goes from liquid to gas, wait 15 sec and Turn off AV4. Set HP = 0. |
| 41 | Add reagent | Add solvent To HPLC product From EtOH, water or MeCN | DV3 to 5. DV4 to 21. Make sure LV13 is off. DV2 to 6. DV1 to 1, 2, or 3 for EtOH, H2O, or MeCN respectively. Pump solvent by appropriate pump. Set HP = 10 psi. Turn on AV4. DV1 to 5. Wait 30 sec. AV4 off. HP to 0. |

Figure 18:
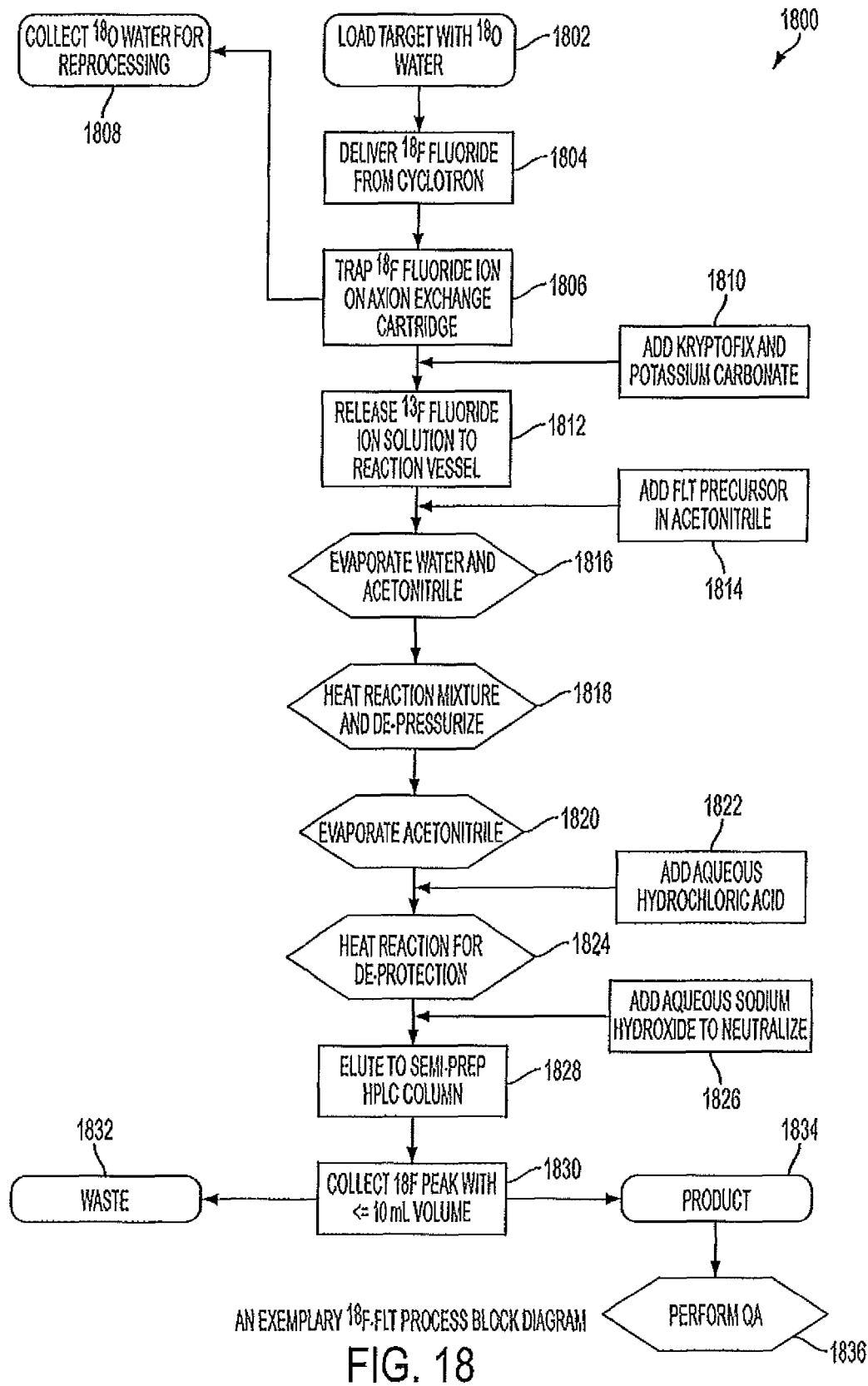
FIG. 18 illustrates an exemplary $^{18}$F—FLT Process Block Diagram.

FIG. 18 shows a series of steps. These steps may be stored on a computer-readable medium and executed by a processor.

According to embodiments of the present invention, a cassette can have functional elements, or components (e.g., HPLC, ion exchange, micro-reactor, reagent chamber, valves etc.) disposed on a cassette. More specifically, some of the functional elements on the cassette may be part of at least some of the removable path which, as described herein, provides the end user with significant convenience and flexibility. The end-user has the ability to evaluate the cost of renewing versus cleaning each of the re-usable components. More expensive portions, or functional elements of the wetted path may be cleaned and checked thoroughly offline from the production process. The end user has the ability to consider several components of the synthesis wetted path, and, for each component, make an economic assessment of whether disposal or cleaning makes better sense in the context of their specific needs, weighing their concerns for quality, economics and their regulatory compliance issues. For a product with multinational marketing that is sold worldwide, this flexibility is a significant advantage to both the manufacturer and its customers.

In the case of the ion exchange column and reaction chamber, making these items re-usable supports using more expensive materials of construction and packing materials, supporting a wider range of options which could provide the cassette with more functionality than available in a fully disposed cassette.

In the case of radiopharmaceutical synthesis, the cassette may be easily set aside to wait until its radioactivity is acceptably low. This waiting time is typically the time duration for the radioactivity to decay such that the radiation level is acceptable for exposure to operators/technicians.

The removable path approach, according to embodiments of the present invention, addresses the cleanable path approach, the disposable path approach, and the hybrid approach.

Figure 19:
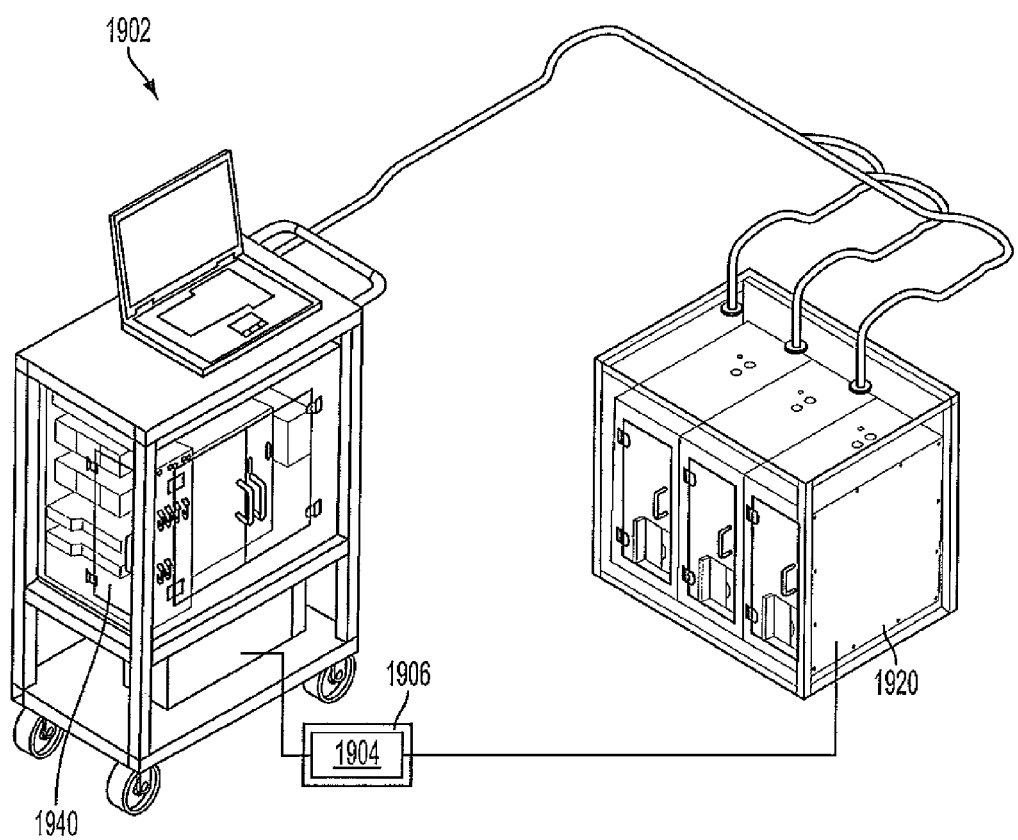
FIG. 19 shows an example of an embodiment of the present invention in which a radiosynthetic device is operatively coupled to a cassette apparatus.

FIG. 19 shows an example of an embodiment of the present invention in which a radiosynthetic device is operatively coupled to a cassette apparatus. As shown in FIG. 19, instrument 1902 (including "hot" component unit 1920 and "cold" component unit 1940) has cartridge apparatus 1904 inserted into reception unit 1906 of instrument 1902. As shown in FIG. 19, the cartridge apparatus 1904 is coupled to the instrument 1902 such that the instrument 1902 can utilize the contents of the cartridge apparatus 1904. The instrument 1902 may convey, provide or introduce the contents, or a portion of the contents of the cartridge apparatus 1904 to either the hot component 1920, cold component 1940 or both the hot components 1920 and cold components 1940. The cartridge apparatus 1904 may be any of a single-use cartridge, a multiple use cartridge, a disposable cartridge, a recyclable cartridge or combination of these types of cartridges.

Figure 20:
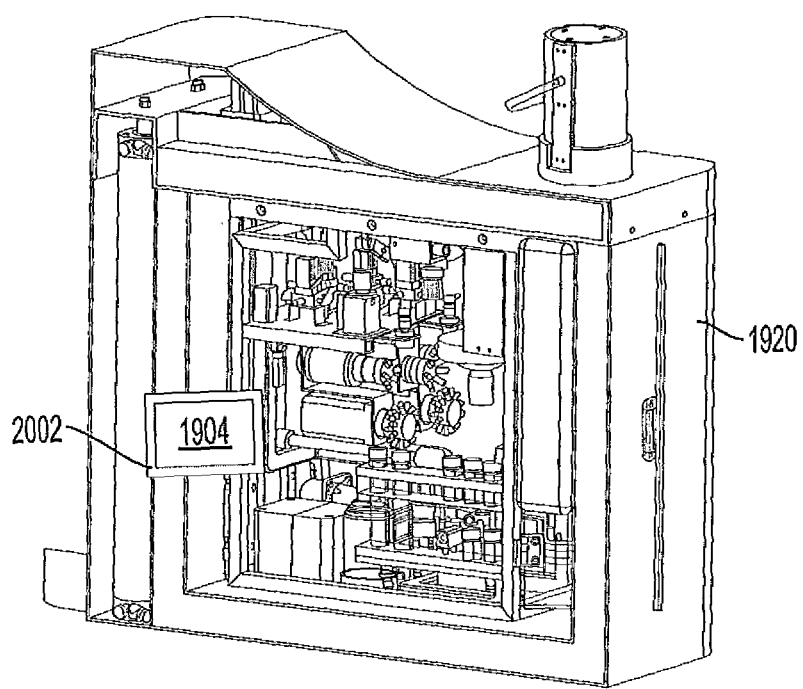
FIG. 20 shows an example of an embodiment of the present invention in which a hot component unit of a radiosynthetic device is operatively coupled to a cassette apparatus.

FIG. 20 shows an example of an embodiment of the present invention in which a hot component unit 1920 of a radiosynthetic device (shown in FIG. 19 as element 1902) is operatively coupled to a cassette apparatus 1904. As shown in FIG. 20, the cartridge, or cassette apparatus 1904 is coupled to the hot component unit 1920 such that the hot component unit 1920 may use the contents, or a portion of the contents, of the cassette apparatus 1904. The cassette apparatus 1904 may be any of a single-use cassette, multiple use cassette, disposable cassette, recyclable cassette or combination thereof. Also, while the cassette 1904 is associated with hot components of hot component unit 1920, shielding 2002 may optionally be used to shield the cassette 1904 from radiation. Thus, the cassette 1904 will have minimal, if any radiation exposure. The shielding 2002 is typically fabricated from a material such as lead, boron-filled polymer or concrete for example. Any suitable material with radiation inhibiting characteristics may also be used.

Figure 21:
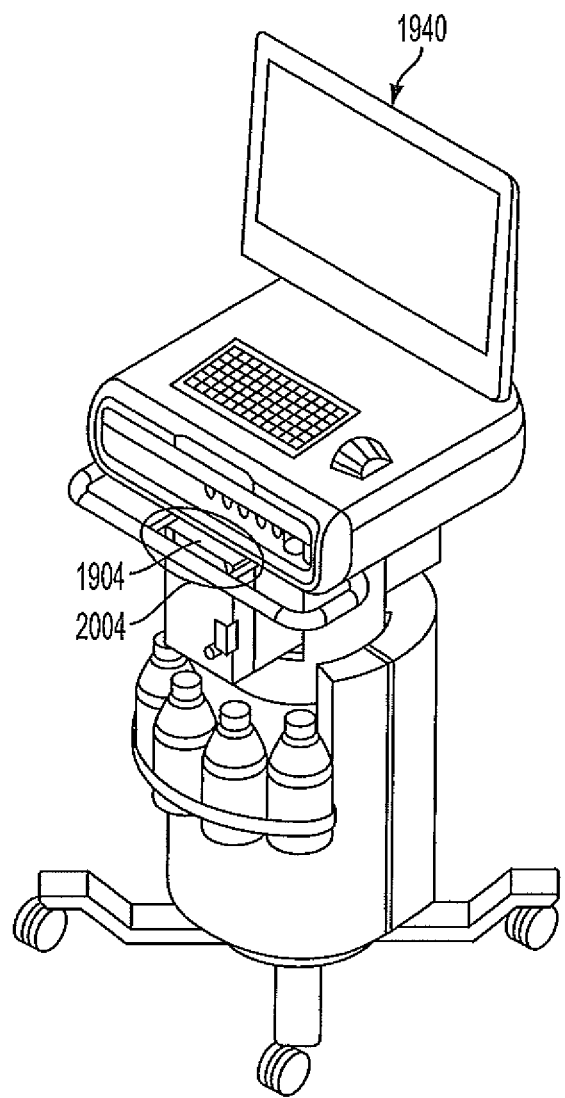
FIG. 21 shows an example of an embodiment of the present invention in which a cold component unit of a radiosynthetic device is operatively coupled to a cassette apparatus.

FIG. 21 shows an example of an embodiment of the present invention in which a cold component unit 1940 of a radiosynthetic device (shown in FIG. 19 as element 1902) is operatively coupled to a cassette apparatus 1904. As shown in FIG. 21, the cassette apparatus 1904 is coupled to the instrument such that the cold components 1940 may use the contents, or a portion of the contents, of the cassette apparatus 1904. The cassette apparatus 1904 may be any of a single-use cassette, multiple use cassette, disposable cassette, recyclable cassette or combination thereof. Shielding element 2004 is also shown. While the shielding shown in FIG. 21 may be similar to the shielding shown in FIG. 20, the shielding 2004, shown in FIG. 21 is used to prevent any radiation that may be present on cassette 1904 from affecting cold component unit 1940. Thus, in an embodiment in which the cassette has radiation elements, the shielding 2004 will reduce or prevent contamination from the cassette 1904. The shielding element 2004 is typically fabricated from a material such as lead, boron-filled polymer or concrete for example. Any suitable material with radiation inhibiting characteristics may also be used.

Furthermore, a cassette apparatus may be mounted, or disposed such that the shielding material 2002 or 2004 reduces exposure to radiation. The positioning of the cassette apparatus facilitates removal and/or replacement and/or servicing an/or re-filling of the cassette apparatus without waiting for any radiation elements within the shielding element to decay such that exposure will not be harmful. Thus, positioning the cassette apparatus outside radioactive portions of the instrument (FIG. 19, element 1902), enhances the operation since the cassette may be manipulated independently of the radioactive state of the instrument (FIG. 19, element 1902).

Figure 22:
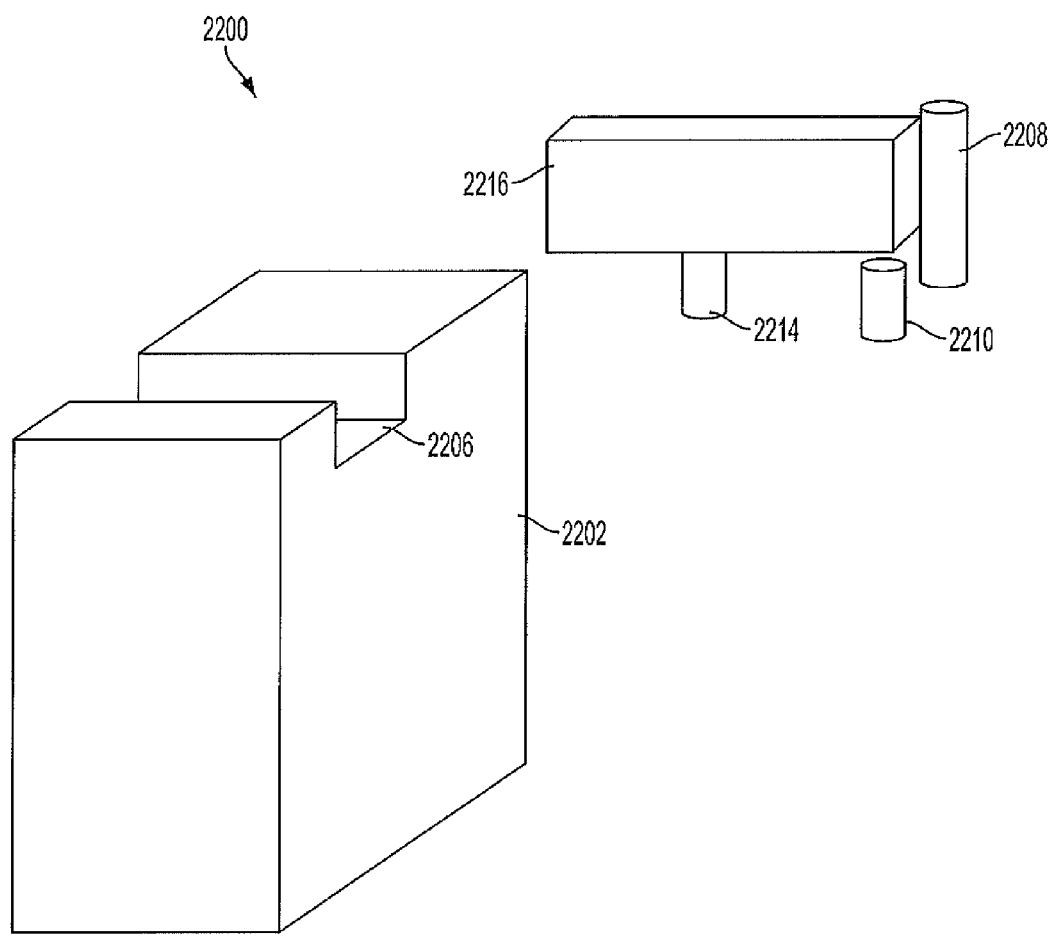
FIG. 22 shows a cassette device according to an embodiment of the present invention.

FIG. 22 shows a cassette device 2200 according to an embodiment of the present invention. The cassette device 2200 includes body portion 2202 with an orifice 2206. The body portion 2202 is adapted to support element module 2216 (shown in more detail in FIG. 23). Element module 2216 has multiple component elements. The cassette body portion 2202 also supports HPLC column 2208, vial 2210 and reaction chamber 2214. These elements 2208, 2210 and 2214 may be detachable from the element module 2216.

Figure 23:
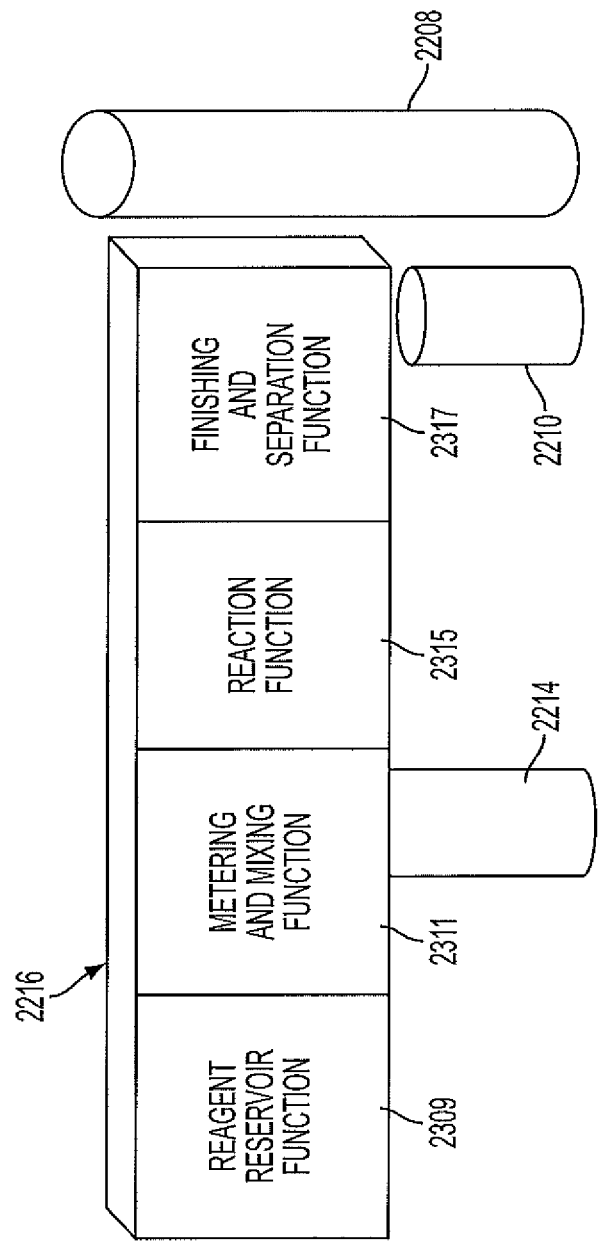
FIG. 23 shows another embodiment of the cassette device according to the present invention.

FIG. 23 shows another embodiment of the cassette according to the present invention. The element module 2216 has, for example four component modules. These include reagent reservoir module 2309, metering and mixing module 2311, reaction module 2315 and finishing and separation module 2317. The element module 2216 also supports, and can attach to HPLC column 2208, vial 2210 and reaction chamber 2214. The reagent reservoir module 2309 is used to store reagents, which may be liquid or dry. The metering and mixing module 2311 is used to mix and meter reagents and/or solvents for the instrument (not shown). Reaction module 2315 may be used to perform the desired reaction and may include a microreactor, as described herein. Finishing and separation module 2317 is used to separate chemicals and may be used to produce an aliquot or other separated compound.

FIGS. 24(a) and 24(b) shows a cassette with non-disposable elements. Specifically, insertion of the element module 2216, HPLC column 2208, vial 2210 and reaction chamber 2214 into body portion 2202 via orifice 2206 is shown.

Figure 25:
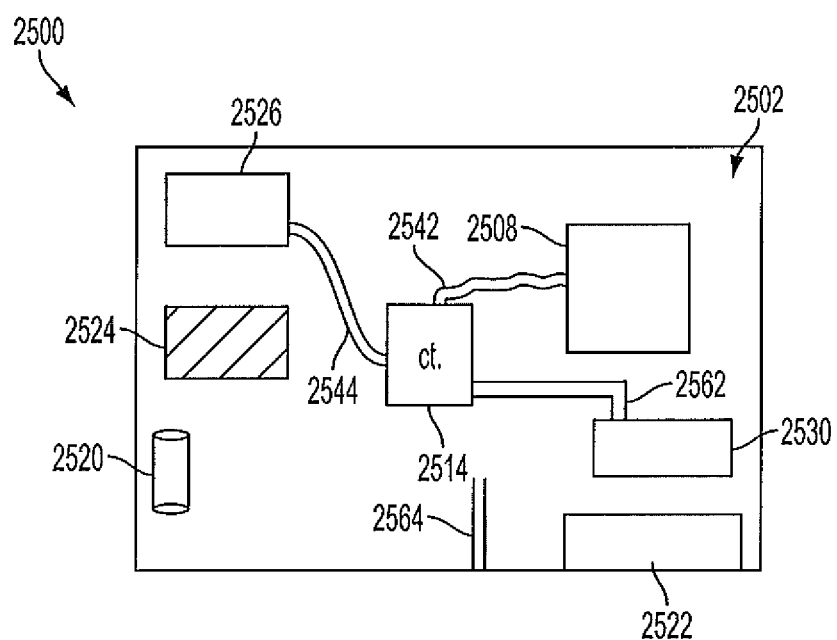
FIG. 25 shows an example of non-disposable functional elements disposed on a cassette.

FIG. 25 shows an example of a cassette 2500 having non-disposable elements as well as disposable elements mounted on body portion 2502. Specifically cassette 2500 has HPLC column 2508, microreactor 2514, ion exchange column 2520, cleaning module 2522, indicia 2524, heating element 2526, integrity module 2530 and tubing 2542 and 2544. Also shown in FIG. 25 is pre-configured channel, or pathway or connector 2564. This channel 2564 is part of the body portion 2502. Thus, an operator can use the pre-configured structure of body portion 2502 to add a path to an element of body 2502. Thus, the cassette is configurable based on pre-configured channels 2564 in body portion 2502.

Figure 26:
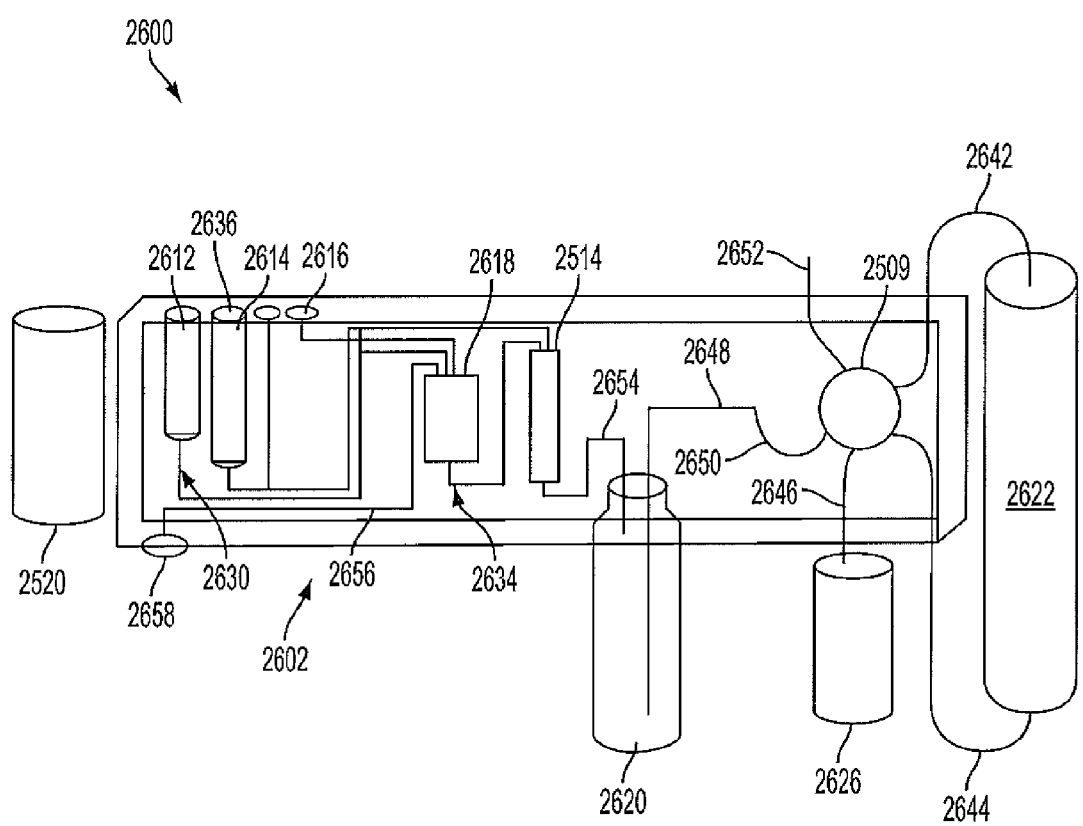
FIG. 26 shows another example of functional elements disposed on a cassette.

FIG. 26 shows another example of functional elements disposed on a cassette 2600. Cassette 2600 has a body portion 2602 that supports disposable and non-disposable functional elements, or components. For example, functional elements may include components such as chambers, valves, ports, HPLC, reaction chambers, microreactors, reservoirs, mixing chambers and other modules. The example shown in FIG. 26 shows ion exchange column 2502, which may be used for initial separation of a radionuclide. A chamber 2612 may be used for storing reagent that may be pre-loaded on the cassette 2602. A chamber 2614 is also shown. This chamber 2614 may be used to store reagent added by the operator before loading the cassette 2600 into an instrument (not shown). Typically, the cassette 2600 is approximately in the range of approximately 12 inches to approximately 20 inches wide, approximately between 0.25 to 3 inches deep and approximately between 1.5 to approximately 7 inches high.

Port 2616 is an orifice that may be used for adding bulk reagent from a reservoir. The reservoir may be located on the cassette and/or the durable instrument (not shown).

Mixing element 2618 is used to mix reagents and or solvents and or other compounds. The mixed compounds may then be provided to reaction chamber 2514. The reaction chamber 2514 is used to execute one or more reactions, which may be carried out at room temperature and atmospheric pressure within the cassette.

Component 2620 is an external reaction chamber that may be used for heated reactions at a specified pressure. The cassette body 2602 may provide tubing 2648, 2654 for extraction or introduction. Path 2650, which may be tubing or a pre-etched channel in body portion 2602 may be used to transfer compound between external reaction chamber 2620 and HPLC loop valve 2509. The HPLC loop valve 2509 may be re-usable or re-cyclable or re-furbishable. The HPLC loop valve 2509 is mounted on the body portion 2602 and may be rotated by the instrument (not shown). The HPLC loop valve 2509 is connected to HPLC column 2622 via high pressure tubing 2642 and 2644.

Vial 2626 may be used to contain a completed radiopharmaceutical. Vial 2626 is connected to HPLC loop valve 2509 via tubing, or channel 2646.

Passive check valve 2630 is used to retain the contents of a reservoir, or chamber 2612 until the contents are pumped.

Active valve 2634 is used to retain the contents in reaction chamber 2514 until pumped. Connection 2636 is used to provide a conduit from one line to aspirate/dispense syringe pump located on the durable instrument (not shown).

Also shown is tubing 2652 that connects HPLC to elements off the cassette 2602. Conduit 2656 provides a path from mixing chamber 2618 to output 2658.

Figure 27:
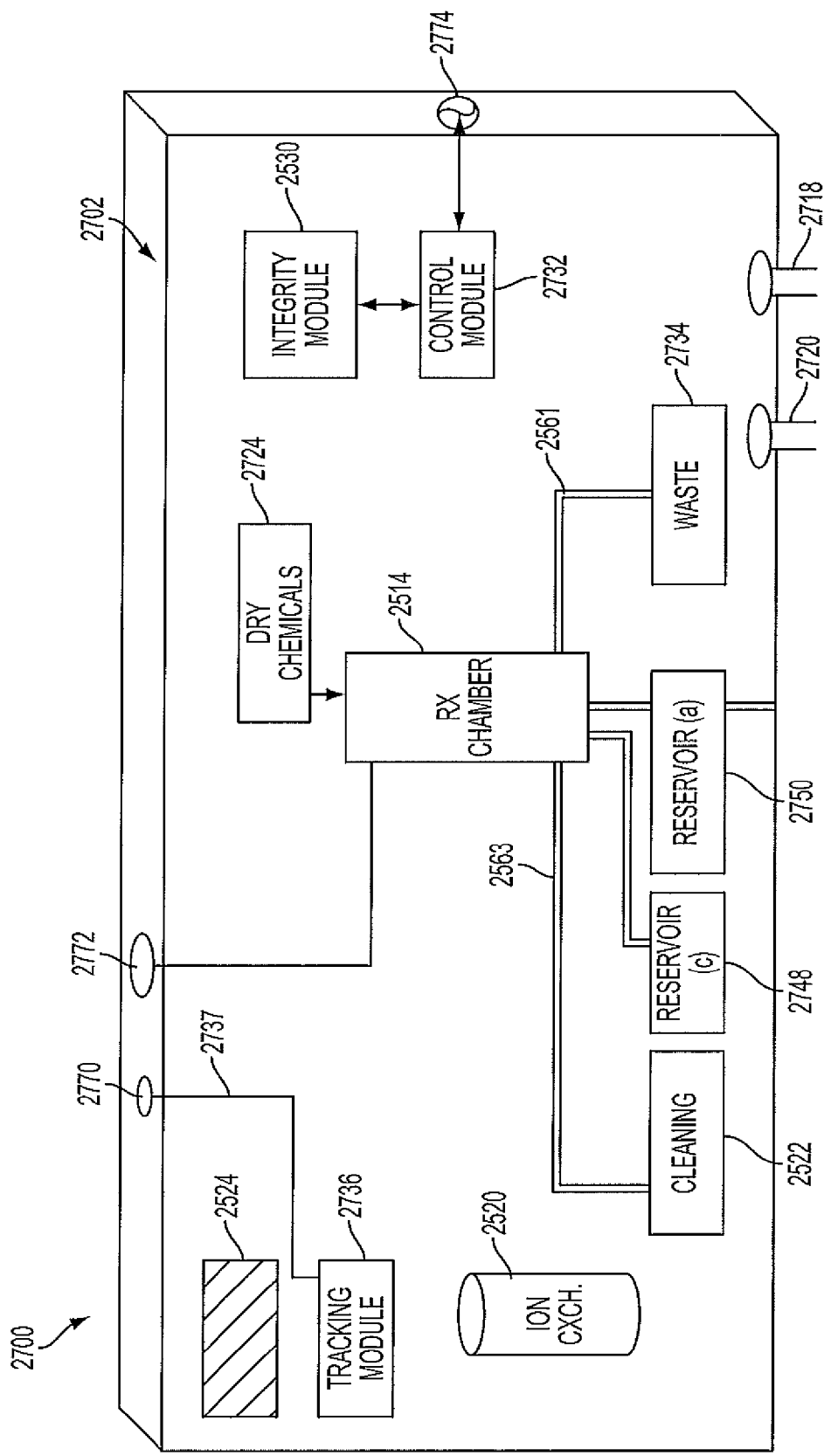
FIG. 27 shows an example cassette embodiment according to the present invention.

FIG. 27 shows an example cassette embodiment 2700 according to the present invention. As shown in FIG. 27, cassette body portion 2702 includes functional elements, or components, that may be disposable and/or non-disposable. For example, body portion 2702 includes indicia 2524, which may be a bar code, RFID tag or other stored identifying information, including encoded and/or encrypted data, that may be read by a reader and modified to reflect changes in the status of cassette 2700.

Tracking unit, or module, 2736 is used to store data and information related to the cassette 2700. The tracking module 2736 may be a memory location or register or other electronic storage medium, such as a non-transitory electronic storage medium, that can store electronic data and receive and transmit electronic data. This data may include, for example, the number of runs executed by the cassette, type of runs executed by the cassette, compounds and/or reagents and/or solvents on the cassette, when the last re-furbishing operation occurred, a radiation level, the types of instruments that have utilized the cassette and other information that pertains to the operational life and/or status of elements on the cassette and/or activities that have occurred to the cassette. The tracking unit 2736 may also provide an indication when the operational life of the cassette has ended and the cassette should be discarded.

Tracking module 2736 may be coupled to an electrical port 2770 via electrical connector 2737. This electrical connector 2737 may be a circuit trace or other electrical interconnection. The electrical signals can be data signals, power signals or both data and power signals.

Ion exchange 2520, reaction chamber 2514, and dry chemical chamber 2724 are also shown. Cleaning component 2522 is coupled to reaction chamber 2514 via channel, path or conduit 2563, which may be tubing or pre-etched channel in body portion 2702. The cleaning component is used to provide cleaning solvents and other materials to clean the reaction chamber 2514. Alternatively, the cleaning component may also be off-cassette and coupled to the cassette during a scheduled maintenance cleaning.

Reservoirs 2748 and 2750 are also operatively connected to reaction chamber 2514 via conduits or tubing. While two reservoirs 2748 and 2750 are shown, any suitable number of reservoirs may be used. Waste component 2734 is used to collect waste from reaction chamber 2514 via conduit 2561.

Integrity module 2530 is coupled to control module 2732 and electrically coupled to electrical port 2774. The integrity module 2530 is used to ensure the cassette 2700 is compatible with an instrument. The integrity module 2530 typically stores compatibility data to confirm that the instrument accessing, or utilizing the cassette 2700 is appropriate. The controller 2732 is an electronic processor, such as a CPU with an ALU that is capable of storing and processing data. If the instrument attempting to utilize the cassette is not appropriate or compatible, the integrity module 2530 will generate an alert or flag indicating that the cassette and instrument are not compatible or should not be used together.

Also shown are liquid ports 2718 and 2720 which are used to provide a pathway or conduit for liquids between the cassette 2700 and instrument (not shown). Port 2772 is used to provide a pathway or conduit from the reaction chamber 2514 to the instrument (not shown).

Figure 28A:
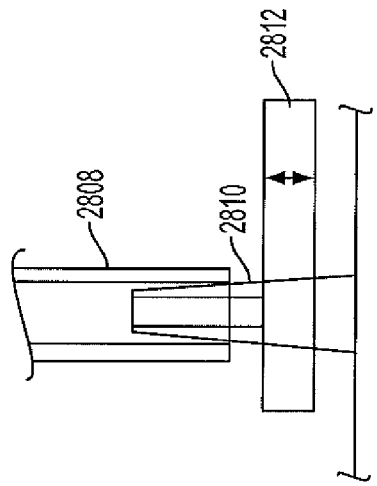
FIG. 28 shows an example of an instrument-cassette interface according to an embodiment of the present invention.

FIGS. 28(a)-28(d) show examples of an instrument-cassette interface according to an embodiment of the present invention. As shown in FIG. 28(a), an O-ring, or gasket 2802, which may be integral with the cassette provides a fluid-tight seal between two mating surfaces 2804 and 2806.

Figure 28B:
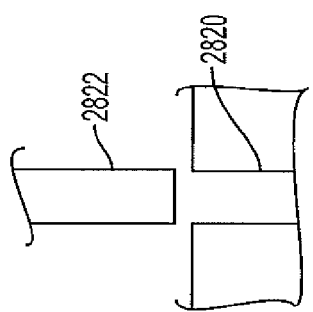

FIG. 28(b) shows an embodiment that uses flexible tubing 2808 on a straight or tapered tubing barb 2810. Also illustrated is an ejection bar 2812 which may be used to unseat the tubing without the need of an operator to handle the tube 2808.

Figure 28C:
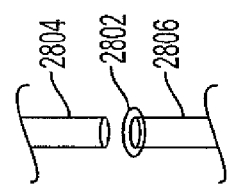

FIG. 28(c) shows an embodiment of a tapered probe 2814 that fits into a tapered socket 2816. The socket 2816 and probe material and geometry provide for one to much stiffer than the other so that the seal is established when the two are pressed together. This seal is typically a fluid-tight seal.

Figure 28D:
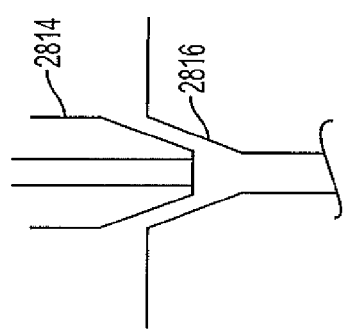

FIG. 28(d) shows a single use deformable cassette element 2820 that fits over a more rigid instrument element 2822. The deformable element may be male or female; the mating rigid element may be female or male. The deformation forms a seal until the elements 2820 and 2822 are separated by an operator.

Figure 29:
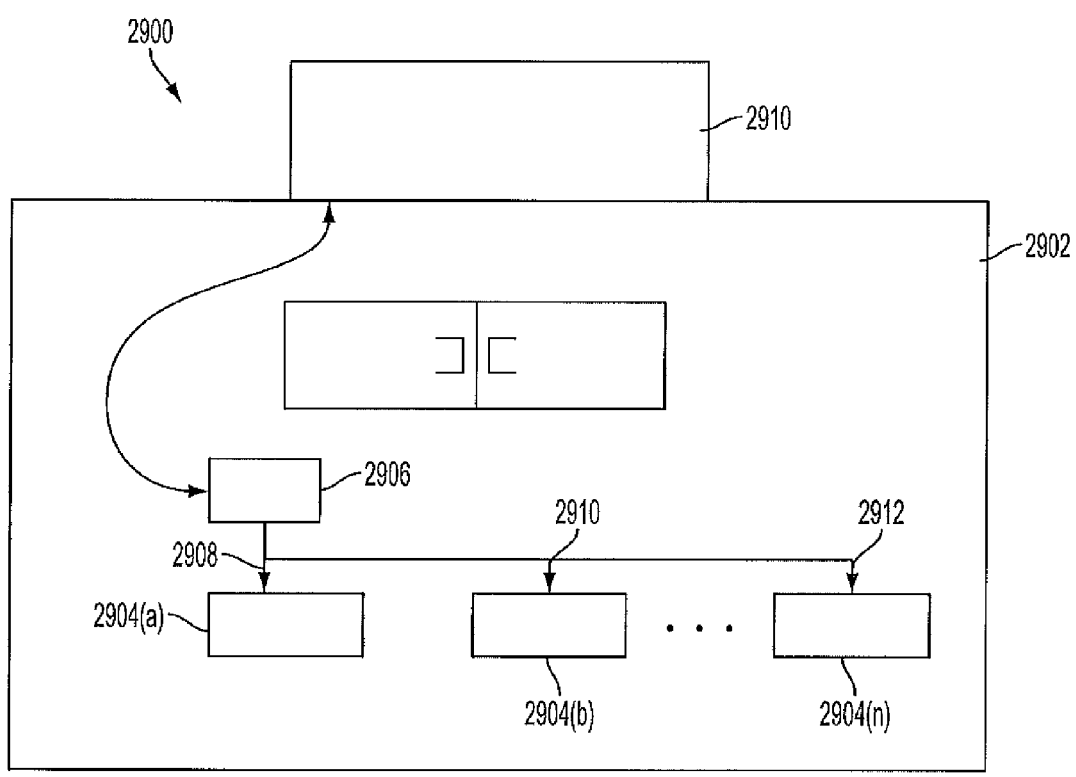
FIG. 29 shows an example of an instrument according to an embodiment of the present invention.

FIG. 29 shows an instrument 2900 that includes a radiosynthetic device 2902 having a plurality of cassette receiving facilities 2904(a) . . . (n) (where "n" is any suitable number. The cassette receiving facilities (generally 2904) are configured to receive a cassette, as described herein. Thus, instrument 2902 can utilize a plurality of cassettes for a single run.

The instrument 2900 also includes a control module 2906 that is operatively coupled to each receiving facility 2904, via bi-directional communication connectors 2908, 2910, 2912, to ensure that the cassettes are appropriate for the instrument 2900. A display unit 2910 may display an error or alert signal or indication if a cassette inserted into one of the receiving facilities 2904 is not appropriate for the instrument 2900.

Figure 30:
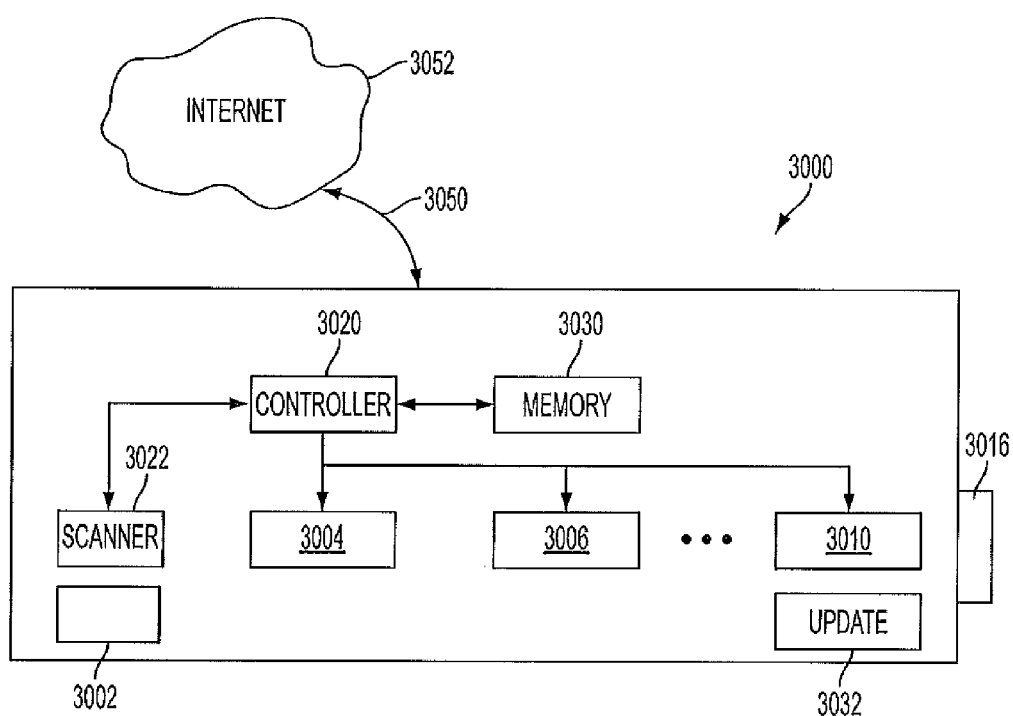
FIG. 30 shows an example of a device used to re-use, recycle and/or re-furbish a cassette.

FIG. 30 shows a re-processing device 3000 that is adapted for reprocessing the re-processing cassette components which are to be re-used, which permits component reprocessing to take place without limiting the synthesis instrument from proceeding directly with its next synthesis task. As shown in FIG. 30, a cassette input unit 3002 is used to receive a cassette that is to be re-used/re-cycled/refurbished. Scanner unit 3022 scans or otherwise obtains data from the cassette, such as by scanning a barcode, RFID tag or other indicia on the cassette. The scanned data is then transmitted to controller 3020 where it may be decoded and/or decrypted. The scanned data may also be stored in memory 3030. Also, controller 3020 may access memory 303 to retrieve data related to the particular cassette. The controller 3020 then controls re-cycling units 3004, 3006 and 3010. While three recycling units are shown, any suitable number may be employed. Each recycling unit performs an associated task to re-cycle a designated portion of the cassette. The recycling process may also involve operator input or action to perform the desired recycling operations. Update unit 3032 is used to update the data associated with the cassette following the recycling operation. The cassette, which has been recycled may be discharged via outlet 3016. The updated recycled data may be stored on the cassette, via the indicia, bar code, RFID and/or stored in memory 3030.

The device 300 may be coupled to a network 3052 via bi-direction interconnector 3050. The network 3052 may the Internet or any computer network. Thus data generated by device 3000 may be transmitted to other devices that are coupled to the network 3052.

Figure 31:
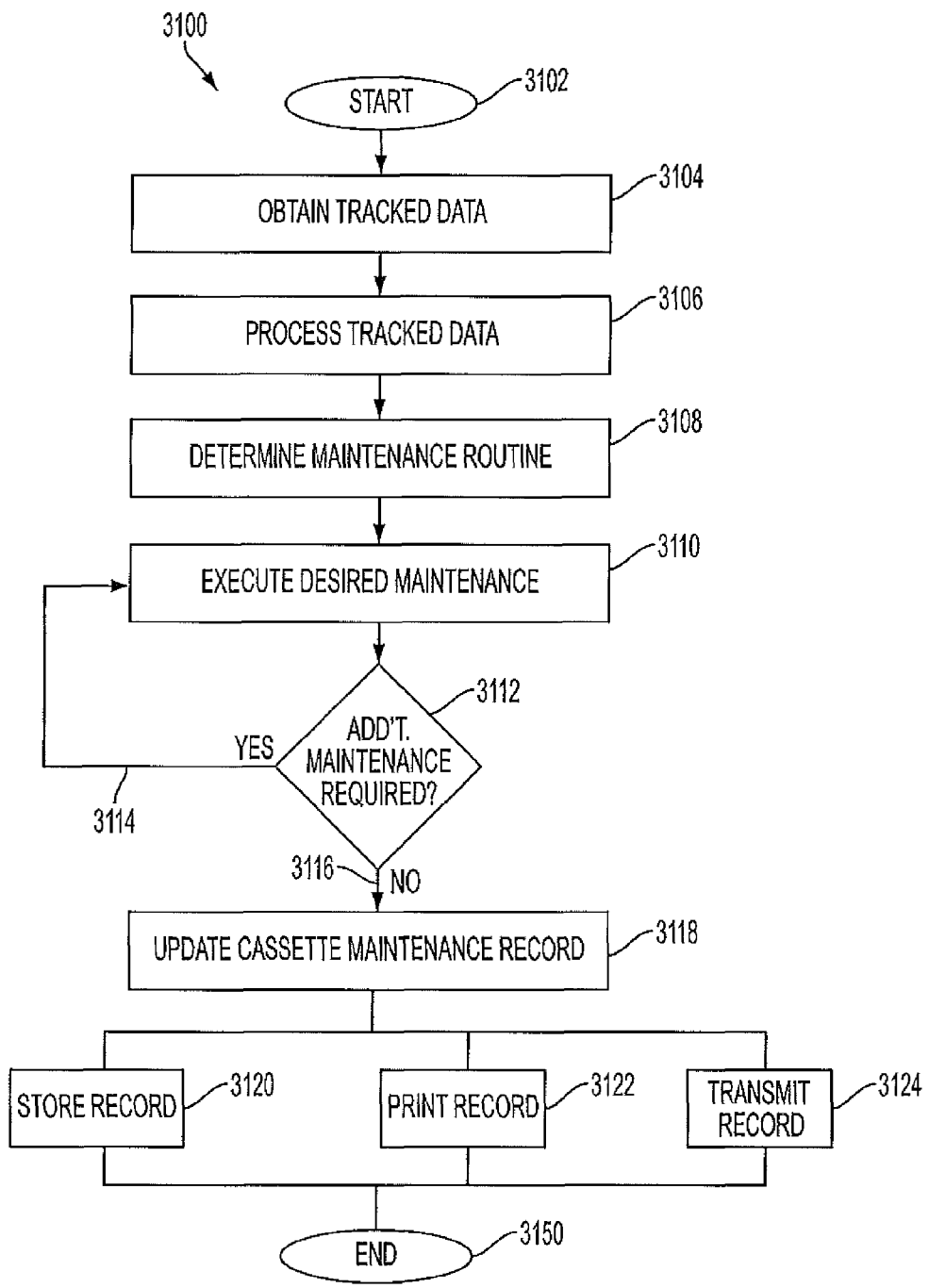
FIG. 31 shows a flowchart of process steps to perform a cassette re-cycling function.

FIG. 31 shows a flowchart 3100 of process steps to perform a cassette re-cycling function. The steps shown in FIG. 31 may be stored on a non-volatile memory, such as memory 3030 of FIG. 30 and executed by a processor such as controller 3020 shown in FIG. 30.

Flowchart 3100 starts with start step 3102. Step 3104 shows that tracked or accumulated data from the cassette is obtained. This data may be data accumulated by tracking unit 2736 shown in FIG. 27. This data is then processed as shown in step 3106. This processing may be performed by controller 3020 shown in FIG. 30. The required or desired or scheduled maintenance is then determined, as shown by step 3108. Step 3110 shows that the maintenance, re-cycling and/or re-furbishing of components is executed. Decision step 3112 determines whether additional maintenance, re-cycling and/or re-furbishing is required. If so, "yes" line 3114 shows that step 3110 is reached where the execution of the maintenance, re-cycling and/or re-furbishing is performed. If no additional maintenance, re-cycling and/or re-furbishing is necessary, "no" line 3116 shows that the maintenance record of the cassette is updated. Steps 3120, 3122 and 3124 show that the updated maintenance record may be stored, transmitted and/or printed. End step 3150 shows that the process is complete.

In general, embodiments of the present invention are directed to recognizing the virtue of easily removing a portion of, or the entire, wetted path from the durable instrument. After removal of the portion, or entire, wetted path, embodiments of the present invention maintain a wide range of options for cleaning the cassette and/or disposing of the cassette by providing for one or more of the process units on board the cassette to be removed with relative ease for cleaning. The ability to remove selected components enables managing the components on the cassette, which includes cleaning and inspecting by the end user, reworking in the factory, or disposal after an appropriate number of uses or when indicated by the condition of the component.

Within radiochemistry synthesis, the removable path approach as described herein, takes a novel approach to handling the wetted path between uses.

As described herein, embodiments of the present invention are directed to radiochemistry synthesis that includes making functional elements, or components such as the HPLC column and its associated high pressure valves and tubing a part of the cassette. Furthermore, the radiochemistry synthesis system provides for cleaning the HPLC column and its associated high pressure valves and tubing independently of the instrument whose function is to execute the synthesis process.

In addition the cassette carries a number of components which may be re-used, or recycled or refurbished. The end user has the ability to decide which products to re-use and which products to use new; the end-user has the ability to decide when to discard a multi-use component of the cassette. This provides the end user with flexibility to tailor their specific solution to best suit their needs. Customizing the solution to each custom comes at almost no cost to the manufacturer of the synthesis system. The manufacturer of the cassette has flexibility to simply sell cassettes and re-usable components, and may offer a cleaning service in which the end user is supplied with ready-to-use components.

Embodiments of the present invention embrace an entire chemical production process from beginning to end within the cassette, and it supports selective re-use and/or recycling of components used in the process.

Embodiments of the present invention include:
The cassette is the site of a complete chemical synthesis process. The components of the cassette are not simply vessels containing ingredients to be consumed, there are also active chemical process components for reactions, heat and mass transfer and separations. The manufacturing process takes place within the cassette.

The cassette architecture is specifically structured to support cleaning of critical process components in preparation for re-use and/or recycling. This cleaning is done offline from the synthesis process, thus keeping the synthesis system available for operation, and supporting a process for cleaning and inspection which is not bound by time limits.

The cassette offers the end user a wide range of options with respect to what portions of the cassette the operator will clean, how the cassette will be cleaned, how often the cassette will be cleaned and what will trigger a component of the cassette being discarded.

The cassette provides for re-use of components and/or recycling of components that may be expensive. The feature of specifically targeting selective re-use and/or recycling of cassette components supports a wider range of options for design of the cassettes.

In one embodiment of the present invention, the HPLC column and the ion exchange column have the characteristic of being re-used after being cleaned between uses. These components (HPLC and ion exchange column) are modular to support easily changing to the next component. The cassette as described herein addresses the entire synthesis process, not just one of the unit operations.

Another embodiment of the present invention is directed to mounting reactors, reactor chambers or microreactors into cassettes. The reactors, reactor chambers and microreactors mounted on the cassette become useful in the context of a removable path cassette such as described herein.

Exemplary Embodiments

Some examples of embodiments of the present invention include:
A cassette for synthesis of fine chemicals produced in small volumes, for example approximately 0.5 mL to approximately 5.0 mL, for which cleanliness and sterility of the portions wetted by the reagents, intermediate products and finished product are important to the end use of the product.
The cassette may be used for radiopharmaceutical synthesis.
The cassette may be used for any process taking place on a small scale through the mixing and reacting of fluids.
An instrument that may deliver one or more reagents from a bulk reservoir to be used during the synthesis on board the cassette.
The instrument may deliver the radioactive material to the cassette to start the reaction.
A cassette easily installed and easily removed from the durable instrument.
The cassette may be provided pre-filled with reagents, may be filled manually at the time of use, or may have reagents metered in during the operation of the synthesis process.
The reagents may include the radioactive material used to begin the synthesis process.
The cassette is assembled in clean conditions consistent with the needs of the end user.
The cassette may be sterilized by the manufacturer if needed by the end user.
The cassette has one or more removable, cleanable and re-usable ion exchange columns, appropriate to the synthesis process for which the cassette will be used.
The cassette has one or more removable, cleanable and re-usable reaction chambers, appropriate to the synthesis process for which the cassette will be used.
The reaction chamber is shaped to fit easily into a temperature-control well in the durable instrument when the cassette is in place on the instrument.
The cassette carries a complete HPLC column and its associated valve and high pressure tubing.
The valve mates with an actuator shaft extending from the durable instrument, permitting the valve (mounted on the cassette) to be controlled by the durable instrument.
Tubing connections to the HPLC pump may be made by a manual operation, but may be accomplished by a fitting making a pressure-tight connection simply by the mating of the cassette.
The cassette may have a unique serial number, e.g. in the form of a bar code, or RFID, supporting tracking in detail its service history.
Optionally, one or more of the re-usable and/or recyclable and cleanable components may have a serial number, e.g. a bar code, allowing that component's history to be tracked to support decisions about when and how it will be cleaned, for what processes it will be used in, and when it will be discarded.
The cassette may also have the valving and fluid conduits used to carry out a process involving fluid processing disposed on the cassette.
The cassette may also have features identifying its intended synthesis reaction to the durable synthesis instrument, such that the simple act of mounting the cassette on the instrument is all the instruction the instrument needs to carry out the reaction.
Optionally, the cassette may include an independent subsystem to clean the process components which are to be cleaned and re-used.
Furthermore the cassette may be used with a stand-alone cleaning subsystem which might be located anywhere convenient, either on the cassette or separately that the cassette may be operatively coupled to, such as plugged into such that the tubing and valves align to facilitate cleaning of some or all of the components on the cassette.
Furthermore, there may also be a cleaning subsystem integrated on the synthesis instrument cabinet, but whose operation does not interfere with continual use of the synthesis instrument.
Furthermore, there may also be an inspection system which provides the user with sensor or assay results indicating the cleanliness of the cleaned components. The inspection system may be a stand alone module that the cassette is operatively connected to or a module mounted on the cassette.
Another embodiment of the present invention is directed to a business method which supports the cassette. The business method may include, for example:
a stand-alone cleaning subsystem which might be located anywhere convenient, either as a stand alone module or mounted on the cassette.
a supply chain method in which the end user has substantial control over what portion of the wetted path will be cleaned and what portion will be discarded.
a cleaning service in which the manufacturer cleans and re-certifies the components for later re-use by end users. The manufacturer could perform the cleaning operation at a remote location and ship the cassette back to the user.
Another embodiment of the present invention is directed to a motive force for pumping (e.g. syringe pump) that pumps material from one location to another within the cassette, or introduces material from the instrument to the cassette.
Another embodiment of the present invention is directed to an actuator disposed on the cassette that actuates valves on the cassette.
Another embodiment of the present invention is directed to a heating element 2526, mounted on the cassette. The heating element surrounds the reaction chamber(s) and provides a heat source to the reaction chamber(s).
Another embodiment of the present invention includes a pump unit operatively coupled to an HPLC element. The pump unit is mounted on the cassette and may be a re-usable element or a disposable element.
Another embodiment of the present invention includes a control module disposed on the cassette. The control module is used to provide control signals to other elements on the cassette.
Another embodiment of the present invention includes an indicia, such as a bar code or RFID tag that includes encoded information that recognizes cassette type and provides instructions, or code to run associated recipe(s). The instrument utilizes the encoded information to run a particular recipe using the cassette.
Another embodiment of the present invention is directed to the cassette including some bulk reagents (e.g. DI H2O and EtOH) and a waste container. The bulk reagents are typically stored in a reagent module disposed on the cassette. The waste container is also disposed on the cassette and is connected to tubing such that waste can be deposited in the waste container.

Another embodiment of the present invention is directed to a cassette that permits operator-added reagents for one run. Thus, as operator, or technician, can add reagents as desired between runs such that the added reagents, which were not present previously, can be available for a particular run.

Another embodiment of the present invention is directed to a cassette that includes components for the wetted parts, or wetted path of a reaction. The wetted parts of the cassette are those parts through which the ingredients added to the reaction flow. In the event that the ingredients are all in the form of a liquid, the wetted path is the portions of the reaction equipment which are wetted by any of the liquid ingredients or the intermediate products. Similarly for vapors and gases, the wetted path is the portions of the reaction equipment with which the vapor or gas makes contact. In general practice, the wetted path can be described as all of the portions of the reaction equipment which the synthetic chemist will wish to wash after completing the synthesis process.

Another embodiment of the present invention is directed to a cassette that has a bar code or REID or other indicia that conveys a reaction type of the cassette.

Another embodiment of the present invention is directed to an indicia, bar code or RFID that includes a serial number of the cassette that can trace to, for example, a cassette lot, or HPLC column history, or reaction chamber history.

Furthermore, the indicia, bar code, RFID may be part of the cassette.

Also, the operator may be able to assemble a cassette based on a cassette that has configurable portions. For example, the base member may have portions, or areas that are adapted to hold or utilize additional components that are not present on the cassette when the cassette is shipped from the manufacturer. These additional components may include, for example, a waste container, additional vials, or other modules or components or elements that may be desired. Once the operator is ready to use the cassette, she may connect, or place the additional desired components on the cassette.

Another embodiment of the present invention is directed to a cassette in which an operator adds reagents to the cassette through low-accuracy transfer. Low accuracy transfer is a transfer in which the approximate volume is moved, but not with great accuracy. An example would be a transfer by a volumetric pipette or a transfer pipette, in contract to transfer by the use of a pipettor.

Furthermore, another embodiment of the present invention is directed to a cassette that has a radioactive feed that is metered in by the instrument to limit contact and radiation exposure to the operator and/or other instrument components.

Another embodiment of the present invention enables an operator to place the cassette into instrument. This is achieved by the shape and dimensions of the cassette, which may be configured such that an incorrect insertion will not permit the cassette to operate. Thus, the shape of the cassette makes it possible for the cassette to fit in the instrument in a single way. Similarly, the cassette shape may enable an operator or technician to remove the cassette without damaging the components of the cassette. This is particularly helpful when the cassette has re-usable components that are not disposed of.

Another embodiment of the present invention is directed to a cassette that is recognized by the instrument, such that the cassette operates to execute a predefined recipe. For example, the cassette may be preloaded with specified ingredients, contents and may have specified modules mounted thereon. This information is stored on a tag or indicia that is recognized by the instrument. Thus, the instrument processes the data related to the cassette and then executes a particular recipe based on the components of the cassette.

Another embodiment of the present invention is directed to a cassette in which the entire reaction and purification is carried out on the cassette. In this embodiment, the reaction chamber and purification modules are disposed on the cassette. In such an embodiment, the purification may be performed independent of the instrument.

In another embodiment of the present invention, the completed radiopharmaceutical is delivered to final vial. The final vial is the container in which the prepared radiochemical is transferred to its point of use. An example of a final vial would be a v-vial, or a standard drug vial.

Another embodiment of the present invention is directed to a cassette that delivers, or provides, or introduces an aliquot directly to a QC (quality control) step.

Another embodiment of the present invention is directed to a cassette used with an instrument that is able to execute another run in the time interval to remove a cassette from the instrument and position, or insert another cassette. The time interval may be, for example, one-minute, three-minutes, five-minutes or fifteen-minutes.

Another embodiment of the present invention is directed to a cassette that is a single use cassette. Such a single use cassette may be disposable or a cassette that is refurbished after a single use. This may be a cassette that has a component that must be recycled, replaces and/or re-filled before the cassette may be used again. Thus, a single use cassette is not necessarily a cassette that is disposed of after a single use.

Another embodiment of the present invention is directed to a cassette with a reaction chamber disposed thereon. The reaction chamber may be single use or cleaned offline.

Another embodiment of the present invention is directed to a cassette that has an ion exchange column mounted thereon. The ion exchange column might be single use or cleaned offline.

Another embodiment of the present invention is directed to a cassette that has an HPLC column mounted thereon. The HPLC column is, for example, multiple use or single use. In such an embodiment, the cassette may have tubing and/or plumbing that permits the cassette to operatively interface with the HPLC such that the functionality of the HPLC is controlled by the cassette, for example the HPLC loop valve located on board the cassette.

Another embodiment of the present invention is directed to a cassette that minimizes the impact of a single-run design by providing for rapid and relatively simple removal of the just-used cassette and installation of the cassette to be used next.

As described herein the cassette of the present invention may contain any combination of component modules. These component modules may be disposable, re-usable, re-cyclable and/or re-furbishable. Based on the component modules on the cassette, a user or customer has options to balance the economic benefits of cleaning components versus cost of single-use components. Thus the customer, when ordering cassette may prefer to use only disposable component modules or only selected no-disposable component modules. thus, the customer can decide what components are mounted on the cassette. This is particularly helpful when a customer is environmentally conscious and prefers non-disposable elements, or component modules that can be recycled or re-used and not discarded. Therefore, the cassette is environmentally-friendly and promotes a "green" process.

As stated previously, the cleaning and/or re-furbishing and/or recycling of re-usable or non-disposable component modules or components can be performed off-line. That is the end-user can remove the cassette from the instrument and either perform the recycling, re-furbishing or replacement actions. Alternatively, the end user can send the cassette to an authorized facility that can perform this function of refurbishing the cassette.

Another embodiment of the present invention is directed to a cassette that is designed to perform a pre-selected operation. This operation may be identified in a bar code, RFID or other indicia. The instrument will recognize, via the indicia, the synthesis the cassette is intended to execute and will require little or no further instruction from the user interface to execute the synthesis.

Another embodiment of the present invention is directed to a cassette that can be cleaned off-line, that is when the cassette is not interacting with the instrument. This off-line cleaning supports rapid turn-around for synthesis, and the controllable cleaning process is not limited by time.

Another embodiment of the present invention is directed to a cassette that has an identification module, for example, a serial number, identification bar code, or identification RFID tag that self-identifies the cassette to the instrument and also identifies what recipe is to be run by the instrument.

Another embodiment of the present invention is directed to a cassette that can be checked by an instrument to ensure that the cassette has the proper configuration by the instrument before running any recipes. If the cassette is not configured for the desired process an error message, or alert or other indication will be provided to the operator and the process will not execute until the correct cassette is installed in the instrument.

One embodiment of the cassette, as described herein is directed to a cassette in which the entire wetted path is removable from the durable instrument. Thus, the wetted path portion or components on the cassette may be removed and disposed of while other components may be re-cycled or re-used or refurbished for subsequent use.

One embodiment of the cassette, as described herein is a cassette in which an HPLC column, ion exchange column, solid phase extraction column, or other separation technology can be recycled for subsequent use using a separate instrument or independent module dedicated to the purge operation.

One embodiment of the cassette, as described herein is a cassette in which a reaction chamber can be removed and cleaned using a separate instrument or independent module dedicated to the cleaning process.

Another embodiment of the present invention is directed to a cassette which can be configured for custom processes. For example, the cassette may have pre-selected vials, pre-selected components and pre-selected design making it suitable for a corresponding recipe or set of recipes. The recipe or set of recipes may be identified on an identification module on the cassette so that an operator will select the cassette adapted or configured for a particular recipe that the operator wishes to run.

Another embodiment is directed to a cassette able to be modified such that the recipes it will be suitable to run can be modified by the operator making minor modifications to the cassette. For example, the operator could remove certain unneeded components, or re-route the plumbing, add additional tubes and similar changes to the cassette. The identification data or module could then be edited to reflect the operator changes and cause the cassette to be operable for the desired recipe, or the identification may indicate the cassette's synthesis procedure must be selected or configured through use of the user interface.

The invention is further described by the following paragraphs:

An instrument for synthesis of radiolabeled compounds comprising "hot" and "cold" components, which are separated into two units connected by a bundle of cables and tubing, and which are removed from one another to minimize exposure of a user and sensitive equipment to radiation.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" box with associated radiation-handling components can be placed inside a mini-cell.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "cold" box hosting electronics, pumps and reagents is placed outside the mini-cell to optimize "hot" space, to allow access to reagents between runs and protect electronics and the operator from radiation.

An instrument for synthesis of radiolabeled compounds comprising "hot" and "cold" components, which are separated into two units connected by a bundle of cables and tubing, and which are removed from one another to minimize exposure of a user and sensitive equipment to radiation. The instrument can be fully-automated.

An instrument for synthesis of radiolabeled compounds comprising "hot" and "cold" components, which are separated into two units connected by a bundle of cables and tubing, and which are removed from one another to minimize exposure of a user and sensitive equipment to radiation. A bundle of cables and tubing connecting the "hot" and "cold" boxes is approximately 20 feet long.

An instrument for synthesis of radiolabeled compounds comprising "hot" and "cold" components, which are separated into two units connected by a bundle of cables and tubing, and which are removed from one another to minimize exposure of a user and sensitive equipment to radiation. A bundle of cables and tubing connecting the "hot" and "cold" boxes is approximately 20 feet long. The bundle of cables and tubing connecting the "hot" and "cold" boxes is equipped with a Safety Radiation Detector.

An instrument for synthesis of radiolabeled compounds comprising "hot" and "cold" components, which are separated into two units connected by a bundle of cables and tubing, and which are removed from one another to minimize exposure of a user and sensitive equipment to radiation. A macro reactor-based instrument can be upgraded with a micro-reactor.

An instrument for synthesis of radiolabeled compounds comprising "hot" and "cold" components, which are separated into two units connected by a bundle of cables and tubing, and which are removed from one another to minimize exposure of a user and sensitive equipment to radiation. A micro reactor-based instrument can be upgraded with a macro-reactor.

An instrument for synthesis of radiolabeled compounds comprising "hot" and "cold" components, which are separated into two units connected by a bundle of cables and tubing, and which are removed from one another to minimize exposure of a user and sensitive equipment to radiation. A modular system is equipped with multiple reactors.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" component is equipped with a microfluidic chip.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" component is equipped with a macro reactor.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" component is equipped with the microfluidic chip and the macro reactor.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" box is self-shielded ("micro-cell").

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" box is self-shielded ("micro-cell") and the shielded enclosure has a vertical or top opening.

An instrument for synthesis of radiolabeled compounds comprising "hot" and "cold" components, which are separated into two units connected by a bundle of cables and tubing, and which are removed from one another to minimize exposure of a user and sensitive equipment to radiation. The shielded enclosure has a vertical or top opening and the opening allows the hot box to be lifted vertically out of the stationary shield.

An instrument for synthesis of radiolabeled compounds comprising "hot" and "cold" components, which are separated into two units connected by a bundle of cables and tubing, and which are removed from one another to minimize exposure of a user and sensitive equipment to radiation. At least one "hot" box is placed in a mini-cell.

An instrument for synthesis of radiolabeled compounds comprising "hot" and "cold" components, which are separated into two units connected by a bundle of cables and tubing, and which are removed from one another to minimize exposure of a user and sensitive equipment to radiation. The hot box comprises at least one unit equipped to carry out a radiosynthetic protocol including synthesis, purification and formulation procedures.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "cold" box comprises an embedded personal computer (PC), which is designed to perform various operations supporting discovery and production processes.

An instrument for synthesis of radiolabeled compounds comprising "hot" and "cold" components, which are separated into two units connected by a bundle of cables and tubing, and which are removed from one another to minimize exposure of a user and sensitive equipment to radiation. The single "cold" box is capable of controlling multiple "hot" boxes.

An instrument for synthesis of radiolabeled compounds comprising "hot" and "cold" components, which are separated into two units connected by a bundle of cables and tubing, and which are removed from one another to minimize exposure of a user and sensitive equipment to radiation. The instrument being capable of conducting multiple runs comprising radiosyntheses of different products without opening shielded enclosures.

An instrument for synthesis of radiolabeled compounds comprising "hot" and "cold" components, which are separated into two units connected by a bundle of cables and tubing, and which are removed from one another to minimize exposure of a user and sensitive equipment to radiation. The product collection and F-18 delivery takes place in an interlocking pig device on a self-shielded module without radiation exposure.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" box being equipped with a microfluidic chip.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" box is equipped with a microfluidic chip. The chip comprises a system of parapets on the ceiling of the said chip preventing liquid vent loss while allowing efficient evaporation.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" box is equipped with a microfluidic chip. The chip comprises a system of three-way valves on interface base for reagent priming.

An instrument for synthesis of radiolabeled compounds comprising "hot" and "cold" components, which are separated into two units connected by a bundle of cables and tubing, and which are removed from one another to minimize exposure of a user and sensitive equipment to radiation, where the "hot" box is equipped with a microfluidic chip. The chip being made of molded PEEK or glass.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" box is equipped with a microfluidic chip. The chip within a PEEK frame seals with the PEEK micro-reactor and has a glass lid.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" box is equipped with a microfluidic chip and the chip comprises a plunger alignment for one-operation chip insertion.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" box is equipped with a microfluidic chip and a chip-alignment mechanism is built into the instrument.

An instrument for synthesis of radiolabeled compounds comprising "hot" and "cold" components, which are separated into two units connected by a bundle of cables and tubing, and which are removed from one another to minimize exposure of a user and sensitive equipment to radiation. The "hot" box is equipped with a microfluidic chip. The chip comprises a pre-dispensed heat-transfer compound.

An instrument for synthesis of radiolabeled compounds comprising "hot" and "cold" components, which are separated into two units connected by a bundle of cables and tubing, and which are removed from one another to minimize exposure of a user and sensitive equipment to radiation. A pressure source and detector-based system are self-testing for leaks.

An instrument for synthesis of radiolabeled compounds comprising "hot" and "cold" components, which are separated into two units connected by a bundle of cables and tubing, and which are removed from one another to minimize exposure of a user and sensitive equipment to radiation. A flow meter for monitoring reactor dryness can be placed both upstream and downstream of the reactor.

An instrument for synthesis of radiolabeled compounds comprising "hot" and "cold" components, which are separated into two units connected by a bundle of cables and tubing, and which are removed from one another to minimize exposure of a user and sensitive equipment to radiation. Efficient evaporation is achieved by change of pressure.

An instrument for synthesis of radiolabeled compounds comprising "hot" and "cold" components, which are separated into two units connected by a bundle of cables and tubing, and which are removed from one another to minimize exposure of a user and sensitive equipment to radiation where efficient evaporation is achieved by change of pressure and where evaporation can start under low pressure and end under high pressure.

An instrument for synthesis of radiolabeled compounds comprising "hot" and "cold" components, which are separated into two units connected by a bundle of cables and tubing, and which are removed from one another to minimize exposure of a user and sensitive equipment to radiation where efficient evaporation is achieved by change of pressure and where evaporation can start under positive pressure and end under vacuum.

An instrument for synthesis of radiolabeled compounds comprising "hot" and "cold" components, which are separated into two units connected by a bundle of cables and tubing, and which are removed from one another to minimize exposure of a user and sensitive equipment to radiation, where a single syringe drives all reagents and optionally all solvents into the reactor without any of these reagents entering the syringe.

An instrument for synthesis of radiolabeled compounds comprising "hot" and "cold" components, which are separated into two units connected by a bundle of cables and tubing, and which are removed from one another to minimize exposure of a user and sensitive equipment to radiation where at least one metering pump drives solvents into the reactor or reformulation system.

An instrument for synthesis of radiolabeled compounds comprising "hot" and "cold" components, which are separated into two units connected by a bundle of cables and tubing, and which are removed from one another to minimize exposure of a user and sensitive equipment to radiation and a self-monitoring and self-emptying waste system.

An instrument for synthesis of radiolabeled compounds comprising "hot" and "cold" components, which are separated into two units connected by a bundle of cables and tubing, and which are removed from one another to minimize exposure of a user and sensitive equipment to radiation also including automated cleaning with readiness indication.

An instrument for synthesis of radiolabeled compounds comprising "hot" and "cold" components, which are separated into two units connected by a bundle of cables and tubing, and which are removed from one another to minimize exposure of a user and sensitive equipment to radiation also including an air-cooled micro-reactor.

An instrument for synthesis of radiolabeled compounds comprising "hot" and "cold" components, which are separated into two units connected by a bundle of cables and tubing, and which are removed from one another to minimize exposure of a user and sensitive equipment to radiation also including an air-cooled and air-heated reactor.

An instrument for synthesis of radiolabeled compounds comprising "hot" and "cold" components, which are separated into two units connected by a bundle of cables and tubing, and which are removed from one another to minimize exposure of a user and sensitive equipment to radiation also including a touch-screen computer.

An instrument for synthesis of radiolabeled compounds comprising "hot" and "cold" components, which are separated into two units connected by a bundle of cables and tubing, and which are removed from one another to minimize exposure of a user and sensitive equipment to radiation also including an automated safety interlock on exhaust monitoring.

An instrument for synthesis of radiolabeled compounds comprising "hot" and "cold" components, which are separated into two units connected by a bundle of cables and tubing, and which are removed from one another to minimize exposure of a user and sensitive equipment to radiation also including a reagent cartridge that can be plugged into the cold box.

An instrument for synthesis of radiolabeled compounds comprising "hot" and "cold" components, which are separated into two units connected by a bundle of cables and tubing, and which are removed from one another to minimize exposure of a user and sensitive equipment to radiation also capable of producing radiolabeled compounds incorporating different isotopes on the same module.

An instrument for synthesis of radiolabeled compounds comprising "hot" and "cold" components, which are separated into two units connected by a bundle of cables and tubing, and which are removed from one another to minimize exposure of a user and sensitive equipment to radiation where different processes can take place in individual hot boxes within the mini-cell at the same time.

An instrument for synthesis of radiolabeled compounds comprising "hot" and "cold" components, which are separated into two units connected by a bundle of cables and tubing, and which are removed from one another to minimize exposure of a user and sensitive equipment to radiation capable of automatically generating a batch record with yield, activity concentration, specific activity and other parameters.

An instrument for synthesis of radiolabeled compounds comprising "hot" and "cold" components, which are separated into two units connected by a bundle of cables and tubing, and which are removed from one another to minimize exposure of a user and sensitive equipment to radiation capable of adjusting preset protocols and procedures.

An instrument for synthesis of radiolabeled compounds comprising "hot" and "cold" components, which are separated into two units connected by a bundle of cables and tubing, and which are removed from one another to minimize exposure of a user and sensitive equipment to radiation where the hot box comprises no single-use consumables.

An instrument for synthesis of radiolabeled compounds comprising "hot" and "cold" components, which are separated into two units connected by a bundle of cables and tubing, and which are removed from one another to minimize exposure of a user and sensitive equipment to radiation where the hot box comprises a glass-bead-packed tube to break the release solution into multiple boluses.

An instrument for synthesis of radiolabeled compounds comprising "hot" and "cold" components, which are separated into two units connected by a bundle of cables and tubing, and which are removed from one another to minimize exposure of a user and sensitive equipment to radiation where the hot box comprises a pressure-relief tube between I/E column and reactor.

An instrument for synthesis of radiolabeled compounds comprising "hot" and "cold" components, which are separated into two units connected by a bundle of cables and tubing, and which are removed from one another to minimize exposure of a user and sensitive equipment to radiation where the hot box comprises UV LED light source in HPLC.

An instrument for synthesis of radiolabeled compounds comprising "hot" and "cold" components, which are separated into two units connected by a bundle of cables and tubing, and which are removed from one another to minimize exposure of a user and sensitive equipment to radiation where the cold box has no protruding features (for clean-room applications).

An instrument for synthesis of radiolabeled compounds comprising "hot" and "cold" components, which are separated into two units connected by a bundle of cables and tubing, and which are removed from one another to minimize exposure of a user and sensitive equipment to radiation where the hot box comprises reusable I/E column.

An instrument for synthesis of radiolabeled compounds comprising "hot" and "cold" components, which are separated into two units connected by a bundle of cables and tubing, and which are removed from one another to minimize exposure of a user and sensitive equipment to radiation, where the hot box comprises reusable Solid Phase Extraction (SPE) cartridges.

A method of conducting radiosynthesis of a radiolabeled compound in the instrument according to an instrument for synthesis of radiolabeled compounds comprising "hot" and "cold" components, which are separated into two units connected by a bundle of cables and tubing, and which are removed from one another to minimize exposure of a user and sensitive equipment to radiation.

A method of conducting radiosynthesis of a radiolabeled compound in the instrument according to an instrument for synthesis of radiolabeled compounds comprising "hot" and "cold" components, which are separated into two units connected by a bundle of cables and tubing, and which are removed from one another to minimize exposure of a user and sensitive equipment to radiation where loading an HPLC loop is conducted by pressure via tubing with liquid-gas detectors.

A method of conducting radiosynthesis of a radiolabeled compound in the instrument according to an instrument for synthesis of radiolabeled compounds comprising "hot" and "cold" components, which are separated into two units connected by a bundle of cables and tubing, and which are removed from one another to minimize exposure of a user and sensitive equipment to radiation. The method includes conducting multiple runs of radiosyntheses of different products without opening shielded enclosures.

A method of conducting radiosynthesis of a radiolabeled compound in the instrument according to an instrument for synthesis of radiolabeled compounds comprising "hot" and "cold" components, which are separated into two units connected by a bundle of cables and tubing, and which are removed from one another to minimize exposure of a user and sensitive equipment to radiation. The method includes increasing the efficiency of the release solution comprising passing the solution bolus through a tube packed with glass beads to provide a train of multiple boluses.

A method of conducting radiosynthesis of a radiolabeled compound in the instrument according to an instrument for synthesis of radiolabeled compounds comprising "hot" and "cold" components, which are separated into two units connected by a bundle of cables and tubing, and which are removed from one another to minimize exposure of a user and sensitive equipment to radiation. The method including passing K222 through the release line behind $K_2CO_3$.

A method of conducting radiosynthesis of a radiolabeled compound in the instrument according to an instrument for synthesis of radiolabeled compounds comprising "hot" and "cold" components, which are separated into two units connected by a bundle of cables and tubing, and which are removed from one another to minimize exposure of a user and sensitive equipment to radiation. According to the method release by a $K_2CO_3$ bolus is followed by a mixture of $K_2CO_3$ and $K_{222}$.

A method of conducting radiosynthesis of a radiolabeled compound in the instrument according to an instrument for synthesis of radiolabeled compounds comprising "hot" and "cold" components, which are separated into two units connected by a bundle of cables and tubing, and which are removed from one another to minimize exposure of a user and sensitive equipment to radiation. The method includes achieving efficient release by splitting the release solution into multiple boluses.

Another embodiment of the present invention is directed to an instrument for synthesis of radiolabeled compounds that includes one or more "hot" component units and at least one "cold" component unit. The one or more "hot" component units and the at least one "cold" component unit are separate units that are operatively connected to each other, and the one or more "hot" component units and the at least one "cold" component unit being positioned from each other to reduce radiation exposure to a user and sensitive equipment. There are also one or more cassette apparatus operatively coupled to a portion of the instrument. The one or more cassette apparatus provide at least a portion of contents of the one or more cassette apparatus to either one or more of the one or more hot component units or one or more of the at least one cold component units.

Another embodiment of the present invention is directed to the instrument described above (hot component unit, cold component unit, cassette apparatus) and wherein the one or more cassette apparatus include one or more disposable cassette apparatus.

Another embodiment of the present invention is directed to the instrument described above (hot component unit, cold component unit, cassette apparatus), wherein the one or more cassette apparatus include one or more re-usable cassette apparatus.

Another embodiment of the present invention is directed to the instrument described above (hot component unit, cold component unit, cassette apparatus), wherein the one or more cassette apparatus include one or more single-use cassette apparatus.

Another embodiment of the present invention is directed to the instrument described above (hot component unit, cold component unit, cartridge apparatus), wherein the one or more cartridge apparatus include one or more multi-use cartridge apparatus.

Another embodiment of the present invention is directed to the instrument described above (hot component unit, cold component unit, cartridge apparatus), wherein one or more of the one or more cartridge apparatus are operatively coupled to one or more of the one or more hot component units.

Another embodiment of the present invention is directed to the instrument described above (hot component unit, cold component unit, cartridge apparatus), wherein one or more of the one or more cartridge apparatus are operatively coupled to one or more of the at least one cold component units.

Another embodiment of the present invention is directed to the instrument described above (hot component unit, cold component unit, cartridge apparatus), wherein one or more of the one or more cartridge apparatus are operatively coupled to one or more of the one or more hot component units, and include one or more disposable cartridge apparatus.

Another embodiment of the present invention is directed to the instrument described above (hot component unit, cold component unit, cartridge apparatus), wherein one or more of the one or more cartridge apparatus are operatively coupled to one or more of the cold component units, and include one or more disposable cartridge apparatus.

Another embodiment of the present invention is directed to the instrument described above (hot component unit, cold component unit, cartridge apparatus), wherein one or more of the one or more cartridge apparatus are operatively coupled to one or more of the one or more hot component units and one or more of the at least one cold component unit.

Another embodiment of the present invention is directed to the instrument described above (hot component unit, cold component unit, cartridge apparatus), and also includes radiation shielding disposed in proximity to one or more of the one or more hot component units to reduce radiation exposure.

Another embodiment of the present invention is directed to the instrument described above (hot component unit, cold component unit, cartridge apparatus) and one or more of the one or more cartridge apparatus are operatively coupled to the instrument outside the radiation shielding.

Another embodiment of the present invention is directed to the instrument described above (hot component unit, cold component unit, cartridge apparatus), wherein the one or more cartridge apparatus enable refilling of contents of the cartridge apparatus without exposure to radiation.

Another embodiment of the present invention is directed to the instrument described above (hot component unit, cold component unit, cartridge apparatus), wherein at least one of the one or more cartridge apparatus are pre-packaged.

Another embodiment of the present invention is directed to a cassette device that has a body portion and at least one inlet port for receiving a fluid. The cassette also has at least one outlet port for providing at least a portion of the fluid. There are also one or more functional elements disposed on the body portion to perform an associated function. These functional elements may include, for example, HPLC, ion exchange column, vials, reservoirs and electronic components such as memory units, processors and other units.

The embodiments of the present invention also include a cassette in which at least some of the functional elements do not come into contact with radiation since they are radiation intolerant.

Furthermore, some of the functional elements are re-usable. They may be re-cycled or re-furbished such that they can be utilized again, either with the same cassette or a different cassette. Additionally, some of the functional elements are disposable.

According to the embodiments of the present invention, some of the functional elements are re-usable parts on the cassette body.

Additionally, the cassette device, as described herein, can have a body portion that is designed such that its shape, dimensions or pre-etched channels are based on a desired use or particular execution or recipe, or batch or re-usable elements. Thus, the cassette may be wider or longer or have additional vials based on a desired use of the cassette.

Another embodiment of the present invention is directed to a cassette device, as described herein in which the body portion includes one or more reservoirs that are arranged so as to provide contents of the reservoirs in a predetermined sequence. Thus, when the cassette is re-cycled or refurbished, the reservoirs can be re-filled so that the cassette may be used for a similar recipe in the future. Indeed, the cassettes can be re-used many times over by a laboratory using the cassettes to execute the recipe.

Another embodiment of the present invention is directed to a cassette in which the functional elements include elements for the wetted path. Thus, the wetted path can be utilized by the cassette elements, or components.

Yet another embodiment of the present invention is directed to a cassette device, as described herein in which the functional elements include HPLC, ion exchange column, a reagent reservoir, a mixing unit, a reaction chamber, a microreactor, a finishing unit, vials containing solvents and/or reagents, a chamber having pre-loaded reagents, a chamber having operator-loaded reagents, a waste collection chamber, pumps, valves, connections, tubing, processors, memories, chips, circuit traces, electrical connectors, fluid connectors, and other elements used in conjunction with the cassette that may be disposed on the cassette.

Another embodiment of the present invention is directed to the cassette device, as described herein in which an exchange time for the cassette in an instrument does not exceed a predetermined time interval. This predetermined time interval may be for example approximately one minute; approximately three minutes; approximately five minutes; or approximately fifteen minutes; or another desired time between runs.

The cassette device according to an embodiment of the present invention may be configured for a single run or multiple runs. Also, the cassette may perform a cleaning function for at least a portion of an instrument and/or the cassette. Additionally, the cassette device may be adapted for performing one or more tests of an instrument.

Another embodiment of the present invention is a cassette device that includes a tracking module, disposed on the body portion, that tracks use of the cassette. The tracking device may be used to accumulate use data of the cassette, types of experiments run using the cassette, types of constituent parts on the cassette, maintenance records, types of instruments the cassette has been used with, time of use of the cassette and other data related to the operational life and uses of the cassette.

The cassette device, as described herein may be used to produce an aliquot, or other reaction product that may be output from the cassette and/or instrument.

A further embodiment of the present invention is a cassette device, as described herein, that further includes at least one connector adapted to electrically couple the cassette device to an instrument. Additionally, the connector is adapted to transmit electrical signals or power signals or both electrical and power signals between the cassette device and the instrument.

Yet another embodiment of the present invention is directed to the cassette device, as described herein that includes a connector adapted to provide a pathway for liquid transmission between the cassette device and an instrument. This could be tubing, or a fitting that permits liquids to transfer to and from the cassette.

Yet another embodiment of the cassette as described herein is that the cassette may have a body portion that is shaped to interface with an instrument such that the shape signals to the instrument what predetermined procedures, experiments, recipes or other uses the cassette is capable of performing.

Another embodiment of the present invention is directed to the cassette device, as described herein that also includes identifying information disposed on the cassette device. The identifying information includes, for example, a bar code, an RFID tag, encoded data, encrypted data or any combination thereof.

Another embodiment of the present invention is directed to the cassette as described herein and also includes an integrity module, or unit or facility that is mounted on the body portion, and is adapted to determine whether an instrument is compatible with the cassette device. If the cassette and instrument are not compatible, an alert or other indication is generated and provided to an operator or other location, such as a monitoring device.

Yet another embodiment of the present invention is directed to a cassette, as described herein in which the body portion includes one or more containers, or vials, or reservoirs, that contain predetermined materials. These containers may include fluids (liquid or gas or slurry or any combination thereof) or dry chemicals.

Another embodiment of the present invention is directed to the cassette device, as described herein, wherein the cassette includes a cleaning unit or facility disposed thereon. The cleaning unit may be used to clean components on the cassette and/or components of the instrument. The tubing or plumbing connected to the cleaning unit can be configured to deliver the quantity and type of cleaning agent desired for the particular cleaning operation.

The cassette as described herein may also have channels that are pre-configured on the body portion of the cassette. These channels may be drilled, etched, molded, or otherwise formed such that the channel paths are fixed. An operator may connect various functional elements or components such that the channels provide a conduit or pathway between the components.

Also, the cassette, as described herein, may also have flexible tubing connected to at least one of the at least one outlet ports and/or components. The cassette may also include one or more valves disposed on the body portion of the cassette.

Another embodiment of the present invention is directed to the cassette as described herein in which one or more components are utilized based on an instrument operating in conjunction with the cassette. Thus, an instrument may utilize only some of the functional elements mounted on the cassette.

Another embodiment of the present invention is directed to a cassette device that includes an indicia that indicates a status of the cassette. This may include, for example, the number of recipes executed, radiation level and other conditions. This indicia could be the bar code, RFID and/or tracking unit as described herein.

Another embodiment of the present invention is an instrument that is used to identify the condition of a cassette. This instrument typically includes a cassette reception module, adapted to interface with a cassette apparatus and the instrument identifies each cassette used with the cassette reception module. The instrument can obtain status data from the cassette and use the status data to control re-furbishing, re-cycling and or replacement operations.

Another embodiment of the present invention is directed to an apparatus for reprocessing the cassette components which are to be re-used, which permits component reprocessing to take place without limiting the synthesis instrument from proceeding directly with its next synthesis task.

Furthermore, the invention is directed to an embodiment that includes a radiosynthetic device suitable for operating two or more cassettes, such that the instrument can perform multiple synthesis runs in sequence without the need to change cassettes.

Having thus described in detail various embodiments of the present invention, it is to be understood that the invention defined by the above paragraphs is not to be limited to particular details set forth in the above description as many apparent variations thereof are possible without departing from the spirit or scope of the present invention.

What is clamed is:

1. An instrument for synthesis of radiolabeled compounds comprising:
    one or more "hot" component units;
    at least one "cold" component unit; wherein the one or more "hot" component units and the at least one "cold" component unit are separate units that are operatively connected to each other, and the one or more "hot" component units and the at least one "cold" component unit being positioned from each other to reduce radiation exposure to a user and sensitive equipment; and
    one or more cassette apparatus operatively coupled to the instrument, the one or more cassette apparatus adapted to provide at least a portion of contents of the one or more cassette apparatus to either one or more of the one or more hot component units or one or more of the at least one cold component units, the one or more "hot" component units comprising no single-use consumables.

2. The instrument according to claim 1, wherein the one or more cassette apparatus include one or more disposable cassette apparatus.

3. The instrument according to claim 1, wherein the one or more cassette apparatus include one or more re-usable cassette apparatus.

4. The instrument according to claim 1, wherein the one or more cassette apparatus include one or more single-use cassette apparatus.

5. The instrument according to claim 1, wherein the one or more cassette apparatus include one or more multi-use cassette apparatus.

6. The instrument according to claim 1, wherein one or more of the one or more cassette apparatus are operatively coupled to one or more of the one or more hot component units.

7. The instrument according to claim 1, wherein one or more of the one or more cassette apparatus are operatively coupled to one or more of the at least one cold component units.

8. The instrument according to claim 1, wherein one or more of the one or more cassette apparatus are operatively coupled to one or more of the one or more hot component units, and include one or more disposable cassette apparatus.

9. The instrument according to claim 1, wherein one or more of the one or more cassette apparatus are operatively coupled to one or more of the cold component units, and include one or more disposable cassette apparatus.

10. The instrument according to claim 1, wherein one or more of the one or more cassette apparatus are operatively coupled to one or more of the one or more hot component units and one or more of the at least one cold component unit.

11. The instrument according to claim 1, further comprising:
   radiation shielding disposed in proximity to one or more of the one or more hot component units to reduce radiation exposure.

12. The instrument according to claim 11, wherein one or more of the one or more cassette apparatus are operatively coupled to the instrument outside the radiation shielding.

13. The instrument according to claim 1, wherein the one or more cassette apparatus enable refilling of contents of the cassette apparatus without exposure to radiation.

14. The instrument according to claim 1, wherein at least one of the one or more cassette apparatus are pre-packaged.

15. A cassette device comprising:
   a body portion;
   at least one inlet port for receiving a fluid;
   at least one outlet port for providing at least a portion of the fluid; and
   wherein the cassette device is configured to provide the at least a portion of the fluid to either one or more "hot" component units or at least one "cold" component unit, the one or more "hot" component units comprising no single-use consumables, and
   wherein the body portion includes one or more reservoirs that are arranged so as to provide contents of the reservoirs in a predetermined sequence to the one or more "hot" component units or the at least one "cold" component unit.

16. The cassette device according to claim 15, wherein at least one of the components are disposable.

17. The cassette device according to claim 15, further comprising wetted path components disposed on the body portion.

18. The cassette device according to claim 15, further comprising an HPLC column disposed on the body portion.

19. The cassette device according to claim 15, further comprising an ion exchange column disposed on the body portion.

* * * * *